US012633486B2

(12) United States Patent
Quenzer

(10) Patent No.: US 12,633,486 B2
(45) Date of Patent: May 19, 2026

(54) DEVICE INCLUDING A FUSE

(71) Applicant: MILWAUKEE ELECTRIC TOOL CORPORATION, Brookfield, WI (US)

(72) Inventor: Jonathan Quenzer, German Valley, IL (US)

(73) Assignee: Milwaukee Electric Tool Corporation, Brookfield, WI (US)

( * ) Notice: Subject to any disclaimer, the term of this patent is extended or adjusted under 35 U.S.C. 154(b) by 123 days.

(21) Appl. No.: 18/341,851

(22) Filed: Jun. 27, 2023

(65) Prior Publication Data

US 2023/0420207 A1 Dec. 28, 2023

Related U.S. Application Data

(60) Provisional application No. 63/367,101, filed on Jun. 27, 2022.

(51) Int. Cl.
| | |
|---|---|
| *H01H 85/041* | (2006.01) |
| *H01M 50/583* | (2021.01) |
| *H02J 7/00* | (2006.01) |

(52) U.S. Cl.
CPC ...... *H01H 85/0411* (2013.01); *H01M 50/583* (2021.01); *H02J 7/0044* (2013.01); *H01H 2085/0412* (2013.01)

(58) Field of Classification Search
CPC ....... H01H 85/0411; H01H 2085/0412; H01H 85/046; H01H 85/36; H01M 50/583;
(Continued)

(56) References Cited

U.S. PATENT DOCUMENTS

| 3,919,573 A | 11/1975 | Schmuck |
|---|---|---|
| 4,278,744 A | 7/1981 | Athearn |

(Continued)

FOREIGN PATENT DOCUMENTS

| CN | 102064223 B | 5/2012 |
|---|---|---|
| CN | 202759266 U | 2/2013 |

(Continued)

OTHER PUBLICATIONS

US 6,175,216 B1, 01/2001, Andersen et al. (withdrawn)
(Continued)

*Primary Examiner* — Jacob R Crum
(74) *Attorney, Agent, or Firm* — Michael Best & Friedrich LLP

(57) ABSTRACT

A device including a conductive path for passing electric current. The device including a terminal and a spring fuse. The spring fuse is connected in the conductive path and is electrically connected to the terminal. The spring fuse includes a fixed base, an extension spring connected to the fixed base at a first end, a power path connection connected to the extension spring at a second end, a plurality of fuse pads, and one or more solder joints configured to connect the power path connection to the plurality of fuse pads. The one or more solder joints are configured to melt when a temperature of the one or more solder joints exceeds a threshold value. The power path connection is configured to retract toward the fixed base when the temperature of the one or more solder joints exceeds a threshold value.

13 Claims, 14 Drawing Sheets

(58) Field of Classification Search
CPC .. H02J 7/0044; H02J 7/00304; H02J 7/00309;
B25F 5/02
See application file for complete search history.

(56) References Cited

U.S. PATENT DOCUMENTS

| | | | |
|---|---|---|---|
| 4,659,636 A | | 4/1987 | Suzuki et al. |
| 4,914,393 A | | 4/1990 | Yoshido |
| 4,965,738 A | | 10/1990 | Bauer et al. |
| 4,997,732 A | | 3/1991 | Austin et al. |
| 5,084,691 A | * | 1/1992 | Lester ................ H05K 1/0293 |
| | | | 337/297 |
| 5,166,596 A | | 11/1992 | Goedken |
| 5,215,834 A | | 6/1993 | Reher et al. |
| 5,351,283 A | | 9/1994 | Kunitomo |
| 5,391,974 A | | 2/1995 | Shiojima et al. |
| 5,430,363 A | | 7/1995 | Kim |
| 5,456,994 A | | 10/1995 | Mita |
| 5,466,545 A | | 11/1995 | Chamberlain et al. |
| 5,477,126 A | | 12/1995 | Shiojima |
| 5,477,127 A | | 12/1995 | Shiojima et al. |
| 5,480,734 A | | 1/1996 | Schulz et al. |
| 5,483,145 A | | 1/1996 | Shiojima et al. |
| 5,497,068 A | | 3/1996 | Shiojima |
| 5,548,201 A | | 8/1996 | Grabon |
| 5,585,710 A | | 12/1996 | Nakamura et al. |
| 5,621,302 A | | 4/1997 | Shinohara |
| 5,637,418 A | | 6/1997 | Brown et al. |
| 5,637,982 A | | 6/1997 | Nanno et al. |
| 5,643,693 A | | 7/1997 | Hill et al. |
| 5,652,500 A | | 7/1997 | Kadouchi et al. |
| 5,708,350 A | | 1/1998 | Tibbs |
| 5,711,605 A | | 1/1998 | Reher et al. |
| 5,717,313 A | | 2/1998 | Grabon |
| 5,731,686 A | | 3/1998 | Malhi |
| 5,767,659 A | | 6/1998 | Farley |
| 5,783,998 A | | 7/1998 | Nakajou et al. |
| 5,795,664 A | | 8/1998 | Kelly |
| 5,798,667 A | | 8/1998 | Herbert |
| 5,804,944 A | | 9/1998 | Alberkrack et al. |
| 5,826,958 A | | 10/1998 | Avitan |
| 5,867,008 A | | 2/1999 | Du et al. |
| 5,870,267 A | | 2/1999 | Kitano |
| 5,874,825 A | | 2/1999 | Brotto |
| 5,900,717 A | | 5/1999 | Lee |
| 5,903,423 A | | 5/1999 | Okano et al. |
| 5,909,103 A | | 6/1999 | Williams |
| 5,912,547 A | | 6/1999 | Grabon |
| 5,920,181 A | | 7/1999 | Alberkrack et al. |
| 5,939,865 A | | 8/1999 | Mcgrath et al. |
| 5,963,019 A | | 10/1999 | Cheon |
| 6,018,227 A | | 1/2000 | Kumar et al. |
| 6,020,721 A | | 2/2000 | Brotto |
| 6,029,119 A | | 2/2000 | Atkinson |
| 6,046,575 A | * | 4/2000 | Demuro ................ H02J 7/0031 |
| | | | 320/164 |
| 6,048,638 A | | 4/2000 | Pendalwar |
| 6,075,341 A | | 6/2000 | White et al. |
| 6,075,346 A | | 6/2000 | Kikuchi et al. |
| 6,087,036 A | | 7/2000 | Rouillard et al. |
| 6,152,597 A | | 11/2000 | Potega |
| 6,157,166 A | | 12/2000 | Odaohhara et al. |
| 6,160,376 A | | 12/2000 | Kumar et al. |
| 6,175,211 B1 | | 1/2001 | Brotto |
| 6,181,032 B1 | | 1/2001 | Marshall et al. |
| 6,215,274 B1 | | 4/2001 | Dotzler |
| 6,225,778 B1 | | 5/2001 | Hayama et al. |
| 6,232,749 B1 | | 5/2001 | Hewes et al. |
| 6,251,537 B1 | | 6/2001 | Kim et al. |
| 6,307,349 B1 | | 10/2001 | Koenck et al. |
| 6,309,099 B1 | | 10/2001 | Chang |
| 6,316,140 B1 | | 11/2001 | Hatazawa et al. |
| 6,331,761 B1 | | 12/2001 | Kumar et al. |
| 6,336,080 B1 | | 1/2002 | Atkinson |
| 6,340,880 B1 | | 1/2002 | Higashijima et al. |
| 6,377,432 B1 | | 4/2002 | Hashimoto |
| 6,387,566 B1 | | 5/2002 | Chang et al. |
| 6,404,610 B1 | | 6/2002 | Chang |
| 6,455,186 B1 | | 9/2002 | Moores, Jr. et al. |
| 6,459,175 B1 | | 10/2002 | Potega |
| 6,492,791 B1 | | 12/2002 | Saeki et al. |
| 6,540,685 B1 | | 4/2003 | Rhoads et al. |
| 6,542,846 B1 | | 4/2003 | Miller et al. |
| 6,569,561 B1 | | 5/2003 | Kimura et al. |
| 6,632,538 B1 | | 10/2003 | Yamazaki et al. |
| 6,634,896 B1 | | 10/2003 | Potega |
| 6,645,666 B1 | | 11/2003 | Moores et al. |
| 6,653,018 B2 | | 11/2003 | Takahashi et al. |
| 6,661,231 B1 | | 12/2003 | Arai et al. |
| 6,700,766 B2 | | 3/2004 | Sato |
| 6,773,848 B1 | | 8/2004 | Nortoft et al. |
| 6,790,557 B2 | | 9/2004 | Xing et al. |
| 6,797,430 B1 | | 9/2004 | Hatta et al. |
| 6,841,298 B2 | | 1/2005 | Yamashita et al. |
| 6,866,527 B2 | | 3/2005 | Potega |
| 6,878,481 B2 | | 4/2005 | Bushong et al. |
| 6,885,168 B2 | | 4/2005 | Okumura et al. |
| 6,902,844 B2 | | 6/2005 | Yageta et al. |
| 6,914,414 B2 | | 7/2005 | Hamada et al. |
| 6,945,803 B2 | | 9/2005 | Potega |
| 6,948,078 B2 | | 9/2005 | Odaohhara |
| 6,949,309 B2 | | 9/2005 | Moores, Jr. et al. |
| 6,963,186 B2 | | 11/2005 | Hobbs |
| 6,981,895 B2 | | 1/2006 | Potega |
| 6,989,652 B2 | | 1/2006 | Saeki et al. |
| 6,992,463 B2 | | 1/2006 | Yoshio |
| 7,002,265 B2 | | 2/2006 | Potega |
| 7,008,720 B2 | | 3/2006 | Shimamura et al. |
| 7,014,945 B2 | | 3/2006 | Moores et al. |
| 7,039,821 B1 | | 5/2006 | Potega |
| 7,056,616 B2 | | 6/2006 | Moores et al. |
| 7,058,484 B1 | | 6/2006 | Potega |
| 7,059,769 B1 | | 6/2006 | Potega |
| 7,127,623 B2 | | 10/2006 | Potega |
| 7,157,882 B2 | | 1/2007 | Johnson et al. |
| 7,180,268 B2 | | 2/2007 | Denning et al. |
| 7,252,904 B2 | | 8/2007 | Moores et al. |
| 7,270,910 B2 | | 9/2007 | Yahnker et al. |
| 7,276,881 B2 | | 10/2007 | Okumura et al. |
| 7,285,334 B1 | | 10/2007 | Yamashita et al. |
| 7,288,920 B2 | | 10/2007 | Bushong et al. |
| 7,326,490 B2 | | 2/2008 | Moores, Jr. et al. |
| 7,375,498 B2 | | 5/2008 | Yamamoto |
| 7,393,610 B2 | | 7/2008 | Shimamura et al. |
| 7,442,468 B2 | | 10/2008 | Chen |
| 7,456,614 B2 | | 11/2008 | Sato et al. |
| 7,470,485 B2 | | 12/2008 | Kang et al. |
| 7,495,416 B2 | | 2/2009 | Sato et al. |
| 7,507,498 B2 | | 3/2009 | Yoon et al. |
| 7,508,171 B2 | | 3/2009 | Carrier et al. |
| 7,510,799 B2 | | 3/2009 | Hatta et al. |
| 7,514,903 B2 | | 4/2009 | Lee |
| 7,531,270 B2 | | 5/2009 | Buck et al. |
| 7,538,448 B2 | | 5/2009 | Yoshida et al. |
| 7,550,950 B2 | | 6/2009 | Tsubaki et al. |
| 7,554,290 B2 | | 6/2009 | Johnson et al. |
| 7,572,544 B2 | | 8/2009 | Kozuki et al. |
| 7,579,732 B2 | | 8/2009 | Yamaguchi et al. |
| 7,579,782 B2 | | 8/2009 | West |
| 7,589,499 B2 | | 9/2009 | Denning et al. |
| 7,602,146 B2 | | 10/2009 | Carrier et al. |
| 7,609,005 B2 | | 10/2009 | West |
| 7,611,798 B2 | | 11/2009 | Yoon et al. |
| 7,638,977 B2 | | 12/2009 | Park |
| 7,646,169 B2 | | 1/2010 | Liu et al. |
| 7,649,340 B2 | | 1/2010 | Sato et al. |
| 7,667,435 B2 | | 2/2010 | Denning |
| 7,670,184 B2 | | 3/2010 | Akahori et al. |
| 7,704,635 B2 | | 4/2010 | Kosuda et al. |
| 7,710,076 B2 | | 5/2010 | Goto |
| 7,719,234 B2 | | 5/2010 | Carrier et al. |
| 7,723,921 B2 | | 5/2010 | West |
| 7,728,553 B2 | | 6/2010 | Carrier et al. |
| 7,736,792 B2 | | 6/2010 | Moores, Jr. et al. |

(56)      References Cited

U.S. PATENT DOCUMENTS

| | | |
|---|---|---|
| 7,772,799 B2 | 8/2010 | Wu |
| 7,772,805 B2 | 8/2010 | Yamamoto et al. |
| 7,790,313 B2 | 9/2010 | Lee |
| 7,807,288 B2 | 10/2010 | Yoon et al. |
| 7,807,289 B2 | 10/2010 | Seiler et al. |
| 7,808,205 B2 | 10/2010 | Rao et al. |
| 7,830,121 B2 | 11/2010 | Sasaki |
| 7,838,143 B2 | 11/2010 | Onnerud et al. |
| 7,859,220 B2 | 12/2010 | Bushong et al. |
| 7,875,378 B2 | 1/2011 | Yang et al. |
| 7,892,669 B2 | 2/2011 | Yang et al. |
| 7,909,657 B1 | 3/2011 | Abughazaleh et al. |
| 7,928,692 B2 | 4/2011 | Carrier et al. |
| 7,939,193 B2 | 5/2011 | Moores, Jr. et al. |
| 7,952,330 B2 | 5/2011 | Mori |
| 7,964,303 B2 | 6/2011 | Takeshita et al. |
| 8,012,615 B2 | 9/2011 | Onnerud et al. |
| 8,035,986 B2 | 10/2011 | Koetting et al. |
| 8,039,145 B2 | 10/2011 | Ha et al. |
| 8,049,460 B2 | 11/2011 | Krauer et al. |
| 8,057,931 B2 | 11/2011 | Bjork |
| 8,058,846 B2 | 11/2011 | Kim |
| 8,093,863 B2 | 1/2012 | Carrier et al. |
| 8,173,293 B2 | 5/2012 | Kim |
| 8,232,773 B2 | 7/2012 | Denning et al. |
| 8,257,848 B2 | 9/2012 | Ijaz et al. |
| 8,257,855 B2 | 9/2012 | Ijaz et al. |
| 8,273,471 B2 | 9/2012 | Hain et al. |
| 8,283,893 B2 | 10/2012 | Lee et al. |
| 8,288,031 B1 | 10/2012 | Matejek et al. |
| 8,313,856 B2 | 11/2012 | Takeshita et al. |
| 8,323,828 B2 | 12/2012 | Yamazaki et al. |
| 8,409,744 B2 | 4/2013 | Ijaz et al. |
| 8,426,057 B2 | 4/2013 | Park et al. |
| 8,446,120 B2 | 5/2013 | Forster et al. |
| 8,450,966 B2 | 5/2013 | Krauer et al. |
| 8,455,135 B2 | 6/2013 | Yamazaki et al. |
| 8,482,209 B2 | 7/2013 | West |
| 8,497,662 B2 | 7/2013 | Aradachi et al. |
| 8,501,345 B2 | 8/2013 | Gardner et al. |
| 8,503,161 B1 | 8/2013 | Chang et al. |
| 8,512,887 B2 | 8/2013 | Reyburn et al. |
| 8,531,263 B2 | 9/2013 | Dietsch et al. |
| 8,574,740 B2 | 11/2013 | Quick et al. |
| 8,580,423 B2 | 11/2013 | Kim |
| 8,592,067 B2 | 11/2013 | Yokoyama et al. |
| 8,605,450 B2 | 12/2013 | Kaneshige et al. |
| 8,618,775 B2 | 12/2013 | Hermann et al. |
| 8,618,805 B2 | 12/2013 | Li |
| 8,652,678 B2 | 2/2014 | Musetti |
| 8,653,787 B2 | 2/2014 | Cunanan et al. |
| 8,663,832 B2 | 3/2014 | Abe et al. |
| 8,679,670 B2 | 3/2014 | Onnerud et al. |
| 8,691,430 B2 | 4/2014 | Kim |
| 8,691,446 B2 | 4/2014 | Sakata et al. |
| 8,697,264 B2 | 4/2014 | Park et al. |
| 8,698,457 B2 | 4/2014 | Hogari et al. |
| 8,704,491 B2 | 4/2014 | Sugiura |
| 8,728,642 B2 | 5/2014 | Maskew et al. |
| 8,729,865 B2 | 5/2014 | Scheucher |
| 8,741,466 B2 | 6/2014 | Youngs et al. |
| 8,742,724 B2 | 6/2014 | Suzuki et al. |
| 8,742,764 B2 | 6/2014 | Lee et al. |
| 8,771,863 B2 | 7/2014 | Amagai et al. |
| 8,773,073 B2 | 7/2014 | Kimura |
| 8,786,261 B2 | 7/2014 | Andrea |
| 8,796,995 B2 | 8/2014 | Cunanan et al. |
| 8,802,259 B2 | 8/2014 | Lee et al. |
| 8,802,264 B2 | 8/2014 | Lin et al. |
| 8,808,031 B2 | 8/2014 | Zhao |
| 8,810,085 B2 | 8/2014 | Matsunaga et al. |
| 8,815,429 B2 | 8/2014 | Hostler et al. |
| 8,822,051 B2 | 9/2014 | Yoo |
| 8,828,577 B2 | 9/2014 | Youngs et al. |
| 8,830,676 B2 | 9/2014 | Borck et al. |
| 8,846,239 B2 | 9/2014 | Park et al. |
| 8,846,240 B2 | 9/2014 | Merriman et al. |
| 8,846,243 B2 | 9/2014 | Ryu et al. |
| 8,847,553 B2 | 9/2014 | Bohan, Jr. et al. |
| 8,859,124 B2 | 10/2014 | Tanno |
| 8,906,531 B2 | 12/2014 | Caumont et al. |
| 8,911,253 B2 | 12/2014 | Myer et al. |
| 8,932,750 B2 | 1/2015 | Cooley et al. |
| 8,936,865 B2 | 1/2015 | Kim |
| 8,968,901 B2 | 3/2015 | Yang et al. |
| 8,980,452 B2 | 3/2015 | Hong et al. |
| 8,988,015 B2 | 3/2015 | Forster et al. |
| 8,999,546 B2 | 4/2015 | Hostler et al. |
| 9,000,882 B2 | 4/2015 | Velderman et al. |
| 9,001,495 B2 | 4/2015 | Martini et al. |
| 9,007,015 B1 | 4/2015 | Nook et al. |
| 9,017,634 B2 | 4/2015 | Brambilla et al. |
| 9,023,499 B2 | 5/2015 | Takase et al. |
| 9,023,508 B2 | 5/2015 | Seong et al. |
| 9,028,986 B2 | 5/2015 | Ijaz et al. |
| 9,029,011 B2 | 5/2015 | Kim |
| 9,034,129 B2 | 5/2015 | Koetting et al. |
| 9,050,715 B2 | 6/2015 | Umemura et al. |
| 9,054,359 B2 | 6/2015 | Han et al. |
| 9,054,368 B2 | 6/2015 | Tong et al. |
| 9,054,401 B2 | 6/2015 | Hopkins et al. |
| 9,065,152 B2 | 6/2015 | Ryu et al. |
| 9,070,919 B2 | 6/2015 | Tada et al. |
| 9,070,938 B2 | 6/2015 | Hashimoto et al. |
| 9,071,069 B2 | 6/2015 | Brotto et al. |
| 9,077,035 B2 | 7/2015 | Kita et al. |
| 9,083,062 B2 | 7/2015 | Kumar et al. |
| 9,093,686 B2 | 7/2015 | Lee et al. |
| 9,097,771 B2 | 8/2015 | Lee et al. |
| 9,099,725 B2 | 8/2015 | Langhoff et al. |
| 9,099,761 B2 | 8/2015 | Hong |
| 9,099,796 B2 | 8/2015 | Myer et al. |
| 9,121,907 B2 | 9/2015 | Shiraishi et al. |
| 9,124,085 B2 | 9/2015 | Wu et al. |
| 9,136,524 B2 | 9/2015 | Kim |
| 9,142,825 B2 | 9/2015 | Cho et al. |
| 9,147,916 B2 | 9/2015 | Bronczyk et al. |
| 9,153,978 B2 | 10/2015 | Reade et al. |
| 9,160,038 B2 | 10/2015 | Buck et al. |
| 9,166,251 B2 | 10/2015 | Katayama et al. |
| 9,172,115 B2 | 10/2015 | Kolden et al. |
| 9,178,192 B2 | 11/2015 | Payne |
| 9,196,879 B2 | 11/2015 | Hayashi et al. |
| 9,203,075 B2 | 12/2015 | Jang et al. |
| 9,203,118 B2 | 12/2015 | Lenz et al. |
| 9,203,125 B2 | 12/2015 | Bronczyk et al. |
| 9,209,434 B2 | 12/2015 | Epstein |
| 9,209,642 B2 | 12/2015 | Cunanan et al. |
| 9,214,650 B2 | 12/2015 | Lee et al. |
| 9,218,917 B2 | 12/2015 | Brambilla et al. |
| 9,224,516 B2 | 12/2015 | Nelson et al. |
| 9,224,997 B2 | 12/2015 | Osswald |
| 9,225,275 B2 | 12/2015 | Sterling et al. |
| 9,257,729 B2 | 2/2016 | Hermann et al. |
| 9,269,934 B2 | 2/2016 | Yang et al. |
| 9,287,579 B2 | 3/2016 | Wyatt et al. |
| 9,312,580 B2 | 4/2016 | Nguyen et al. |
| 9,316,546 B2 | 4/2016 | Tsubaki et al. |
| 9,321,340 B2 | 4/2016 | Maskew et al. |
| 9,331,325 B2 | 5/2016 | Lim |
| 9,337,451 B2 | 5/2016 | Pinon et al. |
| 9,337,453 B2 | 5/2016 | Ogura et al. |
| 9,337,455 B2 | 5/2016 | Yang et al. |
| 9,343,722 B2 | 5/2016 | Adre et al. |
| 9,350,000 B2 | 5/2016 | Hayashi et al. |
| 9,350,019 B2 | 5/2016 | Sakata et al. |
| 9,350,041 B2 | 5/2016 | Chen et al. |
| 9,356,278 B2 | 5/2016 | Suzuki |
| 9,360,558 B2 | 6/2016 | Mitelman et al. |
| 9,362,545 B2 | 6/2016 | Sugawara |
| 9,368,771 B2 | 6/2016 | Seto et al. |
| 9,373,833 B2 | 6/2016 | Park et al. |
| 9,375,852 B2 | 6/2016 | Rose et al. |
| 9,383,412 B2 | 7/2016 | Shiraishi et al. |

(56) References Cited

U.S. PATENT DOCUMENTS

| | | | |
|---|---|---|---|
| 9,385,355 | B2 | 7/2016 | Pinon et al. |
| 9,385,360 | B2 | 7/2016 | Stoughton et al. |
| 9,385,395 | B2 | 7/2016 | Wu |
| 9,385,399 | B2 | 7/2016 | Ryu et al. |
| 9,397,513 | B2 | 7/2016 | Butler et al. |
| 9,401,250 | B2 | 7/2016 | Velderman et al. |
| 9,401,257 | B2 | 7/2016 | Dietsch et al. |
| 9,406,457 | B2 | 8/2016 | Velderman et al. |
| 9,412,994 | B2 | 8/2016 | Koebler |
| 9,413,038 | B2 | 8/2016 | Choi et al. |
| 9,413,088 | B2 | 8/2016 | Brotto et al. |
| 9,415,674 | B2 | 8/2016 | Youngs et al. |
| 9,419,268 | B2 | 8/2016 | Lee et al. |
| 9,438,113 | B2 | 9/2016 | Wyatt et al. |
| 9,444,086 | B2 | 9/2016 | Shimizu et al. |
| 9,444,269 | B2 | 9/2016 | Wohltmann et al. |
| 9,448,287 | B2 | 9/2016 | Okada et al. |
| 9,452,671 | B2 | 9/2016 | Bennett et al. |
| 9,455,436 | B2 | 9/2016 | Roh et al. |
| 9,461,293 | B2 | 10/2016 | Ochi |
| 9,461,379 | B2 | 10/2016 | Cunanan et al. |
| 9,466,863 | B2 | 10/2016 | Hong et al. |
| 9,472,797 | B2 | 10/2016 | Han et al. |
| 9,484,591 | B2 | 11/2016 | Shin et al. |
| 9,496,588 | B2 | 11/2016 | Nguyen et al. |
| 9,500,708 | B2 | 11/2016 | Shiraishi et al. |
| 9,502,708 | B2 | 11/2016 | Wang et al. |
| 9,508,498 | B2 | 11/2016 | Forster et al. |
| 9,520,612 | B2 | 12/2016 | Sato et al. |
| 9,525,195 | B2 | 12/2016 | Wyatt et al. |
| 9,531,046 | B2 | 12/2016 | Inoue et al. |
| 9,548,478 | B2 | 1/2017 | Park et al. |
| 9,550,425 | B2 | 1/2017 | Sugawara |
| 9,553,343 | B2 | 1/2017 | Malcolm et al. |
| 9,558,894 | B2 | 1/2017 | Signorelli et al. |
| 9,559,394 | B2 | 1/2017 | Eckl et al. |
| 9,568,557 | B2 | 2/2017 | Kudo et al. |
| 9,570,822 | B2 | 2/2017 | Cunanan et al. |
| 9,570,924 | B2 | 2/2017 | Endo et al. |
| 9,583,745 | B2 | 2/2017 | White et al. |
| 9,599,674 | B2 | 3/2017 | Shiraishi et al. |
| 9,614,257 | B2 | 4/2017 | Teramoto et al. |
| 9,614,259 | B2 | 4/2017 | Bergmann et al. |
| 9,620,826 | B2 | 4/2017 | Yang et al. |
| 9,621,009 | B2 | 4/2017 | Matsunaga et al. |
| 9,627,720 | B2 | 4/2017 | Yun |
| 9,627,908 | B2 | 4/2017 | Kaminsky et al. |
| 9,634,295 | B2 | 4/2017 | Dube |
| 9,640,790 | B2 | 5/2017 | Yoon et al. |
| 9,653,724 | B2 | 5/2017 | Lim |
| 9,673,493 | B2 | 6/2017 | Oshima et al. |
| 9,680,144 | B2 | 6/2017 | Shin |
| 9,680,178 | B2 | 6/2017 | Deponte et al. |
| 9,692,087 | B2 | 6/2017 | Wang et al. |
| 9,692,157 | B2 | 6/2017 | Brotto et al. |
| 9,705,112 | B2 | 7/2017 | Shin et al. |
| 9,711,780 | B2 | 7/2017 | Park et al. |
| 9,722,334 | B2 | 8/2017 | Sterling et al. |
| 9,735,451 | B2 | 8/2017 | Kim et al. |
| 9,741,979 | B2 | 8/2017 | Tamura et al. |
| 9,746,523 | B2 | 8/2017 | Boehm et al. |
| 9,746,525 | B2 | 8/2017 | Kudo et al. |
| 9,748,548 | B2 | 8/2017 | Malcolm et al. |
| D797,663 | S | 9/2017 | Miller et al. |
| 9,760,138 | B2 | 9/2017 | Huang et al. |
| 9,761,911 | B2 | 9/2017 | Lee et al. |
| 9,761,912 | B2 | 9/2017 | Tenzer et al. |
| 9,768,435 | B2 | 9/2017 | Koebler et al. |
| 9,768,473 | B2 | 9/2017 | Roh et al. |
| 9,768,625 | B2 | 9/2017 | Sakakibara |
| 9,770,992 | B2 | 9/2017 | Nook et al. |
| 9,774,064 | B2 | 9/2017 | Dudley et al. |
| 9,786,878 | B2 | 10/2017 | Hayashi et al. |
| 9,786,965 | B2 | 10/2017 | Omura |
| 9,792,038 | B2 | 10/2017 | Gil et al. |
| 9,793,581 | B2 | 10/2017 | Henrici et al. |
| 9,819,046 | B2 | 11/2017 | Choi et al. |
| 9,819,204 | B2 | 11/2017 | Miller et al. |
| 9,829,953 | B2 | 11/2017 | Reade et al. |
| 9,837,683 | B2 | 12/2017 | Lundström |
| 9,876,204 | B2 | 1/2018 | Kim et al. |
| 9,882,197 | B2 | 1/2018 | Wang et al. |
| D810,011 | S | 2/2018 | Nelson et al. |
| 9,887,398 | B2 | 2/2018 | Yun et al. |
| 9,893,519 | B1 | 2/2018 | Castillo et al. |
| 9,899,645 | B2 | 2/2018 | Hayashi et al. |
| 9,899,658 | B2 | 2/2018 | Biskup et al. |
| 9,911,954 | B2 | 3/2018 | Li et al. |
| 9,912,017 | B1 | 3/2018 | Kuo et al. |
| 9,917,285 | B1 | 3/2018 | Motoyama et al. |
| 9,917,294 | B2 | 3/2018 | Bang et al. |
| 9,923,247 | B2 | 3/2018 | Beaston et al. |
| 9,929,386 | B2 | 3/2018 | Yoshitake et al. |
| 9,929,441 | B2 | 3/2018 | Kotik |
| 9,929,451 | B2 | 3/2018 | Ng et al. |
| 9,954,207 | B2 | 4/2018 | Koebler |
| 9,960,509 | B2 | 5/2018 | Sterling et al. |
| 9,960,625 | B2 | 5/2018 | Klein et al. |
| 9,960,634 | B2 | 5/2018 | Sada |
| 9,966,774 | B2 | 5/2018 | Wohltmann et al. |
| 9,969,296 | B2 | 5/2018 | Kim et al. |
| 9,991,485 | B2 | 6/2018 | Seong et al. |
| 9,997,763 | B2 | 6/2018 | Biskup et al. |
| 10,003,203 | B2 | 6/2018 | Fujimaki et al. |
| 10,005,373 | B2 | 6/2018 | Morikawa et al. |
| 10,024,921 | B2 | 7/2018 | Butzmann |
| 10,027,140 | B2 | 7/2018 | Cunanan et al. |
| 10,033,071 | B2 | 7/2018 | Wang et al. |
| D826,149 | S | 8/2018 | Cooper |
| 10,040,359 | B2 | 8/2018 | Chen et al. |
| 10,056,582 | B2 | 8/2018 | White et al. |
| 10,056,587 | B2 | 8/2018 | Hasegawa |
| 10,056,600 | B2 | 8/2018 | Lee et al. |
| 10,074,847 | B2 | 9/2018 | Kolden et al. |
| 10,075,000 | B2 | 9/2018 | Miller et al. |
| 10,083,799 | B2 | 9/2018 | Zhamu et al. |
| 10,084,219 | B2 | 9/2018 | Roh et al. |
| 10,087,904 | B2 | 10/2018 | Butler et al. |
| 10,096,806 | B2 | 10/2018 | Pinon et al. |
| 10,103,360 | B2 | 10/2018 | Shiraishi |
| 10,110,019 | B2 | 10/2018 | Curtis |
| 10,116,153 | B2 | 10/2018 | Chen et al. |
| 10,128,483 | B2 | 11/2018 | Lee |
| 10,135,066 | B2 | 11/2018 | Kang et al. |
| 10,135,271 | B2 | 11/2018 | Miller et al. |
| 10,141,755 | B2 | 11/2018 | Miller et al. |
| 10,147,983 | B2 | 12/2018 | Kawahara et al. |
| 10,148,103 | B2 | 12/2018 | Miller et al. |
| 10,153,565 | B2 | 12/2018 | Zhao |
| 10,153,624 | B2 | 12/2018 | Park et al. |
| 10,164,455 | B2 | 12/2018 | Chan |
| 10,186,498 | B2 | 1/2019 | Watanabe |
| 10,186,739 | B2 | 1/2019 | Ng et al. |
| 10,193,191 | B2 | 1/2019 | Fan et al. |
| 10,205,197 | B2 | 2/2019 | Saito et al. |
| 10,205,330 | B2 | 2/2019 | Saito et al. |
| 10,211,488 | B2 | 2/2019 | Willgert et al. |
| 10,218,027 | B2 | 2/2019 | Gohl et al. |
| 10,230,082 | B2 | 3/2019 | Choi et al. |
| 10,249,918 | B2 | 4/2019 | Naito |
| 10,250,056 | B2 | 4/2019 | Miller et al. |
| 10,256,697 | B2 | 4/2019 | Velderman et al. |
| 10,263,436 | B2 | 4/2019 | Beaston et al. |
| 10,276,846 | B2 | 4/2019 | Kotik |
| 10,276,847 | B2 | 4/2019 | Cho et al. |
| 10,277,040 | B2 | 4/2019 | Schroff et al. |
| 10,283,280 | B2 | 5/2019 | Zhamu et al. |
| 10,290,907 | B2 | 5/2019 | Amemiya et al. |
| 10,290,909 | B2 | 5/2019 | Lee |
| 10,297,866 | B2 | 5/2019 | Choi et al. |
| 10,305,073 | B2 | 5/2019 | Lee |
| 10,312,699 | B2 | 6/2019 | Subbaraman et al. |
| 10,322,627 | B2 | 6/2019 | Maskew et al. |
| 10,326,167 | B2 | 6/2019 | Ihara et al. |

(56) References Cited

U.S. PATENT DOCUMENTS

| | | | |
|---|---|---|---|
| 10,326,170 B2 | 6/2019 | Bao et al. |
| 10,326,174 B2 | 6/2019 | Kamada et al. |
| 10,328,808 B2 | 6/2019 | Nook et al. |
| 10,340,490 B2 | 7/2019 | Sode et al. |
| 10,340,495 B2 | 7/2019 | Miyake |
| 10,355,304 B2 | 7/2019 | Karditsas et al. |
| 10,355,329 B2 | 7/2019 | Isshiki et al. |
| 10,361,463 B2 | 7/2019 | Lee et al. |
| 10,361,470 B2 | 7/2019 | Kwon et al. |
| 10,381,605 B2 | 8/2019 | Fauteux et al. |
| 10,386,419 B2 | 8/2019 | Kanai et al. |
| 10,388,924 B2 | 8/2019 | Ruehle et al. |
| 10,396,317 B2 | 8/2019 | Lee et al. |
| 10,396,403 B2 | 8/2019 | Bao et al. |
| 10,403,876 B2 | 9/2019 | Choi et al. |
| 10,408,886 B2 | 9/2019 | Joe et al. |
| 10,418,662 B2 | 9/2019 | Zhamu et al. |
| 10,421,349 B2 | 9/2019 | Maskew et al. |
| 10,431,784 B2 | 10/2019 | Pfeiffer et al. |
| 10,433,369 B2 | 10/2019 | Huang |
| 10,449,862 B2 | 10/2019 | Kanai et al. |
| 10,454,090 B2 | 10/2019 | Jin et al. |
| 10,454,091 B2 | 10/2019 | Park et al. |
| 10,461,557 B2 | 10/2019 | Ziegler et al. |
| 10,476,049 B2 | 11/2019 | Schoenherr et al. |
| 10,476,068 B2 | 11/2019 | Chung et al. |
| 10,483,506 B2 | 11/2019 | Klee et al. |
| 10,491,020 B2 | 11/2019 | Minnickel et al. |
| 10,495,692 B2 | 12/2019 | Miura et al. |
| 10,497,923 B2 | 12/2019 | Watanabe et al. |
| 10,497,962 B2 | 12/2019 | Glanz et al. |
| 10,497,983 B2 | 12/2019 | Nam |
| 10,505,161 B2 | 12/2019 | Kim et al. |
| 10,511,059 B1 | 12/2019 | Weisenstein et al. |
| 10,522,803 B2 | 12/2019 | Kim et al. |
| 10,522,805 B2 | 12/2019 | Cho |
| 10,532,667 B2 | 1/2020 | Chen et al. |
| 10,553,892 B2 | 2/2020 | Eo et al. |
| 10,566,599 B2 | 2/2020 | Balaster |
| 10,573,876 B1 | 2/2020 | Zeng et al. |
| 10,573,895 B2 | 2/2020 | Ahn et al. |
| 10,576,626 B2 | 3/2020 | Rose et al. |
| 10,601,018 B2 | 3/2020 | Ryu et al. |
| 10,604,024 B2 | 3/2020 | Nook et al. |
| 10,608,304 B2 | 3/2020 | Ruehle et al. |
| 10,622,603 B2 | 4/2020 | Nakai et al. |
| 10,622,641 B2 | 4/2020 | Woo et al. |
| 10,625,619 B2 | 4/2020 | Roh et al. |
| 10,629,941 B2 | 4/2020 | Dai et al. |
| 10,629,965 B2 | 4/2020 | Lee et al. |
| 10,632,848 B2 | 4/2020 | Lee et al. |
| 10,637,109 B2 | 4/2020 | Rejman et al. |
| 10,651,438 B2 | 5/2020 | Lee |
| 10,651,706 B2 | 5/2020 | Forster et al. |
| 10,653,183 B2 | 5/2020 | Sur et al. |
| 10,658,649 B2 | 5/2020 | Park et al. |
| 10,665,911 B2 | 5/2020 | Steil |
| 10,666,068 B2 | 5/2020 | Cunanan et al. |
| 10,670,637 B2 | 6/2020 | Kaupp |
| 10,673,027 B2 | 6/2020 | Wei et al. |
| 10,673,028 B2 | 6/2020 | Takei et al. |
| 10,686,178 B1 | 6/2020 | Hall et al. |
| 10,686,317 B2 | 6/2020 | Saito et al. |
| 10,686,319 B2 | 6/2020 | Wohltmann et al. |
| 10,693,112 B2 | 6/2020 | Enomoto et al. |
| 10,693,303 B2 | 6/2020 | Miller et al. |
| 10,700,390 B2 | 6/2020 | Saito et al. |
| 10,714,271 B2 | 7/2020 | Signorelli et al. |
| 10,714,713 B2 | 7/2020 | Reinshagen et al. |
| 10,714,714 B2 | 7/2020 | Russ et al. |
| 10,720,615 B2 | 7/2020 | Schmid-Schoenbein |
| 10,727,551 B2 | 7/2020 | Muniz et al. |
| 10,734,617 B2 | 8/2020 | Sakai et al. |
| 10,741,884 B2 | 8/2020 | Saito et al. |
| 10,749,228 B2 | 8/2020 | Kim et al. |
| 10,751,809 B2 | 8/2020 | Nagasaka et al. |
| 10,753,975 B2 | 8/2020 | Park et al. |
| 10,756,398 B2 | 8/2020 | Melack et al. |
| 10,756,553 B2 | 8/2020 | Saito et al. |
| 10,770,697 B2 | 9/2020 | Ruehle et al. |
| 10,770,712 B2 | 9/2020 | Kim et al. |
| 10,770,744 B2 | 9/2020 | Kruger et al. |
| 10,784,496 B2 | 9/2020 | Waller et al. |
| 10,784,610 B2 | 9/2020 | Li et al. |
| 10,784,676 B2 | 9/2020 | Uesugi et al. |
| 10,788,539 B2 | 9/2020 | Miura et al. |
| 10,790,558 B2 | 9/2020 | Jeon et al. |
| 10,797,280 B2 | 10/2020 | Peng et al. |
| 10,797,285 B2 | 10/2020 | Hilligoss et al. |
| 10,801,460 B2 | 10/2020 | Butler et al. |
| 10,804,560 B2 | 10/2020 | Lee et al. |
| 10,804,580 B2 | 10/2020 | Kim et al. |
| 10,804,711 B2 | 10/2020 | Sheeks et al. |
| 10,811,742 B2 | 10/2020 | Zhang et al. |
| 10,821,591 B2 | 11/2020 | Verbrugge et al. |
| 10,833,295 B2 | 11/2020 | Li et al. |
| 10,833,319 B2 | 11/2020 | Marusczyk et al. |
| 10,833,348 B2 | 11/2020 | Wolpert |
| 10,840,716 B2 | 11/2020 | Miller et al. |
| 10,847,774 B2 | 11/2020 | Yoshima et al. |
| 10,859,054 B2 | 12/2020 | Nook et al. |
| 10,862,173 B2 | 12/2020 | Yang et al. |
| 10,862,180 B2 | 12/2020 | Lee et al. |
| 10,868,345 B2 | 12/2020 | Ruehle et al. |
| 10,876,590 B2 | 12/2020 | Miwa et al. |
| 10,879,560 B2 | 12/2020 | Sato et al. |
| 10,886,075 B2 | 1/2021 | Leis et al. |
| 10,886,570 B2 | 1/2021 | Jin et al. |
| 10,886,764 B2 | 1/2021 | Kawano et al. |
| 10,888,989 B2 | 1/2021 | Kawakami et al. |
| 10,903,527 B2 | 1/2021 | Liu et al. |
| 10,910,637 B2 | 2/2021 | Song et al. |
| 10,914,166 B2 | 2/2021 | Pomerleau |
| D911,936 S | 3/2021 | Miller et al. |
| 10,934,378 B2 | 3/2021 | Bunzen et al. |
| 10,937,763 B2 | 3/2021 | Watanabe |
| 10,944,134 B2 | 3/2021 | Wang et al. |
| 10,950,912 B2 | 3/2021 | Elfering et al. |
| 10,957,894 B2 | 3/2021 | Patterson et al. |
| 10,964,985 B2 | 3/2021 | Shin et al. |
| 10,971,706 B2 | 4/2021 | Jiang et al. |
| 10,971,751 B2 | 4/2021 | Jung et al. |
| 10,971,763 B2 | 4/2021 | Sung et al. |
| 10,971,786 B2 | 4/2021 | Compton et al. |
| 10,981,452 B2 | 4/2021 | Nook et al. |
| 10,985,421 B2 | 4/2021 | Ryu et al. |
| 10,985,431 B2 | 4/2021 | Liu et al. |
| 10,985,576 B2 | 4/2021 | Sheeks et al. |
| 10,992,008 B2 | 4/2021 | Seo et al. |
| D919,560 S | 5/2021 | Taniguchi et al. |
| 10,994,597 B2 | 5/2021 | Maskew et al. |
| 10,998,738 B2 | 5/2021 | Lee |
| 11,011,789 B2 | 5/2021 | Guo et al. |
| 11,024,900 B2 | 6/2021 | Chorian et al. |
| 11,024,908 B2 | 6/2021 | Cheng |
| 11,024,930 B2 | 6/2021 | An et al. |
| 11,031,638 B2 | 6/2021 | Lee et al. |
| 11,031,651 B2 | 6/2021 | Elfering et al. |
| 11,031,797 B2 | 6/2021 | Nook et al. |
| 11,038,194 B2 | 6/2021 | Yang et al. |
| 11,038,220 B2 | 6/2021 | Homann |
| 11,038,237 B2 | 6/2021 | Stickel et al. |
| 11,038,255 B2 | 6/2021 | Kim et al. |
| 11,043,828 B2 | 6/2021 | Minnickel et al. |
| 11,047,918 B2 | 6/2021 | Du et al. |
| 11,050,053 B2 | 6/2021 | Li et al. |
| 11,054,477 B2 | 7/2021 | Min |
| 11,056,732 B2 | 7/2021 | Kim et al. |
| 11,056,748 B2 | 7/2021 | Zhu et al. |
| 11,058,013 B2 | 7/2021 | Dawley |
| 11,069,898 B2 | 7/2021 | Masuko et al. |
| 11,069,924 B2 | 7/2021 | Lee |
| 11,069,935 B2 | 7/2021 | Guo et al. |
| 11,069,942 B2 | 7/2021 | Shi et al. |

(56) References Cited

U.S. PATENT DOCUMENTS

| | | | |
|---|---|---|---|
| 11,070,067 | B2 | 7/2021 | Lee et al. |
| 11,081,750 | B2 | 8/2021 | Park et al. |
| 11,094,961 | B2 | 8/2021 | Park et al. |
| 11,094,969 | B2 | 8/2021 | Yang et al. |
| 11,094,972 | B2 | 8/2021 | Lee |
| 11,095,001 | B2 | 8/2021 | Kato |
| 11,095,239 | B2 | 8/2021 | Delose et al. |
| 11,101,518 | B2 | 8/2021 | Lin et al. |
| 11,108,091 | B2 | 8/2021 | Lee et al. |
| 11,108,114 | B2 | 8/2021 | Kim |
| 11,114,700 | B2 | 9/2021 | Park et al. |
| 11,121,362 | B2 | 9/2021 | Leng et al. |
| 11,121,374 | B2 | 9/2021 | Song et al. |
| 11,121,399 | B2 | 9/2021 | Gerlach et al. |
| 11,121,403 | B2 | 9/2021 | Kawase et al. |
| 11,121,416 | B2 | 9/2021 | Guo et al. |
| 11,121,426 | B2 | 9/2021 | Koetting et al. |
| 11,125,824 | B2 | 9/2021 | Lee et al. |
| 11,128,005 | B2 | 9/2021 | Wyatt et al. |
| 11,128,010 | B2 | 9/2021 | Taga |
| 11,133,507 | B2 | 9/2021 | Kim et al. |
| 11,133,508 | B2 | 9/2021 | Zhou et al. |
| 11,139,529 | B2 | 10/2021 | Yoon et al. |
| 11,145,889 | B2 | 10/2021 | Woo et al. |
| 11,145,940 | B2 | 10/2021 | Nakamoto et al. |
| 11,152,669 | B2 | 10/2021 | Buck et al. |
| 11,152,805 | B2 | 10/2021 | Minnickel et al. |
| 11,158,857 | B2 | 10/2021 | Woo et al. |
| 11,158,901 | B2 | 10/2021 | Shin et al. |
| 11,165,055 | B2 | 11/2021 | Jung et al. |
| 11,165,120 | B1 | 11/2021 | Wang |
| 11,165,126 | B2 | 11/2021 | Fauteux et al. |
| 11,165,216 | B2 | 11/2021 | Hunter, Jr. et al. |
| 11,171,495 | B2 | 11/2021 | Nam et al. |
| 11,171,569 | B2 | 11/2021 | Wang et al. |
| 11,177,524 | B2 | 11/2021 | Inoue |
| 11,177,544 | B2 | 11/2021 | Li et al. |
| 11,178,958 | B2 | 11/2021 | Nordmann et al. |
| 11,185,832 | B2 | 11/2021 | Cho et al. |
| 11,187,753 | B2 | 11/2021 | Gupta |
| 11,189,883 | B2 | 11/2021 | Song et al. |
| 11,193,982 | B2 | 12/2021 | Cha |
| 11,196,034 | B2 | 12/2021 | Woo et al. |
| 11,196,086 | B2 | 12/2021 | Liang et al. |
| 11,196,123 | B2 | 12/2021 | Xu et al. |
| 11,196,267 | B2 | 12/2021 | Ham |
| 11,201,366 | B2 | 12/2021 | Lee et al. |
| 11,205,804 | B2 | 12/2021 | Park |
| 11,205,818 | B2 | 12/2021 | Yun et al. |
| 11,205,820 | B2 | 12/2021 | Hanawa et al. |
| 11,205,905 | B2 | 12/2021 | Park |
| 11,205,907 | B2 | 12/2021 | Nook et al. |
| 11,211,646 | B2 | 12/2021 | Eberleh et al. |
| 11,211,657 | B2 | 12/2021 | Rejman et al. |
| 11,217,856 | B2 | 1/2022 | Varipatis et al. |
| 11,223,037 | B2 | 1/2022 | Choi et al. |
| 11,223,038 | B2 | 1/2022 | Toshiro et al. |
| 11,223,083 | B2 | 1/2022 | Jiang |
| 11,223,092 | B2 | 1/2022 | Jin et al. |
| 11,228,196 | B2 | 1/2022 | Zhang et al. |
| 11,236,194 | B2 | 2/2022 | Behrens et al. |
| 11,245,139 | B2 | 2/2022 | Jang et al. |
| 11,245,145 | B2 | 2/2022 | Zhang et al. |
| 11,245,274 | B2 | 2/2022 | Nook et al. |
| 11,251,503 | B2 | 2/2022 | Yamada et al. |
| 11,251,626 | B2 | 2/2022 | Zhang et al. |
| 11,254,213 | B2 | 2/2022 | Nook et al. |
| 11,258,135 | B2 | 2/2022 | Nam et al. |
| 11,258,291 | B2 | 2/2022 | Song et al. |
| 11,262,409 | B2 | 3/2022 | Hong et al. |
| 11,264,610 | B2 | 3/2022 | Zhao et al. |
| 11,264,661 | B2 | 3/2022 | Yoon et al. |
| 11,270,816 | B2 | 3/2022 | Kim |
| 11,271,199 | B2 | 3/2022 | Kang et al. |
| 11,271,264 | B2 | 3/2022 | Park et al. |
| 11,271,266 | B2 | 3/2022 | Yu et al. |
| 11,278,837 | B2 | 3/2022 | Tahara et al. |
| 11,283,057 | B2 | 3/2022 | Lee et al. |
| 11,283,061 | B2 | 3/2022 | Shen et al. |
| 11,283,062 | B2 | 3/2022 | Lee et al. |
| 11,289,736 | B2 | 3/2022 | Yang et al. |
| 11,289,751 | B2 | 3/2022 | Han et al. |
| 11,296,364 | B2 | 4/2022 | Von Hofen et al. |
| 11,296,367 | B2 | 4/2022 | Jin et al. |
| 11,296,385 | B2 | 4/2022 | Jin et al. |
| 11,296,514 | B2 | 4/2022 | Hwang |
| 11,296,520 | B2 | 4/2022 | Nook et al. |
| 11,302,902 | B2 | 4/2022 | Choi et al. |
| 11,302,907 | B2 | 4/2022 | Han et al. |
| 11,302,986 | B2 | 4/2022 | Dai et al. |
| 11,303,141 | B2 | 4/2022 | Kawasaki et al. |
| 11,305,451 | B2 | 4/2022 | Kwak et al. |
| 11,309,564 | B2 | 4/2022 | Kim et al. |
| 11,316,150 | B2 | 4/2022 | Kim et al. |
| 11,316,237 | B2 | 4/2022 | Do et al. |
| 11,322,796 | B2 | 5/2022 | Kim et al. |
| 11,322,811 | B2 | 5/2022 | Park et al. |
| 11,329,280 | B2 | 5/2022 | Zhang et al. |
| 11,342,543 | B2 | 5/2022 | Choi et al. |
| 11,342,578 | B2 | 5/2022 | Cho et al. |
| 11,342,601 | B2 | 5/2022 | Chen et al. |
| 11,346,886 | B2 | 5/2022 | An |
| 11,349,177 | B2 | 5/2022 | Sung et al. |
| 11,362,325 | B2 | 6/2022 | Cho et al. |
| 11,362,378 | B2 | 6/2022 | Son et al. |
| 11,362,388 | B2 | 6/2022 | Yusa et al. |
| 11,364,616 | B2 | 6/2022 | Zahn et al. |
| 11,367,876 | B2 | 6/2022 | Han et al. |
| 11,367,894 | B2 | 6/2022 | Choi et al. |
| 11,367,907 | B2 | 6/2022 | Nakano et al. |
| 11,374,212 | B2 | 6/2022 | Baek et al. |
| 11,374,261 | B2 | 6/2022 | Oishi et al. |
| 11,376,969 | B2 | 7/2022 | Lee et al. |
| 11,380,899 | B2 | 7/2022 | Koo et al. |
| 11,380,933 | B2 | 7/2022 | Fakhri et al. |
| 11,383,331 | B2 | 7/2022 | Hong et al. |
| 11,385,056 | B2 | 7/2022 | Min |
| 11,385,207 | B2 | 7/2022 | Jin et al. |
| 11,385,290 | B2 | 7/2022 | Kim et al. |
| 11,385,298 | B2 | 7/2022 | Song |
| 11,387,441 | B2 | 7/2022 | Song et al. |
| 11,387,482 | B2 | 7/2022 | Aikata et al. |
| 11,387,491 | B2 | 7/2022 | Zhang et al. |
| 11,387,499 | B2 | 7/2022 | Hong et al. |
| 11,387,500 | B2 | 7/2022 | Bernhardt |
| 11,387,510 | B2 | 7/2022 | Minami et al. |
| 11,387,516 | B2 | 7/2022 | Kim et al. |
| 11,387,519 | B2 | 7/2022 | Huang et al. |
| 11,390,174 | B2 | 7/2022 | Ko |
| 11,391,779 | B2 | 7/2022 | Hong et al. |
| 11,391,780 | B2 | 7/2022 | Bae et al. |
| 11,394,016 | B2 | 7/2022 | Kim et al. |
| 11,394,031 | B2 | 7/2022 | Oda et al. |
| 11,394,066 | B2 | 7/2022 | Liu et al. |
| 11,394,067 | B2 | 7/2022 | Edwards et al. |
| 11,394,075 | B2 | 7/2022 | Kim et al. |
| 11,394,080 | B2 | 7/2022 | Lee et al. |
| 11,394,084 | B2 | 7/2022 | Nam et al. |
| 11,394,089 | B2 | 7/2022 | Kim et al. |
| 11,394,093 | B2 | 7/2022 | Lee et al. |
| 11,395,119 | B2 | 7/2022 | Han et al. |
| 11,396,234 | B2 | 7/2022 | Schmidt et al. |
| 11,397,200 | B2 | 7/2022 | Kim |
| 11,397,211 | B2 | 7/2022 | Xu |
| 11,397,217 | B2 | 7/2022 | Lim et al. |
| 11,398,623 | B2 | 7/2022 | Lho et al. |
| 11,398,647 | B2 | 7/2022 | Katrak |
| 11,398,649 | B2 | 7/2022 | Krupezevic et al. |
| 11,398,651 | B2 | 7/2022 | Behm et al. |
| 11,398,654 | B2 | 7/2022 | Kim et al. |
| 11,398,655 | B2 | 7/2022 | Cho et al. |
| 11,398,662 | B2 | 7/2022 | Lee et al. |
| 11,398,663 | B2 | 7/2022 | Park et al. |
| 11,398,723 | B2 | 7/2022 | Choi |

(56) References Cited

U.S. PATENT DOCUMENTS

| | | | |
|---|---|---|---|
| 11,398,743 | B2 | 7/2022 | Kim et al. |
| D960,086 | S | 8/2022 | Schwalbach et al. |
| 11,399,676 | B2 | 8/2022 | Kim et al. |
| 11,401,902 | B2 | 8/2022 | Harvey et al. |
| 11,402,434 | B2 | 8/2022 | Ruan et al. |
| 11,404,688 | B2 | 8/2022 | Wang |
| 11,404,689 | B2 | 8/2022 | Song et al. |
| 11,404,693 | B2 | 8/2022 | Kim et al. |
| 11,404,721 | B2 | 8/2022 | Shin et al. |
| 11,404,724 | B2 | 8/2022 | Dou et al. |
| 11,404,727 | B2 | 8/2022 | Yoon et al. |
| 11,404,733 | B2 | 8/2022 | Lee et al. |
| 11,404,738 | B2 | 8/2022 | Yun et al. |
| 11,404,744 | B1 | 8/2022 | Yang et al. |
| 11,404,752 | B2 | 8/2022 | Heo et al. |
| 11,404,755 | B2 | 8/2022 | Kim et al. |
| 11,404,894 | B2 | 8/2022 | Yang et al. |
| 11,406,237 | B2 | 8/2022 | Yildirim et al. |
| 11,407,331 | B2 | 8/2022 | Zuo et al. |
| 11,409,119 | B2 | 8/2022 | Cho et al. |
| 11,411,222 | B2 | 8/2022 | Kim et al. |
| 11,411,223 | B2 | 8/2022 | Shimizu |
| 11,411,242 | B2 | 8/2022 | Chae et al. |
| 11,411,244 | B2 | 8/2022 | Isomichi et al. |
| 11,411,248 | B2 | 8/2022 | Oh et al. |
| 11,411,259 | B2 | 8/2022 | Machida et al. |
| 11,411,277 | B2 | 8/2022 | Nishikawa et al. |
| 11,411,283 | B2 | 8/2022 | Song et al. |
| 11,411,285 | B2 | 8/2022 | Park et al. |
| 11,411,287 | B2 | 8/2022 | Kim et al. |
| 11,411,408 | B2 | 8/2022 | Okabayashi et al. |
| 11,411,413 | B2 | 8/2022 | Yoon et al. |
| 11,417,892 | B2 | 8/2022 | Sakuma et al. |
| 11,417,930 | B2 | 8/2022 | Qin et al. |
| 11,420,315 | B2 | 8/2022 | Kneer et al. |
| 11,420,875 | B2 | 8/2022 | Liang et al. |
| 11,422,196 | B2 | 8/2022 | Kim |
| 11,424,436 | B2 | 8/2022 | Park et al. |
| 11,424,440 | B2 | 8/2022 | Shin et al. |
| 11,424,441 | B2 | 8/2022 | Cho et al. |
| 11,424,447 | B2 | 8/2022 | Park et al. |
| 11,424,474 | B2 | 8/2022 | Kim et al. |
| 11,424,488 | B2 | 8/2022 | Sato et al. |
| 11,424,495 | B2 | 8/2022 | Cho et al. |
| 11,424,500 | B2 | 8/2022 | Xing et al. |
| 11,424,501 | B2 | 8/2022 | Schoenherr et al. |
| 11,428,742 | B2 | 8/2022 | Park |
| 11,429,484 | B2 | 8/2022 | Ryu |
| 11,430,977 | B2 | 8/2022 | Youn et al. |
| 11,431,019 | B2 | 8/2022 | Park et al. |
| 11,431,025 | B2 | 8/2022 | Ahn et al. |
| 11,431,028 | B2 | 8/2022 | Lim et al. |
| 11,431,050 | B2 | 8/2022 | Fujishima et al. |
| 11,431,055 | B2 | 8/2022 | Chen et al. |
| 11,431,060 | B2 | 8/2022 | Schroeder et al. |
| 11,431,063 | B2 | 8/2022 | You et al. |
| D963,567 | S | 9/2022 | Kawase et al. |
| D963,577 | S | 9/2022 | Yun |
| 11,437,609 | B2 | 9/2022 | Baek et al. |
| 11,437,611 | B2 | 9/2022 | Kim et al. |
| 11,437,623 | B2 | 9/2022 | Shen et al. |
| 11,437,626 | B2 | 9/2022 | Yoon et al. |
| 11,437,646 | B2 | 9/2022 | Lee et al. |
| 11,437,650 | B2 | 9/2022 | Kim et al. |
| 11,437,654 | B2 | 9/2022 | Yamashima et al. |
| 11,437,657 | B2 | 9/2022 | Hauser et al. |
| 11,437,658 | B2 | 9/2022 | Hwang et al. |
| 11,437,660 | B2 | 9/2022 | Ju et al. |
| 11,437,668 | B2 | 9/2022 | Schmitt et al. |
| 11,437,669 | B2 | 9/2022 | Lee et al. |
| 11,437,672 | B2 | 9/2022 | Ruehle et al. |
| 11,437,673 | B2 | 9/2022 | Tian |
| 11,437,679 | B2 | 9/2022 | Bao et al. |
| 11,437,683 | B2 | 9/2022 | Lim et al. |
| 11,437,837 | B2 | 9/2022 | Hong et al. |
| 11,437,838 | B2 | 9/2022 | Du et al. |
| 11,437,840 | B2 | 9/2022 | Yamazoe et al. |
| 11,438,998 | B2 | 9/2022 | Lee et al. |
| 11,440,807 | B2 | 9/2022 | Eom et al. |
| 11,444,272 | B2 | 9/2022 | Ryu et al. |
| 11,444,275 | B2 | 9/2022 | Sung et al. |
| 11,444,278 | B2 | 9/2022 | Lim et al. |
| 11,444,284 | B2 | 9/2022 | Zhang et al. |
| 11,444,331 | B2 | 9/2022 | Yan et al. |
| 11,444,333 | B2 | 9/2022 | Zheng et al. |
| 11,444,349 | B2 | 9/2022 | An et al. |
| 11,444,357 | B2 | 9/2022 | Proell et al. |
| 11,448,683 | B2 | 9/2022 | Du et al. |
| 11,450,855 | B2 | 9/2022 | Hong et al. |
| 11,450,896 | B2 | 9/2022 | Yang et al. |
| 11,453,311 | B2 | 9/2022 | Huang et al. |
| 11,454,250 | B2 | 9/2022 | Fukunaga |
| 11,454,556 | B2 | 9/2022 | Yoon et al. |
| 11,454,676 | B2 | 9/2022 | Han |
| 11,456,445 | B2 | 9/2022 | Song |
| 11,456,446 | B2 | 9/2022 | Kim et al. |
| 11,456,461 | B2 | 9/2022 | Oda |
| 11,456,479 | B2 | 9/2022 | Han et al. |
| 11,456,493 | B2 | 9/2022 | Han et al. |
| 11,456,500 | B2 | 9/2022 | Chi et al. |
| 11,456,501 | B2 | 9/2022 | Zeng et al. |
| 11,456,502 | B2 | 9/2022 | Shin et al. |
| RE49,245 | E | 10/2022 | Kim et al. |
| 11,462,801 | B2 | 10/2022 | Lee |
| 11,467,212 | B2 | 10/2022 | Ham |
| 11,469,409 | B2 | 10/2022 | Wang et al. |
| 11,469,412 | B2 | 10/2022 | Yoon et al. |
| 11,469,418 | B2 | 10/2022 | Wang et al. |
| 11,469,451 | B2 | 10/2022 | Bossi |
| 11,469,469 | B2 | 10/2022 | Bao et al. |
| 11,469,472 | B2 | 10/2022 | An |
| 11,469,480 | B2 | 10/2022 | Kim |
| 11,469,481 | B2 | 10/2022 | Xu et al. |
| 11,471,715 | B2 | 10/2022 | Park et al. |
| 11,473,977 | B2 | 10/2022 | Lee et al. |
| 11,474,491 | B2 | 10/2022 | Song et al. |
| 11,476,453 | B2 | 10/2022 | Piao et al. |
| 11,476,454 | B2 | 10/2022 | Hao et al. |
| 11,476,456 | B2 | 10/2022 | Jo et al. |
| 11,476,457 | B2 | 10/2022 | Liang et al. |
| 11,476,458 | B2 | 10/2022 | Kim et al. |
| 11,476,459 | B2 | 10/2022 | Lim et al. |
| 11,476,466 | B2 | 10/2022 | Jeon et al. |
| 11,476,468 | B2 | 10/2022 | Kim et al. |
| 11,476,469 | B2 | 10/2022 | Liang et al. |
| 11,476,498 | B2 | 10/2022 | Ryu et al. |
| 11,476,499 | B2 | 10/2022 | Lim et al. |
| 11,476,500 | B2 | 10/2022 | Kim et al. |
| 11,476,512 | B2 | 10/2022 | Choi |
| 11,476,519 | B2 | 10/2022 | Kim et al. |
| 11,476,523 | B2 | 10/2022 | Kim et al. |
| 11,476,526 | B2 | 10/2022 | Hu et al. |
| 11,476,533 | B2 | 10/2022 | Huang et al. |
| 11,476,546 | B2 | 10/2022 | Park et al. |
| 11,476,548 | B2 | 10/2022 | Cho et al. |
| 11,476,681 | B2 | 10/2022 | Hong et al. |
| 11,476,682 | B2 | 10/2022 | Weiderstrand et al. |
| 11,477,282 | B2 | 10/2022 | Bringfeldt |
| 11,480,615 | B2 | 10/2022 | Lee |
| 11,482,728 | B2 | 10/2022 | Lee et al. |
| 11,486,935 | B2 | 11/2022 | Behrendt et al. |
| 11,489,231 | B2 | 11/2022 | Li et al. |
| 11,491,634 | B2 | 11/2022 | Schadow et al. |
| 11,495,838 | B2 | 11/2022 | Becker et al. |
| 11,495,840 | B2 | 11/2022 | Willgert et al. |
| 11,495,844 | B2 | 11/2022 | Sedlmayr et al. |
| 11,495,859 | B2 | 11/2022 | Schmitt et al. |
| 11,500,036 | B2 | 11/2022 | Klee et al. |
| 11,502,328 | B2 | 11/2022 | Xu et al. |
| 11,502,381 | B2 | 11/2022 | Kolb |
| 11,506,715 | B2 | 11/2022 | Song |
| 11,506,721 | B2 | 11/2022 | Park et al. |
| 11,509,015 | B2 | 11/2022 | Ishida et al. |
| 11,513,139 | B2 | 11/2022 | Ock et al. |

(56) References Cited

U.S. PATENT DOCUMENTS

| | | | |
|---|---|---|---|
| 11,515,571 B2 | 11/2022 | Subbaraman et al. |
| 11,515,573 B2 | 11/2022 | Mailoa et al. |
| 11,515,577 B2 | 11/2022 | Yun |
| 11,515,587 B2 | 11/2022 | Stewart et al. |
| D971,825 S | 12/2022 | Zivanovic |
| D971,826 S | 12/2022 | Zivanovic |
| D972,497 S | 12/2022 | Kawase et al. |
| 11,518,059 B2 | 12/2022 | Li et al. |
| 11,522,214 B2 | 12/2022 | Liang et al. |
| 11,522,219 B2 | 12/2022 | Lee et al. |
| 11,522,224 B2 | 12/2022 | Kim et al. |
| 11,522,376 B2 | 12/2022 | Inoue et al. |
| 11,527,752 B2 | 12/2022 | Wu et al. |
| 11,527,791 B2 | 12/2022 | Schmitt |
| 11,530,663 B2 | 12/2022 | Sigle et al. |
| 11,532,815 B2 | 12/2022 | Kim et al. |
| 11,539,047 B2 | 12/2022 | Otsuki et al. |
| 11,539,073 B2 | 12/2022 | Park et al. |
| 11,539,092 B2 | 12/2022 | Xie et al. |
| 11,539,099 B2 | 12/2022 | Kwon et al. |
| D974,288 S | 1/2023 | Koeniger et al. |
| 11,543,458 B2 | 1/2023 | Jan |
| 11,545,727 B2 | 1/2023 | Jang et al. |
| 11,548,405 B2 | 1/2023 | Huang et al. |
| 11,552,340 B2 | 1/2023 | Funk et al. |
| 11,552,366 B2 | 1/2023 | Katayama |
| 11,552,377 B2 | 1/2023 | Urano et al. |
| 11,552,378 B2 | 1/2023 | Kim et al. |
| 11,557,870 B2 | 1/2023 | Yamaguchi |
| 11,557,903 B2 | 1/2023 | Peng et al. |
| 11,563,240 B2 | 1/2023 | Chen et al. |
| 11,563,333 B2 | 1/2023 | Towner et al. |
| D977,415 S | 2/2023 | Sun et al. |
| 11,573,272 B2 | 2/2023 | Park et al. |
| 11,573,273 B2 | 2/2023 | Wei et al. |
| 11,577,290 B2 | 2/2023 | Park et al. |
| 11,577,376 B2 | 2/2023 | Tamura et al. |
| 11,579,206 B2 | 2/2023 | Nicklaus et al. |
| 11,581,534 B2 | 2/2023 | Gunji et al. |
| 11,581,579 B2 | 2/2023 | Li et al. |
| 11,581,587 B2 | 2/2023 | Cao et al. |
| 11,581,590 B2 | 2/2023 | Choi |
| 11,581,610 B2 | 2/2023 | Zeng et al. |
| 11,588,183 B2 | 2/2023 | Botadra et al. |
| 11,588,193 B2 | 2/2023 | Jeon et al. |
| 11,592,819 B2 | 2/2023 | Pjevach |
| 11,594,749 B2 | 2/2023 | Albertus et al. |
| 11,594,776 B2 | 2/2023 | Yoo et al. |
| 11,597,071 B2 | 3/2023 | Schadow et al. |
| 11,597,115 B2 | 3/2023 | Wi et al. |
| 11,598,819 B2 | 3/2023 | Imre |
| 11,600,816 B2 | 3/2023 | Guo et al. |
| 11,600,869 B2 | 3/2023 | Sauerteig et al. |
| 11,600,872 B2 | 3/2023 | Droigk et al. |
| 11,600,881 B2 | 3/2023 | Kopp et al. |
| 11,600,884 B2 | 3/2023 | Lu |
| 11,603,427 B2 | 3/2023 | Cho et al. |
| 11,603,451 B2 | 3/2023 | Cho et al. |
| 11,605,818 B2 | 3/2023 | Isaka et al. |
| 11,605,961 B2 | 3/2023 | Towner et al. |
| 11,611,116 B2 | 3/2023 | Chen et al. |
| 11,611,125 B2 | 3/2023 | Shin et al. |
| 11,614,494 B2 | 3/2023 | Hao et al. |
| 11,616,269 B2 | 3/2023 | Lee et al. |
| 11,616,276 B2 | 3/2023 | Gyoda |
| 11,618,100 B2 | 4/2023 | Bantel et al. |
| 11,626,642 B2 | 4/2023 | Zeiler et al. |
| 11,626,643 B2 | 4/2023 | Schmitt et al. |
| 11,626,743 B2 | 4/2023 | Zugen et al. |
| 11,628,742 B2 | 4/2023 | Kaderabek |
| 11,631,839 B2 | 4/2023 | Cho et al. |
| 11,631,896 B2 | 4/2023 | Ha et al. |
| 11,631,904 B2 | 4/2023 | Gross et al. |
| 11,631,912 B2 | 4/2023 | Hori |
| 11,633,923 B2 | 4/2023 | Choi |
| 11,637,274 B2 | 4/2023 | Ahn et al. |
| 11,637,335 B2 | 4/2023 | Ahn |
| 11,637,340 B2 | 4/2023 | Marx et al. |
| 11,637,347 B2 | 4/2023 | Liu et al. |
| 11,637,433 B2 | 4/2023 | Yamaguchi et al. |
| 11,638,948 B2 | 5/2023 | Kotik et al. |
| 11,639,241 B2 | 5/2023 | Willner et al. |
| 11,641,043 B2 | 5/2023 | Liu et al. |
| 11,641,120 B2 | 5/2023 | Okuoka et al. |
| 11,642,952 B2 | 5/2023 | Zeiler et al. |
| 11,646,412 B2 | 5/2023 | Toyama et al. |
| 11,646,424 B2 | 5/2023 | Liu et al. |
| 11,646,457 B2 | 5/2023 | Park et al. |
| 11,646,468 B2 | 5/2023 | Zhang et al. |
| 11,646,527 B2 | 5/2023 | Masatoshi et al. |
| 11,646,590 B2 | 5/2023 | Ota et al. |
| 11,646,593 B2 | 5/2023 | Stickel |
| 11,646,596 B2 | 5/2023 | Stellnert et al. |
| 11,648,654 B2 | 5/2023 | Bakker |
| 11,648,656 B2 | 5/2023 | Shimizu |
| 11,652,208 B2 | 5/2023 | Kim et al. |
| 11,652,258 B2 | 5/2023 | Myung |
| 11,658,329 B2 | 5/2023 | Li et al. |
| 11,658,342 B2 | 5/2023 | Shin et al. |
| 11,664,485 B2 | 5/2023 | Kang et al. |
| 11,664,528 B2 | 5/2023 | Lin et al. |
| 11,664,551 B2 | 5/2023 | Hamamoto et al. |
| 11,664,555 B2 | 5/2023 | Shi et al. |
| 11,670,800 B2 | 6/2023 | Park et al. |
| 11,675,014 B2 | 6/2023 | Iwata |
| 11,677,074 B2 | 6/2023 | Li et al. |
| 11,677,116 B2 | 6/2023 | Nagahama et al. |
| 11,682,767 B2 | 6/2023 | Lin et al. |
| 11,682,811 B2 | 6/2023 | Ahn et al. |
| 11,828,806 B2 | 11/2023 | Yun |
| 11,830,987 B2 | 11/2023 | Moon et al. |
| 11,855,277 B2 | 12/2023 | Wang et al. |
| D1,016,003 S | 2/2024 | Aoki et al. |
| 11,916,238 B2 | 2/2024 | Kim et al. |
| 11,923,515 B2 | 3/2024 | Fauteux et al. |
| 11,936,057 B2 | 3/2024 | Lee |
| D1,024,928 S | 4/2024 | Shi |
| 11,955,665 B2 | 4/2024 | Heo et al. |
| 11,984,608 B2 | 5/2024 | Sun et al. |
| 11,999,264 B2 | 6/2024 | Kim |
| 12,002,931 B2 | 6/2024 | Yang et al. |
| 12,002,947 B2 | 6/2024 | Guan et al. |
| 12,013,441 B2 | 6/2024 | Lim |
| 12,021,270 B2 | 6/2024 | Yuan |
| 12,038,269 B2 | 7/2024 | Choi et al. |
| 12,040,647 B2 | 7/2024 | Lee |
| 12,074,342 B2 | 8/2024 | Jeong et al. |
| 12,101,830 B2 | 9/2024 | Yamaguchi et al. |
| D1,047,895 S | 10/2024 | Chen |
| 12,119,697 B2 | 10/2024 | Zhao et al. |
| 12,132,207 B2 | 10/2024 | Ha et al. |
| 12,132,215 B2 | 10/2024 | Lim et al. |
| 12,132,226 B2 | 10/2024 | Lan et al. |
| 12,170,386 B2 | 12/2024 | Dong et al. |
| 12,176,475 B2 | 12/2024 | Kim |
| 12,181,528 B2 | 12/2024 | Jo et al. |
| 12,181,532 B2 | 12/2024 | Chae et al. |
| 12,191,482 B2 | 1/2025 | Liang et al. |
| 12,199,298 B2 | 1/2025 | Zhu et al. |
| 12,199,421 B2 | 1/2025 | Hwang et al. |
| 12,218,335 B2 | 2/2025 | Kim et al. |
| D1,089,065 S | 8/2025 | Cheng |
| 2001/0001533 A1 | 5/2001 | Stuck Andersen et al. |
| 2001/0017531 A1 | 8/2001 | Sakakibara et al. |
| 2003/0027036 A1 | 2/2003 | Emori et al. |
| 2003/0059673 A1 | 3/2003 | Langan et al. |
| 2003/0090239 A1 | 5/2003 | Sakakibara |
| 2004/0009403 A1 | 1/2004 | Kim et al. |
| 2004/0038123 A1 | 2/2004 | Hisamitsu et al. |
| 2004/0145344 A1 | 7/2004 | Bushong et al. |
| 2005/0073282 A1 | 4/2005 | Carrier et al. |
| 2005/0237028 A1 | 10/2005 | Denning |
| 2006/0147792 A1 | 7/2006 | Nelson et al. |
| 2006/0238162 A1 | 10/2006 | Cheon et al. |

(56) References Cited

U.S. PATENT DOCUMENTS

| | | |
|---|---|---|
| 2006/0269802 A1 | 11/2006 | Yamaki et al. |
| 2007/0072066 A1 | 3/2007 | Yoon et al. |
| 2008/0003491 A1 | 1/2008 | Yahnker et al. |
| 2008/0118821 A1 | 5/2008 | Gehring et al. |
| 2008/0193830 A1 | 8/2008 | Buck et al. |
| 2008/0233475 A1 | 9/2008 | Kozu et al. |
| 2008/0304199 A1 | 12/2008 | Cruise et al. |
| 2008/0318122 A1 | 12/2008 | Sun |
| 2009/0092859 A1 | 4/2009 | Kim |
| 2009/0102416 A1 | 4/2009 | Burley |
| 2009/0139781 A1 | 6/2009 | Straubel |
| 2009/0146614 A1 | 6/2009 | Carrier et al. |
| 2009/0186169 A1 | 7/2009 | Shacklette et al. |
| 2009/0208828 A1 | 8/2009 | Kanai et al. |
| 2009/0284170 A1 | 11/2009 | West |
| 2009/0286143 A1 | 11/2009 | Matthias et al. |
| 2009/0311589 A1 | 12/2009 | Kim et al. |
| 2010/0013394 A1 | 1/2010 | West |
| 2010/0028766 A1 | 2/2010 | Peckerar et al. |
| 2010/0104935 A1 | 4/2010 | Hermann et al. |
| 2010/0112424 A1 | 5/2010 | Hayashi |
| 2010/0124692 A1 | 5/2010 | Schiestl |
| 2010/0143770 A1 | 6/2010 | Onnerud et al. |
| 2010/0159306 A1 | 6/2010 | Leuthner |
| 2010/0203368 A1 | 8/2010 | Matthias |
| 2010/0209759 A1 | 8/2010 | Rejman et al. |
| 2010/0248010 A1 | 9/2010 | Butt et al. |
| 2010/0248029 A1 | 9/2010 | Butt et al. |
| 2010/0251540 A1 | 10/2010 | Seo |
| 2011/0042117 A1 | 2/2011 | Doege et al. |
| 2011/0097623 A1 | 4/2011 | Marinis, Jr. et al. |
| 2011/0121783 A1* | 5/2011 | Boyles .................. H02J 7/0013 |
| | | 320/113 |
| 2011/0147031 A1 | 6/2011 | Matthias et al. |
| 2011/0159350 A1 | 6/2011 | Ochi |
| 2011/0169457 A1 | 7/2011 | Mitani et al. |
| 2011/0177373 A1 | 7/2011 | Pellenc |
| 2011/0189507 A1 | 8/2011 | Reis et al. |
| 2011/0189512 A1 | 8/2011 | Onnerud et al. |
| 2011/0244283 A1 | 10/2011 | Seto et al. |
| 2011/0244287 A1 | 10/2011 | Kim et al. |
| 2012/0002805 A1 | 1/2012 | Scheidt et al. |
| 2012/0009455 A1 | 1/2012 | Yoon |
| 2012/0011715 A1 | 1/2012 | Shacklette et al. |
| 2012/0081076 A1 | 4/2012 | Fujimura et al. |
| 2012/0082888 A1 | 4/2012 | Hashimoto et al. |
| 2012/0091115 A1 | 4/2012 | Mironichev et al. |
| 2012/0156527 A1 | 6/2012 | Kataoka |
| 2012/0156537 A1 | 6/2012 | Meintschel et al. |
| 2012/0164520 A1 | 6/2012 | Choi |
| 2012/0169289 A1 | 7/2012 | Kim et al. |
| 2012/0171554 A1 | 7/2012 | Kim |
| 2012/0214055 A1 | 8/2012 | Schaefer et al. |
| 2012/0219839 A1 | 8/2012 | Kritzer et al. |
| 2012/0251866 A1 | 10/2012 | Matejek et al. |
| 2012/0312562 A1 | 12/2012 | Woehrle et al. |
| 2012/0315531 A1 | 12/2012 | Lev et al. |
| 2012/0328908 A1 | 12/2012 | Han et al. |
| 2013/0002175 A1 | 1/2013 | Shimizu et al. |
| 2013/0026978 A1 | 1/2013 | Cooley et al. |
| 2013/0043826 A1 | 2/2013 | Workman et al. |
| 2013/0059171 A1 | 3/2013 | Kim et al. |
| 2013/0071718 A1 | 3/2013 | Cho et al. |
| 2013/0098646 A1 | 4/2013 | Funabashi et al. |
| 2013/0108904 A1 | 5/2013 | Okabayashi |
| 2013/0113438 A1 | 5/2013 | Aradachi et al. |
| 2013/0136974 A1 | 5/2013 | Lim et al. |
| 2013/0147463 A1 | 6/2013 | Takase et al. |
| 2013/0164567 A1 | 6/2013 | Olsson et al. |
| 2013/0189560 A1 | 7/2013 | Widhalm |
| 2013/0196205 A1 | 8/2013 | Silk et al. |
| 2013/0207612 A1 | 8/2013 | Lev et al. |
| 2013/0230759 A1 | 9/2013 | Jeong et al. |
| 2013/0244091 A1 | 9/2013 | Gless et al. |
| 2013/0252047 A1 | 9/2013 | Park et al. |
| 2013/0266824 A1 | 10/2013 | Cowperthwaite et al. |
| 2013/0266825 A1 | 10/2013 | Cowperthwaite et al. |
| 2013/0266826 A1 | 10/2013 | Cowperthwaite et al. |
| 2013/0280588 A1 | 10/2013 | Feuerstack et al. |
| 2013/0335013 A1 | 12/2013 | Suzuki et al. |
| 2014/0002942 A1 | 1/2014 | Song et al. |
| 2014/0017537 A1 | 1/2014 | Lu et al. |
| 2014/0017541 A1 | 1/2014 | Suzuki |
| 2014/0017542 A1 | 1/2014 | Suzuki |
| 2014/0017556 A1 | 1/2014 | Liu et al. |
| 2014/0050946 A1 | 2/2014 | Byun |
| 2014/0070720 A1 | 3/2014 | West |
| 2014/0087231 A1 | 3/2014 | Schaefer et al. |
| 2014/0093753 A1 | 4/2014 | Scott et al. |
| 2014/0097797 A1 | 4/2014 | Hendrix et al. |
| 2014/0113165 A1 | 4/2014 | Silk et al. |
| 2014/0147718 A1 | 5/2014 | Furui et al. |
| 2014/0154535 A1 | 6/2014 | Olsson et al. |
| 2014/0174150 A1 | 6/2014 | Yajima |
| 2014/0182118 A1 | 7/2014 | Kim et al. |
| 2014/0186667 A1 | 7/2014 | Lee et al. |
| 2014/0186671 A1 | 7/2014 | Kim et al. |
| 2014/0192457 A1 | 7/2014 | Zhao |
| 2014/0193685 A1 | 7/2014 | Lim |
| 2014/0197803 A1 | 7/2014 | Ishikawa |
| 2014/0199584 A1 | 7/2014 | Kondo et al. |
| 2014/0220391 A1 | 8/2014 | Fujii et al. |
| 2014/0232326 A1 | 8/2014 | Wohltmann et al. |
| 2014/0272517 A1 | 9/2014 | Glasgow et al. |
| 2014/0295224 A1 | 10/2014 | Inoue |
| 2014/0363728 A1 | 12/2014 | Nishikawa et al. |
| 2015/0001987 A1 | 1/2015 | Masaki et al. |
| 2015/0037662 A1 | 2/2015 | Pinon et al. |
| 2015/0079451 A1 | 3/2015 | Jeong et al. |
| 2015/0118530 A1 | 4/2015 | Lee |
| 2015/0140412 A1 | 5/2015 | Zhong et al. |
| 2015/0147623 A1 | 5/2015 | Ramsayer |
| 2015/0162650 A1 | 6/2015 | Ahn et al. |
| 2015/0174455 A1 | 6/2015 | Isogawa et al. |
| 2015/0179989 A1 | 6/2015 | Luo et al. |
| 2015/0200553 A1* | 7/2015 | Endo ..................... H02J 7/0047 |
| | | 320/134 |
| 2015/0210548 A1 | 7/2015 | Brambilla et al. |
| 2015/0279578 A1 | 10/2015 | Martini et al. |
| 2015/0287961 A1 | 10/2015 | Signorelli et al. |
| 2015/0303417 A1 | 10/2015 | Koeder et al. |
| 2015/0333559 A1 | 11/2015 | Lohr et al. |
| 2015/0357684 A1* | 12/2015 | Willgert .............. H01M 50/213 |
| | | 320/112 |
| 2015/0380697 A1 | 12/2015 | Osborne et al. |
| 2015/0380710 A1 | 12/2015 | Morley et al. |
| 2015/0380778 A1 | 12/2015 | Kim et al. |
| 2016/0006014 A1 | 1/2016 | Kolden et al. |
| 2016/0015751 A1 | 1/2016 | Shiku et al. |
| 2016/0035467 A1 | 2/2016 | Haydin et al. |
| 2016/0056655 A1 | 2/2016 | Kaneda et al. |
| 2016/0079573 A1 | 3/2016 | Nelson et al. |
| 2016/0141728 A1 | 5/2016 | Fauteux et al. |
| 2016/0185251 A1 | 6/2016 | Stefanopoulou et al. |
| 2016/0193694 A1 | 7/2016 | Dinkleman |
| 2016/0218386 A1 | 7/2016 | Park et al. |
| 2016/0222631 A1 | 8/2016 | Kohno et al. |
| 2016/0254505 A1 | 9/2016 | Eom et al. |
| 2016/0294205 A1 | 10/2016 | Zimnicki et al. |
| 2016/0344059 A1 | 11/2016 | Mack et al. |
| 2016/0359151 A1 | 12/2016 | Beyerl et al. |
| 2017/0005325 A1 | 1/2017 | Verma et al. |
| 2017/0047614 A1 | 2/2017 | Sakai et al. |
| 2017/0110694 A1 | 4/2017 | Wang et al. |
| 2017/0110766 A1 | 4/2017 | Koebler |
| 2017/0125758 A1 | 5/2017 | Miller et al. |
| 2017/0194674 A1 | 7/2017 | Lee et al. |
| 2017/0256833 A1 | 9/2017 | Ciaccio et al. |
| 2017/0263972 A1 | 9/2017 | Rho et al. |
| 2017/0288192 A1 | 10/2017 | Chen et al. |
| 2017/0302091 A1 | 10/2017 | Schaedlich et al. |
| 2017/0316889 A1 | 11/2017 | Martini et al. |
| 2017/0317492 A1 | 11/2017 | Koebler |
| 2017/0324122 A1 | 11/2017 | Poirier et al. |

(56) References Cited

U.S. PATENT DOCUMENTS

| | | | |
|---|---|---|---|
| 2017/0331083 A1 | 11/2017 | Koenig et al. | |
| 2017/0346047 A1 | 11/2017 | Muroi | |
| 2017/0346140 A1 | 11/2017 | Koebler | |
| 2017/0365880 A1 | 12/2017 | Zou et al. | |
| 2018/0040864 A1 | 2/2018 | Rejman et al. | |
| 2018/0069208 A1 | 3/2018 | Rejman et al. | |
| 2018/0069220 A1 | 3/2018 | Yuan et al. | |
| 2018/0097257 A1 | 4/2018 | Soares et al. | |
| 2018/0097390 A1 | 4/2018 | Kube | |
| 2018/0114657 A1* | 4/2018 | Park | H01H 85/20 |
| 2018/0145303 A1 | 5/2018 | Schulz et al. | |
| 2018/0166895 A1 | 6/2018 | Oh et al. | |
| 2018/0175343 A1 | 6/2018 | Choi et al. | |
| 2018/0175345 A1 | 6/2018 | Schmid-Schoenbein | |
| 2018/0175434 A1 | 6/2018 | Zhamu et al. | |
| 2018/0190960 A1 | 7/2018 | Harris et al. | |
| 2018/0198291 A1 | 7/2018 | Kuo et al. | |
| 2018/0198294 A1* | 7/2018 | Sheeks | H02J 7/007194 |
| 2018/0248160 A1 | 8/2018 | Lee | |
| 2018/0269703 A1 | 9/2018 | Nook et al. | |
| 2018/0277801 A1 | 9/2018 | Brozek et al. | |
| 2018/0277810 A1 | 9/2018 | Sweney et al. | |
| 2018/0287223 A1 | 10/2018 | Meng et al. | |
| 2018/0301913 A1 | 10/2018 | Irish et al. | |
| 2018/0323474 A1 | 11/2018 | Liu et al. | |
| 2018/0342891 A1 | 11/2018 | Nook et al. | |
| 2018/0345803 A1 | 12/2018 | Nook et al. | |
| 2018/0366280 A1 | 12/2018 | Hwang et al. | |
| 2018/0372054 A1 | 12/2018 | Chen | |
| 2018/0375176 A1 | 12/2018 | Sakabe et al. | |
| 2019/0020012 A1 | 1/2019 | Ju et al. | |
| 2019/0020079 A1 | 1/2019 | Lee et al. | |
| 2019/0044110 A1 | 2/2019 | Sheeks et al. | |
| 2019/0058171 A1 | 2/2019 | Rejman | |
| 2019/0067651 A1 | 2/2019 | Li et al. | |
| 2019/0067958 A1 | 2/2019 | Zimnicki et al. | |
| 2019/0077275 A1 | 3/2019 | Capati et al. | |
| 2019/0173305 A1 | 6/2019 | Nook et al. | |
| 2019/0198909 A1 | 6/2019 | Qiu et al. | |
| 2019/0198952 A1 | 6/2019 | Choi et al. | |
| 2019/0222038 A1 | 7/2019 | Chen | |
| 2019/0229321 A1 | 7/2019 | Liu et al. | |
| 2019/0232456 A1 | 8/2019 | Sugita | |
| 2019/0237820 A1 | 8/2019 | Amemiya et al. | |
| 2019/0259984 A1 | 8/2019 | Nishikawa et al. | |
| 2019/0260209 A1 | 8/2019 | Nishikawa et al. | |
| 2019/0267589 A1 | 8/2019 | Stickel et al. | |
| 2019/0280265 A1 | 9/2019 | Jansen et al. | |
| 2019/0296304 A1 | 9/2019 | Sodeyama | |
| 2019/0305281 A1 | 10/2019 | Hale | |
| 2019/0308518 A1 | 10/2019 | Nook et al. | |
| 2019/0312242 A1 | 10/2019 | Barton et al. | |
| 2019/0372067 A1 | 12/2019 | Fieldbinder et al. | |
| 2020/0013997 A1 | 1/2020 | Kato et al. | |
| 2020/0014056 A1 | 1/2020 | Park et al. | |
| 2020/0020488 A1 | 1/2020 | Martini et al. | |
| 2020/0020906 A1 | 1/2020 | Kim et al. | |
| 2020/0028149 A1 | 1/2020 | Choi et al. | |
| 2020/0036045 A1 | 1/2020 | Sodeyama | |
| 2020/0044283 A1 | 2/2020 | Okamoto et al. | |
| 2020/0052257 A1 | 2/2020 | Stanton et al. | |
| 2020/0067037 A1 | 2/2020 | Zeng et al. | |
| 2020/0091793 A1 | 3/2020 | Smith et al. | |
| 2020/0127350 A1 | 4/2020 | Lee et al. | |
| 2020/0144576 A1 | 5/2020 | Yoshida et al. | |
| 2020/0144618 A1 | 5/2020 | Lee et al. | |
| 2020/0144624 A1 | 5/2020 | Zheng et al. | |
| 2020/0144666 A1 | 5/2020 | Choi et al. | |
| 2020/0149779 A1* | 5/2020 | Castaneda | F24H 15/281 |
| 2020/0154962 A1 | 5/2020 | Fie et al. | |
| 2020/0161609 A1 | 5/2020 | Murakami et al. | |
| 2020/0161712 A1 | 5/2020 | Kim | |
| 2020/0162007 A1 | 5/2020 | Sheeks et al. | |
| 2020/0168855 A1 | 5/2020 | Hwang et al. | |
| 2020/0168860 A1 | 5/2020 | Enomoto et al. | |
| 2020/0168959 A1 | 5/2020 | Hettrich | |
| 2020/0168966 A1 | 5/2020 | Hong et al. | |
| 2020/0176745 A1 | 6/2020 | Lee | |
| 2020/0176834 A1 | 6/2020 | Murakami et al. | |
| 2020/0185690 A1 | 6/2020 | Kim et al. | |
| 2020/0185787 A1 | 6/2020 | Ming et al. | |
| 2020/0185935 A1 | 6/2020 | Nook et al. | |
| 2020/0194743 A1 | 6/2020 | Wang et al. | |
| 2020/0194750 A1 | 6/2020 | Kawano | |
| 2020/0194753 A1 | 6/2020 | Fujiwara et al. | |
| 2020/0194817 A1 | 6/2020 | Wang et al. | |
| 2020/0203682 A1 | 6/2020 | Bannai | |
| 2020/0203700 A1 | 6/2020 | Park et al. | |
| 2020/0203971 A1 | 6/2020 | Nook et al. | |
| 2020/0212444 A1 | 7/2020 | Lee et al. | |
| 2020/0212494 A1 | 7/2020 | Kim et al. | |
| 2020/0212692 A1 | 7/2020 | Nook et al. | |
| 2020/0215680 A1 | 7/2020 | Meixner et al. | |
| 2020/0215926 A1 | 7/2020 | Nook et al. | |
| 2020/0220126 A1 | 7/2020 | Sakurai | |
| 2020/0220163 A1 | 7/2020 | Li et al. | |
| 2020/0235638 A1 | 7/2020 | Velderman | |
| 2020/0251695 A1 | 8/2020 | Keum | |
| 2020/0266424 A1 | 8/2020 | Choi et al. | |
| 2020/0273632 A1 | 8/2020 | Signorelli et al. | |
| 2020/0274204 A1 | 8/2020 | Dawley | |
| 2020/0280052 A1 | 9/2020 | Cho et al. | |
| 2020/0280109 A1 | 9/2020 | Nam et al. | |
| 2020/0287178 A1 | 9/2020 | Jia et al. | |
| 2020/0295314 A1 | 9/2020 | Goto et al. | |
| 2020/0295358 A1 | 9/2020 | Chae et al. | |
| 2020/0295575 A1 | 9/2020 | Nook et al. | |
| 2020/0295579 A1 | 9/2020 | Wohltmann et al. | |
| 2020/0303786 A1 | 9/2020 | Hong et al. | |
| 2020/0313173 A1 | 10/2020 | Oh et al. | |
| 2020/0317068 A1 | 10/2020 | Nook et al. | |
| 2020/0321660 A1 | 10/2020 | Zeng et al. | |
| 2020/0328054 A1 | 10/2020 | Hanna et al. | |
| 2020/0328486 A1 | 10/2020 | Kwon et al. | |
| 2020/0331187 A1 | 10/2020 | Suh et al. | |
| 2020/0335745 A1 | 10/2020 | Hou et al. | |
| 2020/0335783 A1 | 10/2020 | Lee et al. | |
| 2020/0343541 A1 | 10/2020 | Yoo et al. | |
| 2020/0350612 A1 | 11/2020 | Xu et al. | |
| 2020/0358053 A1 | 11/2020 | Sauerteig et al. | |
| 2020/0358054 A1 | 11/2020 | Sauerteig et al. | |
| 2020/0358055 A1 | 11/2020 | Sauerteig et al. | |
| 2020/0358060 A1 | 11/2020 | Sauerteig et al. | |
| 2020/0365956 A1 | 11/2020 | Jeon et al. | |
| 2020/0386200 A1 | 12/2020 | Butler et al. | |
| 2020/0388798 A1 | 12/2020 | Wang et al. | |
| 2020/0395641 A1 | 12/2020 | Suzuki et al. | |
| 2020/0395779 A1 | 12/2020 | Nam et al. | |
| 2020/0411826 A1 | 12/2020 | Lee et al. | |
| 2020/0411834 A1 | 12/2020 | Chen et al. | |
| 2020/0411907 A1 | 12/2020 | Park et al. | |
| 2020/0411916 A1 | 12/2020 | Nam et al. | |
| 2021/0005874 A1 | 1/2021 | Park et al. | |
| 2021/0013459 A1 | 1/2021 | Xie et al. | |
| 2021/0013538 A1 | 1/2021 | Chen et al. | |
| 2021/0013558 A1 | 1/2021 | Mir | |
| 2021/0013726 A1 | 1/2021 | Hill | |
| 2021/0020881 A1 | 1/2021 | Hilligoss et al. | |
| 2021/0020891 A1 | 1/2021 | Min et al. | |
| 2021/0021007 A1 | 1/2021 | Park et al. | |
| 2021/0028412 A1 | 1/2021 | Voigt et al. | |
| 2021/0028438 A1 | 1/2021 | Lee et al. | |
| 2021/0028498 A1 | 1/2021 | Mo et al. | |
| 2021/0031640 A1 | 2/2021 | Nook et al. | |
| 2021/0036297 A1 | 2/2021 | Kim | |
| 2021/0036307 A1 | 2/2021 | Park et al. | |
| 2021/0044123 A1 | 2/2021 | Miller et al. | |
| 2021/0050566 A1 | 2/2021 | Wang et al. | |
| 2021/0050617 A1 | 2/2021 | Wang et al. | |
| 2021/0054818 A1 | 2/2021 | Nook et al. | |
| 2021/0057683 A1 | 2/2021 | Sasaki et al. | |
| 2021/0057711 A1 | 2/2021 | Yang | |
| 2021/0066682 A1 | 3/2021 | Chen et al. | |
| 2021/0066689 A1 | 3/2021 | Lee et al. | |

(56) References Cited

U.S. PATENT DOCUMENTS

| | | | |
|---|---|---|---|
| 2021/0074963 A1 | 3/2021 | Zhang et al. | |
| 2021/0075066 A1 | 3/2021 | Jin et al. | |
| 2021/0075067 A1 | 3/2021 | Yoon | |
| 2021/0075235 A1 | 3/2021 | Nook et al. | |
| 2021/0080332 A1 | 3/2021 | Jang | |
| 2021/0091363 A1 | 3/2021 | Lane | |
| 2021/0091428 A1 | 3/2021 | Naito et al. | |
| 2021/0091435 A1 | 3/2021 | Muraki | |
| 2021/0091437 A1 | 3/2021 | Chen et al. | |
| 2021/0091578 A1 | 3/2021 | Miller et al. | |
| 2021/0094428 A1 | 4/2021 | Nook et al. | |
| 2021/0098755 A1 | 4/2021 | Nagahama et al. | |
| 2021/0098756 A1 | 4/2021 | Naito et al. | |
| 2021/0098757 A1 | 4/2021 | Nagahama | |
| 2021/0098767 A1 | 4/2021 | Kim | |
| 2021/0099055 A1* | 4/2021 | Wachter | H02K 11/0094 |
| 2021/0104781 A1 | 4/2021 | Fu et al. | |
| 2021/0104802 A1 | 4/2021 | Shin et al. | |
| 2021/0111442 A1 | 4/2021 | Cao et al. | |
| 2021/0111458 A1 | 4/2021 | Chen et al. | |
| 2021/0111467 A1 | 4/2021 | Gao et al. | |
| 2021/0111649 A1 | 4/2021 | Shook et al. | |
| 2021/0113871 A1 | 4/2021 | Huang et al. | |
| 2021/0119216 A1 | 4/2021 | Kim | |
| 2021/0119258 A1 | 4/2021 | Zou et al. | |
| 2021/0119262 A1 | 4/2021 | Chen et al. | |
| 2021/0119288 A1 | 4/2021 | Lei et al. | |
| 2021/0119298 A1 | 4/2021 | Chen et al. | |
| 2021/0126313 A1 | 4/2021 | Lee et al. | |
| 2021/0126317 A1 | 4/2021 | Wang et al. | |
| 2021/0126324 A1 | 4/2021 | Xie et al. | |
| 2021/0126325 A1 | 4/2021 | Zhang et al. | |
| 2021/0135180 A1 | 5/2021 | Kang | |
| 2021/0135238 A1 | 5/2021 | Jin et al. | |
| 2021/0135289 A1 | 5/2021 | Yi et al. | |
| 2021/0135310 A1 | 5/2021 | Huang et al. | |
| 2021/0135321 A1 | 5/2021 | Chen | |
| 2021/0135323 A1 | 5/2021 | Zhang | |
| 2021/0143466 A1 | 5/2021 | Shin | |
| 2021/0143517 A1 | 5/2021 | Lepiorz et al. | |
| 2021/0151804 A1 | 5/2021 | You et al. | |
| 2021/0151821 A1 | 5/2021 | Shim | |
| 2021/0155096 A1 | 5/2021 | Nook et al. | |
| 2021/0159568 A1 | 5/2021 | Kim et al. | |
| 2021/0167362 A1 | 6/2021 | Park et al. | |
| 2021/0175562 A1 | 6/2021 | Birkholz et al. | |
| 2021/0181258 A1 | 6/2021 | Li et al. | |
| 2021/0184218 A1 | 6/2021 | Ahn et al. | |
| 2021/0184473 A1 | 6/2021 | Geng | |
| 2021/0194048 A1 | 6/2021 | Taniuchi et al. | |
| 2021/0194052 A1 | 6/2021 | Oh et al. | |
| 2021/0194069 A1 | 6/2021 | Hamblin et al. | |
| 2021/0194081 A1 | 6/2021 | Jiang et al. | |
| 2021/0194267 A1 | 6/2021 | Shin et al. | |
| 2021/0202977 A1 | 7/2021 | Su et al. | |
| 2021/0202998 A1 | 7/2021 | Liang et al. | |
| 2021/0210825 A1 | 7/2021 | Lepiorz et al. | |
| 2021/0218072 A1 | 7/2021 | Lepiorz et al. | |
| 2021/0218100 A1 | 7/2021 | Shao et al. | |
| 2021/0218259 A1 | 7/2021 | Jeong et al. | |
| 2021/0221213 A1 | 7/2021 | Maskew et al. | |
| 2021/0226205 A1 | 7/2021 | Park et al. | |
| 2021/0234160 A1 | 7/2021 | Kim et al. | |
| 2021/0234225 A1 | 7/2021 | Takeda | |
| 2021/0234381 A1 | 7/2021 | Sheeks et al. | |
| 2021/0242437 A1 | 8/2021 | Kim et al. | |
| 2021/0242446 A1 | 8/2021 | Jin et al. | |
| 2021/0242506 A1 | 8/2021 | Zhang et al. | |
| 2021/0242525 A1 | 8/2021 | Lee et al. | |
| 2021/0242534 A1 | 8/2021 | Kim et al. | |
| 2021/0249722 A1 | 8/2021 | Dong et al. | |
| 2021/0249741 A1 | 8/2021 | Lepiorz et al. | |
| 2021/0265630 A1 | 8/2021 | Choi et al. | |
| 2021/0265707 A1 | 8/2021 | Jung et al. | |
| 2021/0273296 A1 | 9/2021 | Kim et al. | |
| 2021/0280926 A1 | 9/2021 | Jansen et al. | |
| 2021/0286664 A1 | 9/2021 | Hwang et al. | |
| 2021/0288362 A1 | 9/2021 | Churchill | |
| 2021/0288385 A1 | 9/2021 | Jin et al. | |
| 2021/0296682 A1 | 9/2021 | Fauteux et al. | |
| 2021/0296913 A1 | 9/2021 | Nook et al. | |
| 2021/0299779 A1 | 9/2021 | Jung et al. | |
| 2021/0299801 A1 | 9/2021 | Kim et al. | |
| 2021/0305651 A1 | 9/2021 | You et al. | |
| 2021/0313587 A1 | 10/2021 | Kwon et al. | |
| 2021/0313654 A1 | 10/2021 | Xu et al. | |
| 2021/0313664 A1 | 10/2021 | Park et al. | |
| 2021/0320385 A1 | 10/2021 | Kim et al. | |
| 2021/0320509 A1 | 10/2021 | Irish et al. | |
| 2021/0328206 A1 | 10/2021 | Jung et al. | |
| 2021/0328213 A1 | 10/2021 | Kim et al. | |
| 2021/0328254 A1 | 10/2021 | Choi et al. | |
| 2021/0328272 A1 | 10/2021 | Von Emden et al. | |
| 2021/0328284 A1 | 10/2021 | Kim | |
| 2021/0328290 A1 | 10/2021 | Lee et al. | |
| 2021/0336244 A1 | 10/2021 | Kang et al. | |
| 2021/0336309 A1 | 10/2021 | Min et al. | |
| 2021/0344014 A1 | 11/2021 | Park et al. | |
| 2021/0344057 A1 | 11/2021 | Seo et al. | |
| 2021/0344070 A1 | 11/2021 | Koetting et al. | |
| 2021/0344074 A1 | 11/2021 | Jung et al. | |
| 2021/0351455 A1 | 11/2021 | Kim et al. | |
| 2021/0351463 A1 | 11/2021 | Park et al. | |
| 2021/0351468 A1 | 11/2021 | Hur et al. | |
| 2021/0354592 A1 | 11/2021 | Zuo et al. | |
| 2021/0359370 A1 | 11/2021 | Wang et al. | |
| 2021/0367263 A1 | 11/2021 | Lee et al. | |
| 2021/0367265 A1 | 11/2021 | Sugiyo | |
| 2021/0367271 A1 | 11/2021 | Wang et al. | |
| 2021/0367284 A1 | 11/2021 | Baumgartner et al. | |
| 2021/0367302 A1 | 11/2021 | Reese et al. | |
| 2021/0370796 A1 | 12/2021 | Seo | |
| 2021/0376395 A1 | 12/2021 | Hermann et al. | |
| 2021/0384577 A1 | 12/2021 | Wyatt et al. | |
| 2021/0399387 A1 | 12/2021 | Huang et al. | |
| 2021/0408600 A1 | 12/2021 | Cui et al. | |
| 2021/0408628 A1 | 12/2021 | Liu et al. | |
| 2021/0408629 A1 | 12/2021 | Yang et al. | |
| 2021/0408640 A1 | 12/2021 | Yang et al. | |
| 2022/0003825 A1 | 1/2022 | Horie | |
| 2022/0006314 A1 | 1/2022 | Lim et al. | |
| 2022/0013830 A1 | 1/2022 | Kuwabara et al. | |
| 2022/0013843 A1 | 1/2022 | Fukuda | |
| 2022/0013851 A1 | 1/2022 | Zeng et al. | |
| 2022/0013855 A1 | 1/2022 | Zhao et al. | |
| 2022/0013856 A1 | 1/2022 | Zeng et al. | |
| 2022/0013870 A1 | 1/2022 | Kim et al. | |
| 2022/0021034 A1 | 1/2022 | Wang et al. | |
| 2022/0021060 A1 | 1/2022 | Yoo et al. | |
| 2022/0021068 A1 | 1/2022 | Zeng et al. | |
| 2022/0021085 A1 | 1/2022 | Xie et al. | |
| 2022/0021091 A1 | 1/2022 | Yuan | |
| 2022/0029190 A1 | 1/2022 | Hukan | |
| 2022/0029212 A1 | 1/2022 | Armacost | |
| 2022/0029214 A1 | 1/2022 | Nakatani et al. | |
| 2022/0029239 A1 | 1/2022 | Fukushima | |
| 2022/0034843 A1 | 2/2022 | Kim et al. | |
| 2022/0037701 A1 | 2/2022 | Kim | |
| 2022/0037714 A1 | 2/2022 | Lee | |
| 2022/0037725 A1 | 2/2022 | Stanger | |
| 2022/0042945 A1 | 2/2022 | Nakazawa et al. | |
| 2022/0045373 A1 | 2/2022 | Yoon et al. | |
| 2022/0045384 A1 | 2/2022 | Delioussine et al. | |
| 2022/0045385 A1 | 2/2022 | Delioussine et al. | |
| 2022/0045394 A1 | 2/2022 | Osborne et al. | |
| 2022/0049467 A1 | 2/2022 | Hirose et al. | |
| 2022/0052414 A1 | 2/2022 | Huang et al. | |
| 2022/0059882 A1 | 2/2022 | Cao | |
| 2022/0065948 A1 | 3/2022 | Kim et al. | |
| 2022/0069366 A1 | 3/2022 | Fauteux et al. | |
| 2022/0069377 A1 | 3/2022 | Rhee et al. | |
| 2022/0074517 A1 | 3/2022 | Zhu et al. | |
| 2022/0077547 A1 | 3/2022 | Martiny et al. | |
| 2022/0089548 A1 | 3/2022 | Kim et al. | |

(56)          References Cited

U.S. PATENT DOCUMENTS

| | | |
|---|---|---|
| 2022/0093921 A1 | 3/2022 | Wang et al. |
| 2022/0102700 A1 | 3/2022 | Ma et al. |
| 2022/0102701 A1 | 3/2022 | Kang et al. |
| 2022/0102711 A1 | 3/2022 | Kang et al. |
| 2022/0102760 A1 | 3/2022 | Fukui |
| 2022/0102785 A1 | 3/2022 | Lee et al. |
| 2022/0102800 A1 | 3/2022 | Wang et al. |
| 2022/0109189 A1 | 4/2022 | Liu et al. |
| 2022/0109194 A1 | 4/2022 | Roh et al. |
| 2022/0109199 A1 | 4/2022 | Jin et al. |
| 2022/0109202 A1 | 4/2022 | Boecker et al. |
| 2022/0109211 A1 | 4/2022 | Wang et al. |
| 2022/0109217 A1 | 4/2022 | Dong et al. |
| 2022/0115656 A1 | 4/2022 | Toyama et al. |
| 2022/0115689 A1 | 4/2022 | Liu et al. |
| 2022/0115712 A1 | 4/2022 | Wang et al. |
| 2022/0115714 A1 | 4/2022 | Davey et al. |
| 2022/0115729 A1 | 4/2022 | Yuan et al. |
| 2022/0115749 A1 | 4/2022 | Davey et al. |
| 2022/0121223 A1 | 4/2022 | Lisoski et al. |
| 2022/0122385 A1 | 4/2022 | Lisoski et al. |
| 2022/0123287 A1 | 4/2022 | Wang et al. |
| 2022/0123297 A1 | 4/2022 | Lee et al. |
| 2022/0123320 A1 | 4/2022 | Liang et al. |
| 2022/0123353 A1 | 4/2022 | Fu et al. |
| 2022/0123364 A1 | 4/2022 | Li et al. |
| 2022/0123417 A1 | 4/2022 | Huang et al. |
| 2022/0123429 A1 | 4/2022 | Yoo et al. |
| 2022/0123440 A1 | 4/2022 | Chen et al. |
| 2022/0123441 A1 | 4/2022 | Liu et al. |
| 2022/0126705 A1 | 4/2022 | He et al. |
| 2022/0126726 A1 | 4/2022 | Kim |
| 2022/0131218 A1 | 4/2022 | Chen et al. |
| 2022/0131229 A1 | 4/2022 | Chi et al. |
| 2022/0131235 A1 | 4/2022 | Kunert et al. |
| 2022/0131238 A1 | 4/2022 | Li et al. |
| 2022/0135133 A1 | 5/2022 | Cai et al. |
| 2022/0137145 A1 | 5/2022 | Lee |
| 2022/0140432 A1 | 5/2022 | Chen et al. |
| 2022/0140618 A1 | 5/2022 | Yoon et al. |
| 2022/0140620 A1 | 5/2022 | Kang et al. |
| 2022/0144432 A1 | 5/2022 | Lisoski et al. |
| 2022/0144452 A1 | 5/2022 | Millspaugh |
| 2022/0149421 A1 | 5/2022 | Fang |
| 2022/0149458 A1 | 5/2022 | Jiang et al. |
| 2022/0158177 A1 | 5/2022 | Chen et al. |
| 2022/0158246 A1 | 5/2022 | Liang et al. |
| 2022/0158255 A1 | 5/2022 | Choi et al. |
| 2022/0158256 A1 | 5/2022 | Zhang et al. |
| 2022/0158288 A1 | 5/2022 | Baek et al. |
| 2022/0158296 A1 | 5/2022 | Chen et al. |
| 2022/0159887 A1 | 5/2022 | Muraoka et al. |
| 2022/0166019 A1 | 5/2022 | Toyama et al. |
| 2022/0166027 A1 | 5/2022 | Kim et al. |
| 2022/0166114 A1 | 5/2022 | Yun et al. |
| 2022/0170988 A1 | 6/2022 | Jeon |
| 2022/0173382 A1 | 6/2022 | Kim |
| 2022/0173383 A1 | 6/2022 | Kim |
| 2022/0173468 A1 | 6/2022 | Wang et al. |
| 2022/0177328 A1 | 6/2022 | Dou et al. |
| 2022/0179005 A1 | 6/2022 | Jung |
| 2022/0179008 A1 | 6/2022 | Lee et al. |
| 2022/0181658 A1 | 6/2022 | Degawa et al. |
| 2022/0181727 A1 | 6/2022 | Park et al. |
| 2022/0181734 A1 | 6/2022 | Fassbender et al. |
| 2022/0184738 A1 | 6/2022 | Ko et al. |
| 2022/0185088 A1 | 6/2022 | Zhang et al. |
| 2022/0185145 A1 | 6/2022 | Liu et al. |
| 2022/0185697 A1 | 6/2022 | Dou et al. |
| 2022/0190393 A1 | 6/2022 | Yang et al. |
| 2022/0190416 A1 | 6/2022 | Wu |
| 2022/0190423 A1 | 6/2022 | Wu et al. |
| 2022/0190442 A1 | 6/2022 | Huo |
| 2022/0190444 A1 | 6/2022 | Yoon et al. |
| 2022/0196752 A1 | 6/2022 | Lee et al. |
| 2022/0209226 A1 | 6/2022 | Li et al. |
| 2022/0209231 A1 | 6/2022 | Kwak et al. |
| 2022/0209238 A1 | 6/2022 | Han et al. |
| 2022/0209339 A1 | 6/2022 | Lee et al. |
| 2022/0209340 A1 | 6/2022 | Chen et al. |
| 2022/0209341 A1 | 6/2022 | Liu et al. |
| 2022/0209346 A1 | 6/2022 | Yao et al. |
| 2022/0209350 A1 | 6/2022 | Yu et al. |
| 2022/0209354 A1 | 6/2022 | Varipatis et al. |
| 2022/0209359 A1 | 6/2022 | Wang et al. |
| 2022/0209544 A1 | 6/2022 | Kim et al. |
| 2022/0216463 A1 | 7/2022 | Kwak et al. |
| 2022/0216466 A1 | 7/2022 | Lee et al. |
| 2022/0216512 A1 | 7/2022 | Kim et al. |
| 2022/0216513 A1 | 7/2022 | Tang et al. |
| 2022/0216543 A1 | 7/2022 | Kim et al. |
| 2022/0219204 A1 | 7/2022 | Ku |
| 2022/0219308 A1 | 7/2022 | Almqvist et al. |
| 2022/0219568 A1 | 7/2022 | Huang et al. |
| 2022/0221084 A1 | 7/2022 | Huang et al. |
| 2022/0221516 A1 | 7/2022 | Lee et al. |
| 2022/0221519 A1 | 7/2022 | Shi et al. |
| 2022/0221527 A1 | 7/2022 | Yoon et al. |
| 2022/0223830 A1 | 7/2022 | Ryu et al. |
| 2022/0223834 A1 | 7/2022 | Wang |
| 2022/0223836 A1 | 7/2022 | Zhou et al. |
| 2022/0223843 A1 | 7/2022 | Baek et al. |
| 2022/0223847 A1 | 7/2022 | Youn |
| 2022/0223860 A1 | 7/2022 | Ahn et al. |
| 2022/0223861 A1 | 7/2022 | Kim et al. |
| 2022/0223871 A1 | 7/2022 | Li et al. |
| 2022/0223876 A1 | 7/2022 | Li |
| 2022/0223879 A1 | 7/2022 | Kim et al. |
| 2022/0223897 A1 | 7/2022 | Wang et al. |
| 2022/0223910 A1 | 7/2022 | Kim et al. |
| 2022/0223911 A1 | 7/2022 | Kim et al. |
| 2022/0223915 A1 | 7/2022 | Zhang et al. |
| 2022/0223918 A1 | 7/2022 | Yan et al. |
| 2022/0223922 A1 | 7/2022 | Yang et al. |
| 2022/0223923 A1 | 7/2022 | Ma et al. |
| 2022/0223930 A1 | 7/2022 | Li et al. |
| 2022/0223931 A1 | 7/2022 | Shin |
| 2022/0223934 A1 | 7/2022 | Lee |
| 2022/0223938 A1 | 7/2022 | Lee et al. |
| 2022/0223939 A1 | 7/2022 | Lee et al. |
| 2022/0223949 A1 | 7/2022 | Masumori et al. |
| 2022/0223951 A1 | 7/2022 | Shuang et al. |
| 2022/0223952 A1 | 7/2022 | Shuang et al. |
| 2022/0223953 A1 | 7/2022 | Hwang Bo |
| 2022/0223955 A1 | 7/2022 | Zhang et al. |
| 2022/0223957 A1 | 7/2022 | Jeong et al. |
| 2022/0223958 A1 | 7/2022 | Kim et al. |
| 2022/0223959 A1 | 7/2022 | Kim et al. |
| 2022/0223964 A1 | 7/2022 | Holubarsch et al. |
| 2022/0223965 A1 | 7/2022 | Roh |
| 2022/0223971 A1 | 7/2022 | Noh |
| 2022/0223973 A1 | 7/2022 | Song et al. |
| 2022/0223977 A1 | 7/2022 | Kim et al. |
| 2022/0223979 A1 | 7/2022 | Bai et al. |
| 2022/0223982 A1 | 7/2022 | Zhang et al. |
| 2022/0223987 A1 | 7/2022 | Do |
| 2022/0224138 A1 | 7/2022 | Ko et al. |
| 2022/0224141 A1 | 7/2022 | Chen et al. |
| 2022/0226682 A1 | 7/2022 | Hong et al. |
| 2022/0227914 A1 | 7/2022 | Lee et al. |
| 2022/0229122 A1 | 7/2022 | Lee et al. |
| 2022/0231267 A1 | 7/2022 | Moon et al. |
| 2022/0231279 A1 | 7/2022 | Liang et al. |
| 2022/0231280 A1 | 7/2022 | Lee et al. |
| 2022/0231281 A1 | 7/2022 | Eom et al. |
| 2022/0231289 A1 | 7/2022 | Lee et al. |
| 2022/0231290 A1 | 7/2022 | Lim et al. |
| 2022/0231291 A1 | 7/2022 | Lim et al. |
| 2022/0231300 A1 | 7/2022 | Yun et al. |
| 2022/0231319 A1 | 7/2022 | Kim et al. |
| 2022/0231322 A1 | 7/2022 | Seo et al. |
| 2022/0231323 A1 | 7/2022 | Chung et al. |
| 2022/0231339 A1 | 7/2022 | Oh et al. |
| 2022/0231342 A1 | 7/2022 | Song |

(56) References Cited

U.S. PATENT DOCUMENTS

| | | |
|---|---|---|
| 2022/0231345 A1 | 7/2022 | Hwangbo et al. |
| 2022/0231354 A1 | 7/2022 | Jeon et al. |
| 2022/0231355 A1 | 7/2022 | Jang et al. |
| 2022/0231356 A1 | 7/2022 | Sugiyo |
| 2022/0231363 A1 | 7/2022 | Yang et al. |
| 2022/0231365 A1 | 7/2022 | Lee |
| 2022/0231366 A1 | 7/2022 | Kim et al. |
| 2022/0231367 A1 | 7/2022 | Lee et al. |
| 2022/0231368 A1 | 7/2022 | Wang et al. |
| 2022/0231371 A1 | 7/2022 | Jiang et al. |
| 2022/0231373 A1 | 7/2022 | Lerbro |
| 2022/0231374 A1 | 7/2022 | Von Hofen |
| 2022/0231376 A1 | 7/2022 | Yoo et al. |
| 2022/0231382 A1 | 7/2022 | Lee et al. |
| 2022/0231383 A1 | 7/2022 | Lee et al. |
| 2022/0231515 A1 | 7/2022 | Bae et al. |
| 2022/0232110 A1 | 7/2022 | Choi |
| 2022/0233044 A1 | 7/2022 | Tahara et al. |
| 2022/0233899 A1 | 7/2022 | Wu et al. |
| 2022/0236333 A1 | 7/2022 | Liu et al. |
| 2022/0237029 A1 | 7/2022 | Kwon et al. |
| 2022/0238047 A1 | 7/2022 | Shin |
| 2022/0238869 A1 | 7/2022 | Baek et al. |
| 2022/0238871 A1 | 7/2022 | Lee et al. |
| 2022/0238886 A1 | 7/2022 | Kim et al. |
| 2022/0238890 A1 | 7/2022 | Xu |
| 2022/0238905 A1 | 7/2022 | Yoo et al. |
| 2022/0238924 A1 | 7/2022 | Cha |
| 2022/0238934 A1 | 7/2022 | Roh et al. |
| 2022/0238937 A1 | 7/2022 | Lee et al. |
| 2022/0238940 A1 | 7/2022 | Wang et al. |
| 2022/0238945 A1 | 7/2022 | Huang et al. |
| 2022/0238948 A1 | 7/2022 | Cheong et al. |
| 2022/0238954 A1 | 7/2022 | Yoo et al. |
| 2022/0238962 A1 | 7/2022 | He et al. |
| 2022/0238964 A1 | 7/2022 | Lee et al. |
| 2022/0238968 A1 | 7/2022 | Li et al. |
| 2022/0238970 A1 | 7/2022 | Hu |
| 2022/0238971 A1 | 7/2022 | Chen et al. |
| 2022/0238973 A1 | 7/2022 | Yu et al. |
| 2022/0239121 A1 | 7/2022 | Li et al. |
| 2022/0239139 A1 | 7/2022 | Goyal et al. |
| 2022/0241813 A1 | 8/2022 | Park et al. |
| 2022/0243096 A1 | 8/2022 | Kim et al. |
| 2022/0244040 A1 | 8/2022 | Choi et al. |
| 2022/0244314 A1 | 8/2022 | Yang et al. |
| 2022/0246903 A1 | 8/2022 | Wang et al. |
| 2022/0246921 A1 | 8/2022 | Kwak et al. |
| 2022/0246925 A1 | 8/2022 | Lho et al. |
| 2022/0246928 A1 | 8/2022 | Jo et al. |
| 2022/0246929 A1 | 8/2022 | Jo et al. |
| 2022/0246972 A1 | 8/2022 | Teng et al. |
| 2022/0246973 A1 | 8/2022 | Jin et al. |
| 2022/0246974 A1 | 8/2022 | Park et al. |
| 2022/0246975 A1 | 8/2022 | Zhao et al. |
| 2022/0246976 A1 | 8/2022 | Kim et al. |
| 2022/0246983 A1 | 8/2022 | Suzuki et al. |
| 2022/0246984 A1 | 8/2022 | Park et al. |
| 2022/0246985 A1 | 8/2022 | Park et al. |
| 2022/0246991 A1 | 8/2022 | Kim et al. |
| 2022/0246992 A1 | 8/2022 | Wu et al. |
| 2022/0246993 A1 | 8/2022 | Jin et al. |
| 2022/0247004 A1 | 8/2022 | Yun |
| 2022/0247005 A1 | 8/2022 | Cho et al. |
| 2022/0247009 A1 | 8/2022 | Lee et al. |
| 2022/0247010 A1 | 8/2022 | Ju et al. |
| 2022/0247011 A1 | 8/2022 | Lee et al. |
| 2022/0247018 A1 | 8/2022 | Chen et al. |
| 2022/0247019 A1 | 8/2022 | Song et al. |
| 2022/0247032 A1 | 8/2022 | Jo et al. |
| 2022/0247042 A1 | 8/2022 | Birkholz et al. |
| 2022/0247043 A1 | 8/2022 | Su et al. |
| 2022/0247046 A1 | 8/2022 | Lee et al. |
| 2022/0247049 A1 | 8/2022 | Kim et al. |
| 2022/0247050 A1 | 8/2022 | Xu et al. |
| 2022/0247053 A1 | 8/2022 | Chen et al. |
| 2022/0247187 A1 | 8/2022 | Lee |
| 2022/0247841 A1 | 8/2022 | Yang et al. |
| 2022/0252498 A1 | 8/2022 | Yan et al. |
| 2022/0252671 A1 | 8/2022 | Simonis et al. |
| 2022/0252676 A1 | 8/2022 | Choi et al. |
| 2022/0255113 A1 | 8/2022 | Park et al. |
| 2022/0255123 A1 | 8/2022 | Han et al. |
| 2022/0255145 A1 | 8/2022 | Lee et al. |
| 2022/0255150 A1 | 8/2022 | Kim et al. |
| 2022/0255155 A1 | 8/2022 | Henzler et al. |
| 2022/0255156 A1 | 8/2022 | Kato |
| 2022/0255174 A1 | 8/2022 | Jin et al. |
| 2022/0255176 A1 | 8/2022 | Zhou et al. |
| 2022/0255197 A1 | 8/2022 | Shin |
| 2022/0255205 A1 | 8/2022 | Kato |
| 2022/0255336 A1 | 8/2022 | Li |
| 2022/0260440 A1 | 8/2022 | Goyal et al. |
| 2022/0260641 A1 | 8/2022 | Yoon |
| 2022/0263073 A1 | 8/2022 | Jung et al. |
| 2022/0263087 A1 | 8/2022 | Ryu et al. |
| 2022/0263113 A1 | 8/2022 | Kim et al. |
| 2022/0263153 A1 | 8/2022 | Gorzellik et al. |
| 2022/0263158 A1 | 8/2022 | Pape et al. |
| 2022/0263160 A1 | 8/2022 | Kim et al. |
| 2022/0263162 A1 | 8/2022 | Lee |
| 2022/0263167 A1 | 8/2022 | Taniuchi et al. |
| 2022/0263174 A1 | 8/2022 | Yu et al. |
| 2022/0263178 A1 | 8/2022 | Tanaka |
| 2022/0263189 A1 | 8/2022 | Ko et al. |
| 2022/0263191 A1 | 8/2022 | Park |
| 2022/0263199 A1 | 8/2022 | Park et al. |
| 2022/0263201 A1 | 8/2022 | Wang et al. |
| 2022/0266440 A1 | 8/2022 | Arnell |
| 2022/0268408 A1 | 8/2022 | Cao et al. |
| 2022/0268734 A1 | 8/2022 | Kim et al. |
| 2022/0268841 A1 | 8/2022 | Kim |
| 2022/0268843 A1 | 8/2022 | Jeon et al. |
| 2022/0268853 A1 | 8/2022 | Lee |
| 2022/0271326 A1 | 8/2022 | Kaufmann et al. |
| 2022/0271329 A1 | 8/2022 | Zhang et al. |
| 2022/0271339 A1 | 8/2022 | Yun et al. |
| 2022/0271344 A1 | 8/2022 | Choi et al. |
| 2022/0271345 A1 | 8/2022 | Lim et al. |
| 2022/0271361 A1 | 8/2022 | Lim |
| 2022/0271362 A1 | 8/2022 | Kim |
| 2022/0271364 A1 | 8/2022 | Jang et al. |
| 2022/0271365 A1 | 8/2022 | Cai et al. |
| 2022/0271369 A1 | 8/2022 | Pitre et al. |
| 2022/0271372 A1 | 8/2022 | Kim et al. |
| 2022/0271376 A1 | 8/2022 | Jin et al. |
| 2022/0271378 A1 | 8/2022 | Murakami et al. |
| 2022/0271383 A1 | 8/2022 | Akutsu et al. |
| 2022/0271384 A1 | 8/2022 | Kim et al. |
| 2022/0271387 A1 | 8/2022 | Shin et al. |
| 2022/0271388 A1 | 8/2022 | Choi et al. |
| 2022/0271393 A1 | 8/2022 | Lee et al. |
| 2022/0271395 A1 | 8/2022 | Hwang et al. |
| 2022/0271396 A1 | 8/2022 | Park et al. |
| 2022/0271398 A1 | 8/2022 | Park et al. |
| 2022/0271402 A1 | 8/2022 | Lim et al. |
| 2022/0271403 A1 | 8/2022 | Lim et al. |
| 2022/0271404 A1 | 8/2022 | Chi et al. |
| 2022/0271405 A1 | 8/2022 | Min et al. |
| 2022/0276146 A1 | 9/2022 | Gil et al. |
| 2022/0276314 A1 | 9/2022 | Kim et al. |
| 2022/0276315 A1 | 9/2022 | Yang et al. |
| 2022/0276319 A1 | 9/2022 | Kim |
| 2022/0276320 A1 | 9/2022 | Lee et al. |
| 2022/0278311 A1 | 9/2022 | Lee et al. |
| 2022/0278331 A1 | 9/2022 | Zhong |
| 2022/0278350 A1 | 9/2022 | Lee et al. |
| 2022/0278351 A1 | 9/2022 | Peng |
| 2022/0278352 A1 | 9/2022 | Hong et al. |
| 2022/0278358 A1 | 9/2022 | Yun et al. |
| 2022/0278359 A1 | 9/2022 | Yun et al. |
| 2022/0278360 A1 | 9/2022 | Tao et al. |
| 2022/0278369 A1 | 9/2022 | An et al. |
| 2022/0278379 A1 | 9/2022 | Hwang |

(56) References Cited

U.S. PATENT DOCUMENTS

| | | |
|---|---|---|
| 2022/0278383 A1 | 9/2022 | Hou et al. |
| 2022/0278386 A1 | 9/2022 | Cho et al. |
| 2022/0278389 A1 | 9/2022 | Chi et al. |
| 2022/0278391 A1 | 9/2022 | Gao |
| 2022/0278392 A1 | 9/2022 | Kim et al. |
| 2022/0278407 A1 | 9/2022 | Kneer et al. |
| 2022/0278408 A1 | 9/2022 | Kopp et al. |
| 2022/0278412 A1 | 9/2022 | Park et al. |
| 2022/0278413 A1 | 9/2022 | Kong et al. |
| 2022/0278417 A1 | 9/2022 | Lee et al. |
| 2022/0278421 A1 | 9/2022 | Li et al. |
| 2022/0278426 A1 | 9/2022 | Hwang |
| 2022/0278427 A1 | 9/2022 | Lawrence et al. |
| 2022/0278428 A1 | 9/2022 | Hwang et al. |
| 2022/0278430 A1 | 9/2022 | Son et al. |
| 2022/0278431 A1 | 9/2022 | Park et al. |
| 2022/0278534 A1 | 9/2022 | Kim et al. |
| 2022/0278539 A1 | 9/2022 | Fujinami et al. |
| 2022/0278540 A1 | 9/2022 | Kim et al. |
| 2022/0278542 A1 | 9/2022 | Li et al. |
| 2022/0281345 A1 | 9/2022 | Kim et al. |
| 2022/0281349 A1 | 9/2022 | Kim |
| 2022/0281350 A1 | 9/2022 | Tang et al. |
| 2022/0281554 A1 | 9/2022 | Philipzik et al. |
| 2022/0282067 A1 | 9/2022 | Yang et al. |
| 2022/0282694 A1 | 9/2022 | Koenen |
| 2022/0283201 A1 | 9/2022 | Saito et al. |
| 2022/0283232 A1 | 9/2022 | Yun |
| 2022/0283233 A1 | 9/2022 | Lim |
| 2022/0283234 A1 | 9/2022 | Lim |
| 2022/0283236 A1 | 9/2022 | Tang et al. |
| 2022/0283241 A1 | 9/2022 | Song |
| 2022/0285660 A1 | 9/2022 | Kim et al. |
| 2022/0285686 A1 | 9/2022 | Kim et al. |
| 2022/0285687 A1 | 9/2022 | Zhong et al. |
| 2022/0285689 A1 | 9/2022 | Yun et al. |
| 2022/0285694 A1 | 9/2022 | Jung |
| 2022/0285735 A1 | 9/2022 | Lee et al. |
| 2022/0285737 A1 | 9/2022 | Shangguan et al. |
| 2022/0285738 A1 | 9/2022 | Lim et al. |
| 2022/0285742 A1 | 9/2022 | Heo |
| 2022/0285744 A1 | 9/2022 | Kim et al. |
| 2022/0285755 A1 | 9/2022 | Chi et al. |
| 2022/0285759 A1 | 9/2022 | Kim et al. |
| 2022/0285760 A1 | 9/2022 | Jung et al. |
| 2022/0285761 A1 | 9/2022 | Fang et al. |
| 2022/0285777 A1 | 9/2022 | Kim et al. |
| 2022/0285779 A1 | 9/2022 | Kim et al. |
| 2022/0285780 A1 | 9/2022 | Cho et al. |
| 2022/0285787 A1 | 9/2022 | Jeong et al. |
| 2022/0285791 A1 | 9/2022 | Kwon et al. |
| 2022/0285792 A1 | 9/2022 | Jung et al. |
| 2022/0285795 A1 | 9/2022 | Xu et al. |
| 2022/0285796 A1 | 9/2022 | Leem et al. |
| 2022/0285801 A1 | 9/2022 | Lee et al. |
| 2022/0285802 A1 | 9/2022 | Yoo et al. |
| 2022/0285951 A1 | 9/2022 | Yoon |
| 2022/0285958 A1 | 9/2022 | Xu et al. |
| 2022/0285960 A1 | 9/2022 | Zeiler et al. |
| 2022/0287193 A1 | 9/2022 | Chun et al. |
| 2022/0288764 A1 | 9/2022 | Hauser et al. |
| 2022/0289035 A1 | 9/2022 | Choi et al. |
| 2022/0289891 A1 | 9/2022 | Yang et al. |
| 2022/0291287 A1 | 9/2022 | Yoon et al. |
| 2022/0291718 A1 | 9/2022 | Park |
| 2022/0291825 A1 | 9/2022 | Ahn et al. |
| 2022/0291829 A1 | 9/2022 | Kim et al. |
| 2022/0293895 A1 | 9/2022 | Lee |
| 2022/0293897 A1 | 9/2022 | Soon |
| 2022/0293908 A1 | 9/2022 | Chae et al. |
| 2022/0293910 A1 | 9/2022 | Chae et al. |
| 2022/0293930 A1 | 9/2022 | Ryu |
| 2022/0293951 A1 | 9/2022 | Choi et al. |
| 2022/0293987 A1 | 9/2022 | Takamuku et al. |
| 2022/0293996 A1 | 9/2022 | Lee et al. |
| 2022/0294001 A1 | 9/2022 | Lee et al. |
| 2022/0294002 A1 | 9/2022 | Kim et al. |
| 2022/0294007 A1 | 9/2022 | Ueno et al. |
| 2022/0294010 A1 | 9/2022 | Isomichi et al. |
| 2022/0294024 A1 | 9/2022 | Choi et al. |
| 2022/0294030 A1 | 9/2022 | Kopp et al. |
| 2022/0294032 A1 | 9/2022 | Choi |
| 2022/0294035 A1 | 9/2022 | Choi et al. |
| 2022/0294037 A1 | 9/2022 | Kim et al. |
| 2022/0294039 A1 | 9/2022 | Cho et al. |
| 2022/0294045 A1 | 9/2022 | Son et al. |
| 2022/0294051 A1 | 9/2022 | Kim et al. |
| 2022/0294052 A1 | 9/2022 | Kwon et al. |
| 2022/0294054 A1 | 9/2022 | Rejman et al. |
| 2022/0294056 A1 | 9/2022 | Choi et al. |
| 2022/0294059 A1 | 9/2022 | Gu et al. |
| 2022/0294063 A1 | 9/2022 | Lee et al. |
| 2022/0294072 A1 | 9/2022 | Son et al. |
| 2022/0294075 A1 | 9/2022 | Jung et al. |
| 2022/0294078 A1 | 9/2022 | Kim et al. |
| 2022/0294082 A1 | 9/2022 | Park |
| 2022/0294084 A1 | 9/2022 | Park et al. |
| 2022/0294091 A1 | 9/2022 | Song |
| 2022/0294093 A1 | 9/2022 | Cai et al. |
| 2022/0294249 A1 | 9/2022 | Noh et al. |
| 2022/0294252 A1 | 9/2022 | Cho et al. |
| 2022/0295275 A1 | 9/2022 | Lee et al. |
| 2022/0302461 A1 | 9/2022 | Guan et al. |
| 2022/0302515 A1 | 9/2022 | Jang et al. |
| 2022/0302555 A1 | 9/2022 | Lee et al. |
| 2022/0306796 A1 | 9/2022 | Lee et al. |
| 2022/0308118 A1 | 9/2022 | Yoon et al. |
| 2022/0310984 A1 | 9/2022 | Lee et al. |
| 2022/0310995 A1 | 9/2022 | Lim et al. |
| 2022/0310996 A1 | 9/2022 | Kim et al. |
| 2022/0311004 A1 | 9/2022 | Sasagawa et al. |
| 2022/0311007 A1 | 9/2022 | Karisyuku et al. |
| 2022/0311008 A1 | 9/2022 | Hasegawa et al. |
| 2022/0311009 A1 | 9/2022 | Akimoto et al. |
| 2022/0311052 A1 | 9/2022 | Oh et al. |
| 2022/0311054 A1 | 9/2022 | Bai et al. |
| 2022/0311056 A1 | 9/2022 | Xu et al. |
| 2022/0311073 A1 | 9/2022 | Lee |
| 2022/0311077 A1 | 9/2022 | Yun |
| 2022/0311079 A1 | 9/2022 | Cheng |
| 2022/0311082 A1 | 9/2022 | Taga |
| 2022/0311084 A1 | 9/2022 | Li et al. |
| 2022/0311085 A1 | 9/2022 | Li et al. |
| 2022/0311086 A1 | 9/2022 | Wu et al. |
| 2022/0311087 A1 | 9/2022 | Meng et al. |
| 2022/0311088 A1 | 9/2022 | Ryu et al. |
| 2022/0311090 A1 | 9/2022 | Lee et al. |
| 2022/0311100 A1 | 9/2022 | Lim et al. |
| 2022/0311104 A1 | 9/2022 | Tang et al. |
| 2022/0311105 A1 | 9/2022 | Dong et al. |
| 2022/0311107 A1 | 9/2022 | Taga |
| 2022/0311110 A1 | 9/2022 | Park et al. |
| 2022/0317010 A1 | 10/2022 | Sim et al. |
| 2022/0317192 A1 | 10/2022 | Lee et al. |
| 2022/0320484 A1 | 10/2022 | Chen et al. |
| 2022/0320522 A1 | 10/2022 | Guan et al. |
| 2022/0320523 A1 | 10/2022 | Ding |
| 2022/0320588 A1 | 10/2022 | Jung et al. |
| 2022/0320596 A1 | 10/2022 | Huang et al. |
| 2022/0320613 A1 | 10/2022 | Wang et al. |
| 2022/0320622 A1 | 10/2022 | Tofukuji |
| 2022/0320627 A1 | 10/2022 | Kato |
| 2022/0320634 A1 | 10/2022 | Oh et al. |
| 2022/0320635 A1 | 10/2022 | Oh et al. |
| 2022/0320638 A1 | 10/2022 | Dong et al. |
| 2022/0320641 A1 | 10/2022 | Kato |
| 2022/0320642 A1 | 10/2022 | Cai et al. |
| 2022/0320643 A1 | 10/2022 | Su et al. |
| 2022/0320644 A1 | 10/2022 | Sun et al. |
| 2022/0320646 A1 | 10/2022 | Li et al. |
| 2022/0320647 A1 | 10/2022 | Matsumoto et al. |
| 2022/0320651 A1 | 10/2022 | Yang et al. |
| 2022/0320655 A1 | 10/2022 | Kato |
| 2022/0320656 A1 | 10/2022 | Kato |

(56) References Cited

U.S. PATENT DOCUMENTS

| | | |
|---|---|---|
| 2022/0320663 A1 | 10/2022 | Kato et al. |
| 2022/0320664 A1 | 10/2022 | Kato |
| 2022/0320665 A1 | 10/2022 | Nakayama et al. |
| 2022/0320667 A1 | 10/2022 | Pickhardt et al. |
| 2022/0320670 A1 | 10/2022 | Lee et al. |
| 2022/0320672 A1 | 10/2022 | Kato et al. |
| 2022/0320673 A1 | 10/2022 | Yang et al. |
| 2022/0320677 A1 | 10/2022 | Guo et al. |
| 2022/0320680 A1 | 10/2022 | Zeng et al. |
| 2022/0320688 A1 | 10/2022 | Kato |
| 2022/0320696 A1 | 10/2022 | Li et al. |
| 2022/0320882 A1 | 10/2022 | Koegel et al. |
| 2022/0328805 A1 | 10/2022 | Jeon et al. |
| 2022/0328831 A1 | 10/2022 | Li et al. |
| 2022/0328833 A1 | 10/2022 | Lee et al. |
| 2022/0328838 A1 | 10/2022 | Kim et al. |
| 2022/0328859 A1 | 10/2022 | Jeong |
| 2022/0328883 A1 | 10/2022 | Xu et al. |
| 2022/0328884 A1 | 10/2022 | Xu et al. |
| 2022/0328888 A1 | 10/2022 | Moon et al. |
| 2022/0328889 A1 | 10/2022 | Yoon et al. |
| 2022/0328896 A1 | 10/2022 | Kim et al. |
| 2022/0328899 A1 | 10/2022 | You et al. |
| 2022/0328901 A1 | 10/2022 | Yang et al. |
| 2022/0328905 A1 | 10/2022 | Park et al. |
| 2022/0328906 A1 | 10/2022 | Cho et al. |
| 2022/0328908 A1 | 10/2022 | Yoon et al. |
| 2022/0328909 A1 | 10/2022 | Lee |
| 2022/0328918 A1 | 10/2022 | Pitre et al. |
| 2022/0328919 A1 | 10/2022 | Nakayama et al. |
| 2022/0328927 A1 | 10/2022 | Zeng et al. |
| 2022/0328936 A1 | 10/2022 | Zhang et al. |
| 2022/0328941 A1 | 10/2022 | Guo et al. |
| 2022/0328945 A1 | 10/2022 | Wang et al. |
| 2022/0329086 A1 | 10/2022 | Yang et al. |
| 2022/0329094 A1 | 10/2022 | Sun et al. |
| 2022/0333706 A1 | 10/2022 | Zhang et al. |
| 2022/0334189 A1 | 10/2022 | Min |
| 2022/0334191 A1 | 10/2022 | Simonis et al. |
| 2022/0334715 A1 | 10/2022 | Cho et al. |
| 2022/0336793 A1 | 10/2022 | Zeng et al. |
| 2022/0336806 A1 | 10/2022 | Lho et al. |
| 2022/0336809 A1 | 10/2022 | Choi |
| 2022/0336844 A1 | 10/2022 | Kang et al. |
| 2022/0336845 A1 | 10/2022 | Dong et al. |
| 2022/0336867 A1 | 10/2022 | Han et al. |
| 2022/0336874 A1 | 10/2022 | Zhang et al. |
| 2022/0336881 A1 | 10/2022 | Cho et al. |
| 2022/0336887 A1 | 10/2022 | Lee et al. |
| 2022/0336895 A1 | 10/2022 | Ogura |
| 2022/0336898 A1 | 10/2022 | Kim et al. |
| 2022/0336899 A1 | 10/2022 | Schmitt et al. |
| 2022/0336903 A1 | 10/2022 | Yoon et al. |
| 2022/0336905 A1 | 10/2022 | Jung et al. |
| 2022/0336906 A1 | 10/2022 | Lee et al. |
| 2022/0336907 A1 | 10/2022 | An |
| 2022/0336908 A1 | 10/2022 | Jeon et al. |
| 2022/0336911 A1 | 10/2022 | Lee |
| 2022/0336913 A1 | 10/2022 | Gu et al. |
| 2022/0336914 A1 | 10/2022 | Song et al. |
| 2022/0336917 A1 | 10/2022 | Lim et al. |
| 2022/0336918 A1 | 10/2022 | Song et al. |
| 2022/0336919 A1 | 10/2022 | Song et al. |
| 2022/0336920 A1 | 10/2022 | Tang et al. |
| 2022/0336922 A1 | 10/2022 | Hwang et al. |
| 2022/0336926 A1 | 10/2022 | Lee |
| 2022/0337074 A1 | 10/2022 | Lee et al. |
| 2022/0340729 A1 | 10/2022 | Choi et al. |
| 2022/0344645 A1 | 10/2022 | Li et al. |
| 2022/0344698 A1 | 10/2022 | Sun et al. |
| 2022/0344718 A1 | 10/2022 | Jin et al. |
| 2022/0344720 A1 | 10/2022 | Tanaka et al. |
| 2022/0344745 A1 | 10/2022 | Park et al. |
| 2022/0344754 A1 | 10/2022 | Jo et al. |
| 2022/0344765 A1 | 10/2022 | Choi et al. |
| 2022/0344770 A1 | 10/2022 | Li et al. |
| 2022/0344789 A1 | 10/2022 | Kim et al. |
| 2022/0344960 A1 | 10/2022 | Mayer et al. |
| 2022/0349950 A1 | 11/2022 | Wang et al. |
| 2022/0352550 A1 | 11/2022 | Hu et al. |
| 2022/0352551 A1 | 11/2022 | Kim et al. |
| 2022/0352558 A1 | 11/2022 | Woll et al. |
| 2022/0352559 A1 | 11/2022 | Aoki et al. |
| 2022/0352575 A1 | 11/2022 | Kim et al. |
| 2022/0352583 A1 | 11/2022 | Chen et al. |
| 2022/0352596 A1 | 11/2022 | Chai et al. |
| 2022/0352599 A1 | 11/2022 | Lan et al. |
| 2022/0355136 A1 | 11/2022 | Lee et al. |
| 2022/0356388 A1 | 11/2022 | Kwon et al. |
| 2022/0357401 A1 | 11/2022 | Ji et al. |
| 2022/0357404 A1 | 11/2022 | Kim |
| 2022/0359855 A1 | 11/2022 | Chae et al. |
| 2022/0359869 A1 | 11/2022 | Kim et al. |
| 2022/0359874 A1 | 11/2022 | Bie et al. |
| 2022/0359921 A9 | 11/2022 | Nakatani et al. |
| 2022/0359922 A1 | 11/2022 | Park |
| 2022/0359931 A1 | 11/2022 | Lee |
| 2022/0359940 A1 | 11/2022 | Schmitt |
| 2022/0359945 A1 | 11/2022 | Kogami et al. |
| 2022/0359955 A1 | 11/2022 | Baek et al. |
| 2022/0359958 A1 | 11/2022 | Zeng et al. |
| 2022/0359961 A1 | 11/2022 | Seo et al. |
| 2022/0363561 A1 | 11/2022 | Lim et al. |
| 2022/0365141 A1 | 11/2022 | Kim et al. |
| 2022/0367846 A1 | 11/2022 | Tanaka et al. |
| 2022/0367862 A1 | 11/2022 | Park et al. |
| 2022/0367864 A1 | 11/2022 | Park et al. |
| 2022/0367873 A1 | 11/2022 | Ahn et al. |
| 2022/0367877 A1 | 11/2022 | Fu et al. |
| 2022/0367916 A1 | 11/2022 | Lee et al. |
| 2022/0367928 A1 | 11/2022 | Lee |
| 2022/0367932 A1 | 11/2022 | Schmitt et al. |
| 2022/0367940 A1 | 11/2022 | Yun et al. |
| 2022/0367941 A1 | 11/2022 | Lee |
| 2022/0367955 A1 | 11/2022 | Park et al. |
| 2022/0367963 A1 | 11/2022 | Nagahama et al. |
| 2022/0367968 A1 | 11/2022 | Jin et al. |
| 2022/0367971 A1 | 11/2022 | Hong et al. |
| 2022/0367985 A1 | 11/2022 | Chen et al. |
| 2022/0367992 A1 | 11/2022 | Lee |
| 2022/0367993 A1 | 11/2022 | Lee et al. |
| 2022/0367994 A1 | 11/2022 | Jin et al. |
| 2022/0367996 A1 | 11/2022 | Chen et al. |
| 2022/0371899 A1 | 11/2022 | Piao et al. |
| 2022/0372247 A1 | 11/2022 | Kumru et al. |
| 2022/0373483 A1 | 11/2022 | Yoon et al. |
| 2022/0373493 A1 | 11/2022 | Lee et al. |
| 2022/0373607 A1 | 11/2022 | Kim et al. |
| 2022/0373610 A1 | 11/2022 | Yoon et al. |
| 2022/0376248 A1 | 11/2022 | Subramanian et al. |
| 2022/0376250 A1 | 11/2022 | Piao et al. |
| 2022/0376252 A1 | 11/2022 | Yang et al. |
| 2022/0376253 A1 | 11/2022 | Kim et al. |
| 2022/0376259 A1 | 11/2022 | Noh et al. |
| 2022/0376265 A1 | 11/2022 | Zhang et al. |
| 2022/0376266 A1 | 11/2022 | Hong et al. |
| 2022/0376288 A1 | 11/2022 | Kwak |
| 2022/0376300 A1 | 11/2022 | Jung et al. |
| 2022/0376305 A1 | 11/2022 | Lee et al. |
| 2022/0376311 A1 | 11/2022 | Shin et al. |
| 2022/0376321 A1 | 11/2022 | Kim et al. |
| 2022/0376326 A1 | 11/2022 | Chun et al. |
| 2022/0376327 A1 | 11/2022 | Lee et al. |
| 2022/0376336 A1 | 11/2022 | Jang et al. |
| 2022/0376341 A1 | 11/2022 | Jung et al. |
| 2022/0376344 A1 | 11/2022 | Jung et al. |
| 2022/0376349 A1 | 11/2022 | Kim |
| 2022/0376353 A1 | 11/2022 | Li et al. |
| 2022/0376360 A1 | 11/2022 | Cai et al. |
| 2022/0376361 A1 | 11/2022 | An et al. |
| 2022/0376365 A1 | 11/2022 | Jeon et al. |
| 2022/0376371 A1 | 11/2022 | Xu et al. |
| 2022/0376519 A1 | 11/2022 | Lee |
| 2022/0376527 A1 | 11/2022 | Lee et al. |

(56) References Cited

U.S. PATENT DOCUMENTS

| | | |
|---|---|---|
| 2022/0376537 A1 | 11/2022 | Kwon et al. |
| 2022/0379340 A1 | 12/2022 | Ayrle et al. |
| 2022/0380108 A1 | 12/2022 | Lee et al. |
| 2022/0380493 A1 | 12/2022 | Song et al. |
| 2022/0381846 A1 | 12/2022 | Miftahullatif et al. |
| 2022/0384775 A1 | 12/2022 | Lee et al. |
| 2022/0384781 A1 | 12/2022 | Lee et al. |
| 2022/0384782 A1 | 12/2022 | Kim et al. |
| 2022/0384788 A1 | 12/2022 | Yang et al. |
| 2022/0384790 A1 | 12/2022 | Kim et al. |
| 2022/0384812 A1 | 12/2022 | Woo et al. |
| 2022/0384849 A1 | 12/2022 | Jung et al. |
| 2022/0384850 A1 | 12/2022 | Lee et al. |
| 2022/0384851 A1 | 12/2022 | Lee |
| 2022/0384860 A1 | 12/2022 | Yang et al. |
| 2022/0384875 A1 | 12/2022 | Park et al. |
| 2022/0384886 A1 | 12/2022 | An et al. |
| 2022/0384891 A1 | 12/2022 | Kogami et al. |
| 2022/0384894 A1 | 12/2022 | Yoshida et al. |
| 2022/0384900 A1 | 12/2022 | Park |
| 2022/0384918 A1 | 12/2022 | Xu et al. |
| 2022/0384922 A1 | 12/2022 | Lee et al. |
| 2022/0384923 A1 | 12/2022 | Jang et al. |
| 2022/0384924 A1 | 12/2022 | Choi et al. |
| 2022/0388266 A1 | 12/2022 | Park et al. |
| 2022/0388417 A1 | 12/2022 | Lee et al. |
| 2022/0388850 A1 | 12/2022 | Yang et al. |
| 2022/0389727 A1 | 12/2022 | Ebisawa et al. |
| 2022/0390341 A1 | 12/2022 | Kim et al. |
| 2022/0390520 A1 | 12/2022 | Park |
| 2022/0390521 A1 | 12/2022 | Kim et al. |
| 2022/0392278 A1 | 12/2022 | Choi |
| 2022/0392727 A1 | 12/2022 | Shin et al. |
| 2022/0393143 A1 | 12/2022 | Lee et al. |
| 2022/0393144 A1 | 12/2022 | Hwang et al. |
| 2022/0393145 A1 | 12/2022 | Hwang et al. |
| 2022/0393150 A1 | 12/2022 | Noh et al. |
| 2022/0393154 A1 | 12/2022 | Jung et al. |
| 2022/0393156 A1 | 12/2022 | Lim et al. |
| 2022/0393157 A1 | 12/2022 | Kim et al. |
| 2022/0393222 A1 | 12/2022 | Kim et al. |
| 2022/0393223 A1 | 12/2022 | Yun et al. |
| 2022/0393225 A1 | 12/2022 | Kim et al. |
| 2022/0393227 A1 | 12/2022 | Liu et al. |
| 2022/0393229 A1 | 12/2022 | Kim |
| 2022/0393235 A1 | 12/2022 | Oh et al. |
| 2022/0393240 A1 | 12/2022 | Oh et al. |
| 2022/0393241 A1 | 12/2022 | Kim et al. |
| 2022/0393242 A1 | 12/2022 | Han et al. |
| 2022/0393243 A1 | 12/2022 | Han et al. |
| 2022/0393244 A1 | 12/2022 | Yeom et al. |
| 2022/0393245 A1 | 12/2022 | Lee et al. |
| 2022/0393246 A1 | 12/2022 | Yun et al. |
| 2022/0393249 A1 | 12/2022 | Lee et al. |
| 2022/0393257 A1 | 12/2022 | Yoon et al. |
| 2022/0393266 A1 | 12/2022 | Jang et al. |
| 2022/0393274 A1 | 12/2022 | Uhm et al. |
| 2022/0393283 A1 | 12/2022 | Choi et al. |
| 2022/0393284 A1 | 12/2022 | Kim |
| 2022/0393285 A1 | 12/2022 | Yun et al. |
| 2022/0393290 A1 | 12/2022 | Seo et al. |
| 2022/0393291 A1 | 12/2022 | Xu et al. |
| 2022/0393292 A1 | 12/2022 | Liu et al. |
| 2022/0393293 A1 | 12/2022 | Park et al. |
| 2022/0393296 A1 | 12/2022 | Namgoung et al. |
| 2022/0393299 A1 | 12/2022 | Ryu et al. |
| 2022/0393300 A1 | 12/2022 | Heo et al. |
| 2022/0393303 A1 | 12/2022 | Choi et al. |
| 2022/0393307 A1 | 12/2022 | Kim et al. |
| 2022/0393308 A1 | 12/2022 | Yang et al. |
| 2022/0393310 A1 | 12/2022 | Jeon et al. |
| 2022/0393313 A1 | 12/2022 | Park |
| 2022/0393316 A1 | 12/2022 | Kang et al. |
| 2022/0393320 A1 | 12/2022 | Choi et al. |
| 2022/0393322 A1 | 12/2022 | Jang et al. |
| 2022/0393394 A1 | 12/2022 | Kang |
| 2022/0396175 A1 | 12/2022 | Kim et al. |
| 2022/0396412 A1 | 12/2022 | Donner et al. |
| 2022/0397613 A1 | 12/2022 | Jee et al. |
| 2022/0399534 A1 | 12/2022 | Yun |
| 2022/0399558 A1 | 12/2022 | Sakuma et al. |
| 2022/0399572 A1 | 12/2022 | Lee et al. |
| 2022/0399573 A1 | 12/2022 | Lee et al. |
| 2022/0399578 A1 | 12/2022 | Lee et al. |
| 2022/0399579 A1 | 12/2022 | Tang et al. |
| 2022/0399584 A1 | 12/2022 | Kim et al. |
| 2022/0399593 A1 | 12/2022 | Min et al. |
| 2022/0399596 A1 | 12/2022 | Schmitt et al. |
| 2022/0399597 A1 | 12/2022 | Schmitt et al. |
| 2022/0399600 A1 | 12/2022 | Kong et al. |
| 2022/0399604 A1 | 12/2022 | Park et al. |
| 2022/0399607 A1 | 12/2022 | Liu et al. |
| 2022/0399615 A1 | 12/2022 | Hwang et al. |
| 2022/0399616 A1 | 12/2022 | Li |
| 2022/0399619 A1 | 12/2022 | Lee et al. |
| 2022/0399739 A1 | 12/2022 | Park et al. |
| 2022/0407048 A1 | 12/2022 | Choi et al. |
| 2022/0407063 A1 | 12/2022 | Kim et al. |
| 2022/0407068 A1 | 12/2022 | Piao et al. |
| 2022/0407077 A1 | 12/2022 | Han et al. |
| 2022/0407117 A1 | 12/2022 | Wu et al. |
| 2022/0407121 A1 | 12/2022 | Lee et al. |
| 2022/0407122 A1 | 12/2022 | Marshall et al. |
| 2022/0407130 A1 | 12/2022 | Goyal et al. |
| 2022/0407131 A1 | 12/2022 | Jung et al. |
| 2022/0407139 A1 | 12/2022 | Kim et al. |
| 2022/0407141 A1 | 12/2022 | Jang et al. |
| 2022/0407161 A1 | 12/2022 | Li et al. |
| 2022/0407163 A1 | 12/2022 | Park et al. |
| 2022/0407170 A1 | 12/2022 | Shin et al. |
| 2022/0407171 A1 | 12/2022 | Seo et al. |
| 2022/0407172 A1 | 12/2022 | Choi et al. |
| 2022/0407179 A1 | 12/2022 | Han et al. |
| 2022/0407190 A1 | 12/2022 | Wang et al. |
| 2022/0407192 A1 | 12/2022 | Li et al. |
| 2022/0407193 A1 | 12/2022 | Jung et al. |
| 2022/0407197 A1 | 12/2022 | Shin et al. |
| 2022/0407397 A1 | 12/2022 | Takeda |
| 2022/0410762 A1 | 12/2022 | Yang et al. |
| 2022/0411269 A1 | 12/2022 | Kim et al. |
| 2022/0411283 A1 | 12/2022 | Jeong et al. |
| 2022/0412911 A1 | 12/2022 | Lee et al. |
| 2022/0413056 A1 | 12/2022 | Von Hofen et al. |
| 2022/0413058 A1 | 12/2022 | Kim et al. |
| 2022/0415589 A1 | 12/2022 | Seon et al. |
| 2022/0416231 A1 | 12/2022 | Han et al. |
| 2022/0416232 A1 | 12/2022 | Xu |
| 2022/0416238 A1 | 12/2022 | Baek et al. |
| 2022/0416244 A1 | 12/2022 | Zeng et al. |
| 2022/0416289 A1 | 12/2022 | Kang et al. |
| 2022/0416304 A1 | 12/2022 | Kwak |
| 2022/0416311 A1 | 12/2022 | Uhm et al. |
| 2022/0416312 A1 | 12/2022 | Zeiler et al. |
| 2022/0416314 A1 | 12/2022 | Park |
| 2022/0416330 A1 | 12/2022 | Li et al. |
| 2022/0416335 A1 | 12/2022 | Yang et al. |
| 2022/0416361 A1 | 12/2022 | Ka et al. |
| 2022/0416374 A1 | 12/2022 | Li et al. |
| 2022/0416375 A1 | 12/2022 | Jin et al. |
| 2022/0416378 A1 | 12/2022 | Nakatani et al. |
| 2022/0416552 A1 | 12/2022 | Yamauchi et al. |
| 2022/0416553 A1 | 12/2022 | Geng |
| 2023/0001794 A1 | 1/2023 | Simonis et al. |
| 2023/0002089 A1 | 1/2023 | Willner et al. |
| 2023/0002183 A1 | 1/2023 | Kim et al. |
| 2023/0002899 A1 | 1/2023 | Chae et al. |
| 2023/0003808 A1 | 1/2023 | Chen et al. |
| 2023/0006187 A1 | 1/2023 | Jeon et al. |
| 2023/0006195 A1 | 1/2023 | Kim et al. |
| 2023/0006202 A1 | 1/2023 | Ouyang et al. |
| 2023/0006207 A1 | 1/2023 | Lim et al. |
| 2023/0006209 A1 | 1/2023 | Li et al. |
| 2023/0006211 A1 | 1/2023 | Lee et al. |
| 2023/0006215 A1 | 1/2023 | Chen et al. |

(56) References Cited

U.S. PATENT DOCUMENTS

| | | |
|---|---|---|
| 2023/0006239 A1 | 1/2023 | Song et al. |
| 2023/0006251 A1 | 1/2023 | Oh et al. |
| 2023/0006264 A1 | 1/2023 | Jegal et al. |
| 2023/0006265 A1 | 1/2023 | Zhang et al. |
| 2023/0006274 A1 | 1/2023 | Baek et al. |
| 2023/0006275 A1 | 1/2023 | Shin et al. |
| 2023/0006301 A1 | 1/2023 | Kneer et al. |
| 2023/0006304 A1 | 1/2023 | Jin et al. |
| 2023/0006310 A1 | 1/2023 | Buck et al. |
| 2023/0006317 A1 | 1/2023 | Su et al. |
| 2023/0008194 A1 | 1/2023 | An et al. |
| 2023/0010270 A1 | 1/2023 | Yamaguchi et al. |
| 2023/0010305 A1 | 1/2023 | Lee et al. |
| 2023/0010746 A1 | 1/2023 | Lee |
| 2023/0011595 A1 | 1/2023 | Jang et al. |
| 2023/0012291 A1 | 1/2023 | Schmitt et al. |
| 2023/0012356 A1 | 1/2023 | Kim et al. |
| 2023/0012792 A1 | 1/2023 | Jang et al. |
| 2023/0013490 A1 | 1/2023 | Böhm et al. |
| 2023/0013715 A1 | 1/2023 | Chae et al. |
| 2023/0013878 A1 | 1/2023 | Park et al. |
| 2023/0013955 A1 | 1/2023 | Jiang |
| 2023/0014141 A1 | 1/2023 | Böhm et al. |
| 2023/0014249 A1 | 1/2023 | Jin et al. |
| 2023/0014724 A1 | 1/2023 | Choi et al. |
| 2023/0015326 A1 | 1/2023 | Choi et al. |
| 2023/0015527 A1 | 1/2023 | Zipf |
| 2023/0016240 A1 | 1/2023 | Liu et al. |
| 2023/0016691 A1 | 1/2023 | Lee et al. |
| 2023/0017239 A1 | 1/2023 | Li et al. |
| 2023/0018065 A1 | 1/2023 | Schmitt et al. |
| 2023/0018957 A1 | 1/2023 | Schmitt et al. |
| 2023/0019070 A1 | 1/2023 | Yoon et al. |
| 2023/0019975 A1 | 1/2023 | Hunt et al. |
| 2023/0020447 A1 | 1/2023 | Schmitt |
| 2023/0021234 A1 | 1/2023 | Gaefke et al. |
| 2023/0021284 A1 | 1/2023 | Lim et al. |
| 2023/0021285 A1 | 1/2023 | Kwak et al. |
| 2023/0021740 A1 | 1/2023 | Park et al. |
| 2023/0021766 A1 | 1/2023 | Lee |
| 2023/0021950 A1 | 1/2023 | Yun et al. |
| 2023/0022636 A1 | 1/2023 | Schmitt et al. |
| 2023/0023014 A1 | 1/2023 | Choi et al. |
| 2023/0023147 A1 | 1/2023 | Jin et al. |
| 2023/0023216 A1 | 1/2023 | Li et al. |
| 2023/0024294 A1 | 1/2023 | Loew et al. |
| 2023/0024456 A1 | 1/2023 | Shao et al. |
| 2023/0025048 A1 | 1/2023 | Jang |
| 2023/0025968 A1 | 1/2023 | Kim et al. |
| 2023/0026257 A1 | 1/2023 | Jeong et al. |
| 2023/0026325 A1 | 1/2023 | Park et al. |
| 2023/0026380 A1 | 1/2023 | Hong et al. |
| 2023/0026737 A1 | 1/2023 | Nicklaus et al. |
| 2023/0027595 A1 | 1/2023 | Lim et al. |
| 2023/0028018 A1 | 1/2023 | Yu |
| 2023/0028907 A1 | 1/2023 | Choi et al. |
| 2023/0029949 A1 | 2/2023 | Yang et al. |
| 2023/0030011 A1 | 2/2023 | Lee |
| 2023/0030391 A1 | 2/2023 | Wernerus |
| 2023/0031167 A1 | 2/2023 | Park et al. |
| 2023/0031275 A1 | 2/2023 | Han et al. |
| 2023/0031678 A1 | 2/2023 | Park et al. |
| 2023/0033605 A1 | 2/2023 | Lim et al. |
| 2023/0033916 A1 | 2/2023 | Kim et al. |
| 2023/0034195 A1 | 2/2023 | Lee |
| 2023/0034955 A1 | 2/2023 | Kim et al. |
| 2023/0035203 A1 | 2/2023 | Park |
| 2023/0035380 A1 | 2/2023 | Leng et al. |
| 2023/0035524 A1 | 2/2023 | Kim |
| 2023/0035589 A1 | 2/2023 | Shin et al. |
| 2023/0035877 A1 | 2/2023 | Lee et al. |
| 2023/0036332 A1 | 2/2023 | Kim et al. |
| 2023/0036765 A1 | 2/2023 | Chihara et al. |
| 2023/0037677 A1 | 2/2023 | Nam et al. |
| 2023/0037871 A1 | 2/2023 | Lee et al. |
| 2023/0037967 A1 | 2/2023 | Li et al. |
| 2023/0038951 A1 | 2/2023 | Kim et al. |
| 2023/0038972 A1 | 2/2023 | Lee et al. |
| 2023/0039172 A1 | 2/2023 | Na et al. |
| 2023/0039404 A1 | 2/2023 | Kim et al. |
| 2023/0040106 A1 | 2/2023 | Youn et al. |
| 2023/0040343 A1 | 2/2023 | Gao et al. |
| 2023/0040680 A1 | 2/2023 | Choi et al. |
| 2023/0041890 A1 | 2/2023 | Lee et al. |
| 2023/0042107 A1 | 2/2023 | Kim et al. |
| 2023/0042629 A1 | 2/2023 | Shin et al. |
| 2023/0042717 A1 | 2/2023 | Choi et al. |
| 2023/0043253 A1 | 2/2023 | Lee et al. |
| 2023/0043533 A1 | 2/2023 | Lee et al. |
| 2023/0043832 A1 | 2/2023 | In et al. |
| 2023/0043901 A1 | 2/2023 | Kim et al. |
| 2023/0044305 A1 | 2/2023 | Choi et al. |
| 2023/0044388 A1 | 2/2023 | Lee |
| 2023/0044623 A1 | 2/2023 | Ryu et al. |
| 2023/0045132 A1 | 2/2023 | Lim et al. |
| 2023/0045364 A1 | 2/2023 | Lee et al. |
| 2023/0045395 A1 | 2/2023 | Ryu et al. |
| 2023/0045593 A1 | 2/2023 | Kim et al. |
| 2023/0045904 A1 | 2/2023 | Li et al. |
| 2023/0046162 A1 | 2/2023 | Song |
| 2023/0046208 A1 | 2/2023 | Kim et al. |
| 2023/0046419 A1 | 2/2023 | Chun et al. |
| 2023/0046437 A1 | 2/2023 | Murui |
| 2023/0046633 A1 | 2/2023 | Nam et al. |
| 2023/0046787 A1 | 2/2023 | Kroener et al. |
| 2023/0046849 A1 | 2/2023 | Choi et al. |
| 2023/0047002 A1 | 2/2023 | Lee |
| 2023/0047373 A1 | 2/2023 | Huang et al. |
| 2023/0047547 A1 | 2/2023 | Klee et al. |
| 2023/0048538 A1 | 2/2023 | Cois et al. |
| 2023/0048587 A1 | 2/2023 | Lee et al. |
| 2023/0048711 A1 | 2/2023 | Kim et al. |
| 2023/0049272 A1 | 2/2023 | Cois et al. |
| 2023/0049279 A1 | 2/2023 | Kim |
| 2023/0049301 A1 | 2/2023 | Hwang |
| 2023/0049302 A1 | 2/2023 | Kim et al. |
| 2023/0049766 A1 | 2/2023 | Tang et al. |
| 2023/0050428 A1 | 2/2023 | Lee et al. |
| 2023/0050935 A1 | 2/2023 | Lee et al. |
| 2023/0051278 A1 | 2/2023 | Ryu et al. |
| 2023/0051999 A1 | 2/2023 | Noller et al. |
| 2023/0052005 A1 | 2/2023 | Son et al. |
| 2023/0052338 A1 | 2/2023 | Tao et al. |
| 2023/0052417 A1 | 2/2023 | Shin et al. |
| 2023/0052447 A1 | 2/2023 | Lee et al. |
| 2023/0053218 A1 | 2/2023 | Choi et al. |
| 2023/0053313 A1 | 2/2023 | Lee et al. |
| 2023/0053345 A1 | 2/2023 | Choi |
| 2023/0053898 A1 | 2/2023 | Kumru |
| 2023/0054400 A1 | 2/2023 | Choi et al. |
| 2023/0054678 A1 | 2/2023 | Hwang |
| 2023/0054789 A1 | 2/2023 | Zeiler et al. |
| 2023/0055489 A1 | 2/2023 | Lee et al. |
| 2023/0055592 A1 | 2/2023 | Kim et al. |
| 2023/0056920 A1 | 2/2023 | Nam et al. |
| 2023/0057377 A1 | 2/2023 | Kim et al. |
| 2023/0057926 A1 | 2/2023 | Kim et al. |
| 2023/0057993 A1 | 2/2023 | Lee et al. |
| 2023/0058417 A1 | 2/2023 | Whitmore et al. |
| 2023/0058900 A1 | 2/2023 | Jeong et al. |
| 2023/0059078 A1 | 2/2023 | Lee et al. |
| 2023/0059519 A1 | 2/2023 | Yoo et al. |
| 2023/0059831 A1 | 2/2023 | Yang et al. |
| 2023/0061221 A1 | 3/2023 | Hyun et al. |
| 2023/0061760 A1 | 3/2023 | Li et al. |
| 2023/0062173 A1 | 3/2023 | Cho et al. |
| 2023/0062174 A1 | 3/2023 | Schmitt |
| 2023/0062907 A1 | 3/2023 | Ogura |
| 2023/0063841 A1 | 3/2023 | Lee et al. |
| 2023/0063883 A1 | 3/2023 | Hong et al. |
| 2023/0063991 A1 | 3/2023 | Bader et al. |
| 2023/0064213 A1 | 3/2023 | Jung et al. |
| 2023/0064294 A1 | 3/2023 | Tanaka et al. |
| 2023/0065164 A1 | 3/2023 | Gu et al. |

(56)  References Cited

U.S. PATENT DOCUMENTS

| | | |
|---|---|---|
| 2023/0065277 A1 | 3/2023 | Zhao et al. |
| 2023/0065592 A1 | 3/2023 | Kim et al. |
| 2023/0065906 A1 | 3/2023 | Yoon et al. |
| 2023/0066959 A1 | 3/2023 | Park et al. |
| 2023/0067407 A1 | 3/2023 | Schmitt |
| 2023/0067792 A1 | 3/2023 | Kim et al. |
| 2023/0068623 A1 | 3/2023 | Kim et al. |
| 2023/0069153 A1 | 3/2023 | Park et al. |
| 2023/0070060 A1 | 3/2023 | Han et al. |
| 2023/0070289 A1 | 3/2023 | Kim et al. |
| 2023/0070655 A1 | 3/2023 | Min et al. |
| 2023/0071238 A1 | 3/2023 | Hwang |
| 2023/0071517 A1 | 3/2023 | Lee |
| 2023/0072183 A1 | 3/2023 | Tomiyama et al. |
| 2023/0072893 A1 | 3/2023 | Jang et al. |
| 2023/0073365 A1 | 3/2023 | Jeon et al. |
| 2023/0073433 A1 | 3/2023 | Lee et al. |
| 2023/0073493 A1 | 3/2023 | Tzivanopoulos et al. |
| 2023/0073815 A1 | 3/2023 | Kim et al. |
| 2023/0076134 A1 | 3/2023 | Xiong et al. |
| 2023/0076153 A1 | 3/2023 | Park et al. |
| 2023/0078958 A1 | 3/2023 | Ha et al. |
| 2023/0079224 A1 | 3/2023 | Chu et al. |
| 2023/0079409 A1 | 3/2023 | Kang et al. |
| 2023/0079717 A1 | 3/2023 | Peng et al. |
| 2023/0080191 A1 | 3/2023 | Kim et al. |
| 2023/0080890 A1 | 3/2023 | Lee et al. |
| 2023/0080891 A1 | 3/2023 | Chen et al. |
| 2023/0080954 A1 | 3/2023 | Lee et al. |
| 2023/0081338 A1 | 3/2023 | Song et al. |
| 2023/0081939 A1 | 3/2023 | Jeong et al. |
| 2023/0082574 A1 | 3/2023 | Kim et al. |
| 2023/0082653 A1 | 3/2023 | Oh et al. |
| 2023/0082942 A1 | 3/2023 | Yoo et al. |
| 2023/0083006 A1 | 3/2023 | Yoon et al. |
| 2023/0083113 A1 | 3/2023 | Lee et al. |
| 2023/0083594 A1 | 3/2023 | Yu et al. |
| 2023/0083763 A1 | 3/2023 | Jeong et al. |
| 2023/0084079 A1 | 3/2023 | Kwak |
| 2023/0085522 A1 | 3/2023 | Kim et al. |
| 2023/0086309 A1 | 3/2023 | Ka et al. |
| 2023/0087062 A1 | 3/2023 | Cho et al. |
| 2023/0087398 A1 | 3/2023 | Park et al. |
| 2023/0087635 A1 | 3/2023 | Son et al. |
| 2023/0087740 A1 | 3/2023 | Jeong et al. |
| 2023/0088100 A1 | 3/2023 | Murakami |
| 2023/0088301 A1 | 3/2023 | Suzuki et al. |
| 2023/0089885 A1 | 3/2023 | Kim et al. |
| 2023/0090137 A1 | 3/2023 | Jang et al. |
| 2023/0090568 A1 | 3/2023 | Jeong et al. |
| 2023/0090932 A1 | 3/2023 | Misawa |
| 2023/0091858 A1 | 3/2023 | Kim et al. |
| 2023/0092071 A1 | 3/2023 | Cho et al. |
| 2023/0092568 A1 | 3/2023 | Park et al. |
| 2023/0092616 A1 | 3/2023 | Lee et al. |
| 2023/0092951 A1 | 3/2023 | Choi et al. |
| 2023/0093274 A1 | 3/2023 | Kwon et al. |
| 2023/0095613 A1 | 3/2023 | Kim et al. |
| 2023/0095804 A1 | 3/2023 | Park et al. |
| 2023/0096228 A1 | 3/2023 | Otsuki et al. |
| 2023/0096324 A1 | 3/2023 | Kim et al. |
| 2023/0097124 A1 | 3/2023 | Lee |
| 2023/0097997 A1 | 3/2023 | Lee |
| 2023/0099554 A1 | 3/2023 | Jo et al. |
| 2023/0099667 A1 | 3/2023 | Park |
| 2023/0100719 A1 | 3/2023 | Oh et al. |
| 2023/0101736 A1 | 3/2023 | Lee et al. |
| 2023/0101952 A1 | 3/2023 | Lee et al. |
| 2023/0102148 A1 | 3/2023 | Yun et al. |
| 2023/0102692 A1 | 3/2023 | Ahn et al. |
| 2023/0103699 A1 | 4/2023 | Huang |
| 2023/0103765 A1 | 4/2023 | Kim |
| 2023/0104184 A1 | 4/2023 | Kim et al. |
| 2023/0104232 A1 | 4/2023 | Bae et al. |
| 2023/0104566 A1 | 4/2023 | Park |
| 2023/0105559 A1 | 4/2023 | Wang et al. |
| 2023/0105865 A1 | 4/2023 | Kim et al. |
| 2023/0105949 A1 | 4/2023 | Yamaguchi |
| 2023/0109116 A1 | 4/2023 | Park et al. |
| 2023/0111417 A1 | 4/2023 | Yasuda |
| 2023/0112436 A1 | 4/2023 | Zeidler et al. |
| 2023/0112744 A1 | 4/2023 | Hasegawa et al. |
| 2023/0113914 A1 | 4/2023 | Min |
| 2023/0114884 A1 | 4/2023 | Zeidler |
| 2023/0115280 A1 | 4/2023 | Yoo et al. |
| 2023/0118059 A1 | 4/2023 | Gigot et al. |
| 2023/0118174 A1 | 4/2023 | Sung et al. |
| 2023/0118719 A1 | 4/2023 | Lee et al. |
| 2023/0118784 A1 | 4/2023 | Hong et al. |
| 2023/0119910 A1 | 4/2023 | Zeidler |
| 2023/0122579 A1 | 4/2023 | Mack et al. |
| 2023/0123259 A1 | 4/2023 | Avery et al. |
| 2023/0124945 A1 | 4/2023 | Ahn et al. |
| 2023/0125110 A1 | 4/2023 | Su et al. |
| 2023/0125202 A1 | 4/2023 | Zeng et al. |
| 2023/0127368 A1 | 4/2023 | Yun et al. |
| 2023/0128140 A1 | 4/2023 | Yoo et al. |
| 2023/0128754 A1 | 4/2023 | Yoneda et al. |
| 2023/0128767 A1 | 4/2023 | Kim |
| 2023/0128934 A1 | 4/2023 | Zou et al. |
| 2023/0129239 A1 | 4/2023 | Kim et al. |
| 2023/0130497 A1 | 4/2023 | Whitmore et al. |
| 2023/0130623 A1 | 4/2023 | Kim et al. |
| 2023/0130655 A1 | 4/2023 | Jung et al. |
| 2023/0131176 A1 | 4/2023 | Xie et al. |
| 2023/0131365 A1 | 4/2023 | Liu et al. |
| 2023/0133437 A1 | 5/2023 | Kang et al. |
| 2023/0134549 A1 | 5/2023 | Park |
| 2023/0135298 A1 | 5/2023 | Goyal et al. |
| 2023/0135644 A1 | 5/2023 | Kwon et al. |
| 2023/0135785 A1 | 5/2023 | Lim et al. |
| 2023/0135791 A1 | 5/2023 | Yun et al. |
| 2023/0136580 A1 | 5/2023 | Mondoha et al. |
| 2023/0137991 A1 | 5/2023 | Lee et al. |
| 2023/0138783 A1 | 5/2023 | Lim et al. |
| 2023/0138854 A1 | 5/2023 | Park et al. |
| 2023/0139477 A1 | 5/2023 | Yoon et al. |
| 2023/0139879 A1 | 5/2023 | Son et al. |
| 2023/0140944 A1 | 5/2023 | Lee et al. |
| 2023/0142000 A1 | 5/2023 | Kwak et al. |
| 2023/0142182 A1 | 5/2023 | Jung et al. |
| 2023/0142408 A1 | 5/2023 | Fujimoto et al. |
| 2023/0143216 A1 | 5/2023 | Sun et al. |
| 2023/0143427 A1 | 5/2023 | Kim et al. |
| 2023/0145579 A1 | 5/2023 | Won et al. |
| 2023/0146021 A1 | 5/2023 | Landesfeind |
| 2023/0147667 A1 | 5/2023 | Heinen et al. |
| 2023/0148174 A1 | 5/2023 | Jiang et al. |
| 2023/0148262 A1 | 5/2023 | Roh et al. |
| 2023/0148274 A1 | 5/2023 | Segret et al. |
| 2023/0148313 A1 | 5/2023 | Jung et al. |
| 2023/0155105 A1 | 5/2023 | Lee et al. |
| 2023/0155123 A1 | 5/2023 | Lee et al. |
| 2023/0155127 A1 | 5/2023 | Kim et al. |
| 2023/0155164 A1 | 5/2023 | Baek et al. |
| 2023/0155188 A1 | 5/2023 | Goyal et al. |
| 2023/0155215 A1 | 5/2023 | Baek et al. |
| 2023/0155219 A1 | 5/2023 | Yun et al. |
| 2023/0163342 A1 | 5/2023 | Jang |
| 2023/0163386 A1 | 5/2023 | Lim et al. |
| 2023/0163391 A1 | 5/2023 | Wang et al. |
| 2023/0163605 A1 | 5/2023 | Ko |
| 2023/0166362 A1 | 6/2023 | Park et al. |
| 2023/0170480 A1 | 6/2023 | Kim et al. |
| 2023/0170533 A1 | 6/2023 | Chung et al. |
| 2023/0170557 A1 | 6/2023 | Kim |
| 2023/0170563 A1 | 6/2023 | Lim et al. |
| 2023/0170564 A1 | 6/2023 | Lim et al. |
| 2023/0170577 A1 | 6/2023 | Ryu et al. |
| 2023/0175943 A1 | 6/2023 | Kim et al. |
| 2023/0178724 A1 | 6/2023 | Kim et al. |
| 2023/0178734 A1 | 6/2023 | Choi et al. |
| 2023/0178754 A1 | 6/2023 | Kim et al. |
| 2023/0178801 A1 | 6/2023 | Lee et al. |

(56) References Cited

U.S. PATENT DOCUMENTS

| | | |
|---|---|---|
| 2023/0178818 A1 | 6/2023 | Jeong et al. |
| 2023/0178821 A1 | 6/2023 | Park et al. |
| 2023/0178828 A1 | 6/2023 | Park et al. |
| 2023/0178830 A1 | 6/2023 | Lim et al. |
| 2023/0178836 A1 | 6/2023 | Bang et al. |
| 2023/0179005 A1 | 6/2023 | Lee |
| 2023/0179007 A1 | 6/2023 | Bae et al. |
| 2023/0182575 A1 | 6/2023 | Kim et al. |
| 2023/0182618 A1 | 6/2023 | Nam et al. |
| 2023/0184690 A1 | 6/2023 | Kim |
| 2023/0184815 A1 | 6/2023 | Jeong et al. |
| 2023/0184843 A1 | 6/2023 | Bae et al. |
| 2023/0187642 A1 | 6/2023 | Jeon et al. |
| 2023/0187651 A1 | 6/2023 | Yun |
| 2023/0187717 A1 | 6/2023 | Yang et al. |
| 2023/0187724 A1 | 6/2023 | Gu et al. |
| 2023/0187728 A1 | 6/2023 | Jang et al. |
| 2023/0187747 A1 | 6/2023 | Zhang |
| 2023/0187748 A1 | 6/2023 | Lim et al. |
| 2023/0187755 A1 | 6/2023 | Oh et al. |
| 2023/0187769 A1 | 6/2023 | Kim et al. |
| 2023/0187945 A1 | 6/2023 | Yang et al. |
| 2023/0198015 A1 | 6/2023 | Li et al. |
| 2023/0198044 A1 | 6/2023 | Park et al. |
| 2023/0198045 A1 | 6/2023 | Oh et al. |
| 2023/0198069 A1 | 6/2023 | Kim et al. |
| 2023/0198091 A1 | 6/2023 | Oh et al. |
| 2023/0198519 A1 | 6/2023 | Lee et al. |
| 2023/0200605 A1 | 6/2023 | Elmestrand et al. |
| 2023/0201640 A1 | 6/2023 | Ok et al. |
| 2023/0202344 A1 | 6/2023 | Simonis et al. |
| 2023/0204675 A1 | 6/2023 | Inoue et al. |
| 2023/0207933 A1 | 6/2023 | Lee et al. |
| 2023/0207958 A1 | 6/2023 | Choi et al. |
| 2023/0207987 A1 | 6/2023 | Lim et al. |
| 2023/0208170 A1 | 6/2023 | Kim |
| 2023/0213589 A1 | 7/2023 | Song |
| 2023/0216113 A1 | 7/2023 | Min et al. |
| 2023/0216126 A1 | 7/2023 | Yang et al. |
| 2023/0216160 A1 | 7/2023 | Jin et al. |
| 2023/0223588 A1 | 7/2023 | Lee et al. |
| 2023/0223621 A1 | 7/2023 | Ok et al. |
| 2023/0223659 A1 | 7/2023 | Lee et al. |
| 2023/0223769 A1 | 7/2023 | Kroener |
| 2023/0228486 A1 | 7/2023 | Kim et al. |
| 2023/0231107 A1 | 7/2023 | Yan et al. |
| 2023/0231120 A1 | 7/2023 | Lee et al. |
| 2023/0231224 A1 | 7/2023 | Wang et al. |
| 2023/0231232 A1 | 7/2023 | Chen et al. |
| 2023/0231234 A1 | 7/2023 | Hwang et al. |
| 2023/0236259 A1 | 7/2023 | Chae et al. |
| 2023/0236263 A1 | 7/2023 | Lee et al. |
| 2023/0238520 A1 | 7/2023 | Xiao et al. |
| 2023/0238531 A1 | 7/2023 | Ahn et al. |
| 2023/0238584 A1 | 7/2023 | Park et al. |
| 2023/0238606 A1 | 7/2023 | Ju et al. |
| 2023/0238618 A1 | 7/2023 | Yan et al. |
| 2023/0238643 A1 | 7/2023 | Hong et al. |
| 2023/0238655 A1 | 7/2023 | Xiao et al. |
| 2023/0242202 A1 | 8/2023 | Kunert |
| 2023/0246157 A1 | 8/2023 | Liu et al. |
| 2023/0246173 A1 | 8/2023 | Kim et al. |
| 2023/0246221 A1 | 8/2023 | Jun et al. |
| 2023/0246275 A1 | 8/2023 | Yang et al. |
| 2023/0246285 A1 | 8/2023 | Yuan et al. |
| 2023/0246459 A1 | 8/2023 | Lee |
| 2023/0253635 A1 | 8/2023 | Hauser et al. |
| 2023/0253645 A1 | 8/2023 | Park et al. |
| 2023/0261185 A1 | 8/2023 | Yoo et al. |
| 2023/0261189 A1 | 8/2023 | Tang et al. |
| 2023/0261207 A1 | 8/2023 | Higashi et al. |
| 2023/0261270 A1 | 8/2023 | Lee |
| 2023/0261278 A1 | 8/2023 | Yang et al. |
| 2023/0261282 A1 | 8/2023 | Lee et al. |
| 2023/0261293 A1 | 8/2023 | Zhao et al. |
| 2023/0261297 A1 | 8/2023 | Lai et al. |
| 2023/0261299 A1 | 8/2023 | Wang et al. |
| 2023/0261302 A1 | 8/2023 | Bader et al. |
| 2023/0261325 A1 | 8/2023 | Lee et al. |
| 2023/0261349 A1 | 8/2023 | Park |
| 2023/0266400 A1 | 8/2023 | Kim et al. |
| 2023/0266402 A1 | 8/2023 | Lee et al. |
| 2023/0268584 A1 | 8/2023 | Han et al. |
| 2023/0268595 A1 | 8/2023 | Kim |
| 2023/0268601 A1 | 8/2023 | Sun et al. |
| 2023/0268609 A1 | 8/2023 | Kim et al. |
| 2023/0268612 A1 | 8/2023 | Lee et al. |
| 2023/0271834 A1 | 8/2023 | Kim et al. |
| 2023/0275236 A1 | 8/2023 | Hu et al. |
| 2023/0275281 A1 | 8/2023 | Park et al. |
| 2023/0275283 A1 | 8/2023 | Han et al. |
| 2023/0275285 A1 | 8/2023 | Keum et al. |
| 2023/0275286 A1 | 8/2023 | Hong et al. |
| 2023/0275291 A1 | 8/2023 | Park et al. |
| 2023/0275295 A1 | 8/2023 | Yamaguchi et al. |
| 2023/0275300 A1 | 8/2023 | Kim et al. |
| 2023/0275303 A1 | 8/2023 | Ender et al. |
| 2023/0275306 A1 | 8/2023 | Oh et al. |
| 2023/0275313 A1 | 8/2023 | Yoon |
| 2023/0275315 A1 | 8/2023 | Kim et al. |
| 2023/0275322 A1 | 8/2023 | Shin et al. |
| 2023/0278431 A1 | 9/2023 | Kim et al. |
| 2023/0282819 A1 | 9/2023 | Tokoro et al. |
| 2023/0282872 A1 | 9/2023 | Kim |
| 2023/0282901 A1 | 9/2023 | Jung et al. |
| 2023/0282915 A1 | 9/2023 | Ryu et al. |
| 2023/0282920 A1 | 9/2023 | Gudimani et al. |
| 2023/0282925 A1 | 9/2023 | Jang et al. |
| 2023/0290989 A1 | 9/2023 | Sim et al. |
| 2023/0291025 A1 | 9/2023 | Park et al. |
| 2023/0291030 A1 | 9/2023 | Yu et al. |
| 2023/0291035 A1 | 9/2023 | Jang et al. |
| 2023/0291054 A1 | 9/2023 | Ender et al. |
| 2023/0291064 A1 | 9/2023 | Kim et al. |
| 2023/0291070 A1 | 9/2023 | Park et al. |
| 2023/0296688 A1 | 9/2023 | Kim et al. |
| 2023/0299346 A1 | 9/2023 | Park et al. |
| 2023/0299360 A1 | 9/2023 | Han et al. |
| 2023/0299383 A1 | 9/2023 | Jang et al. |
| 2023/0299406 A1 | 9/2023 | Yang et al. |
| 2023/0299414 A1 | 9/2023 | Yoon et al. |
| 2023/0299416 A1 | 9/2023 | Lee et al. |
| 2023/0299422 A1 | 9/2023 | Kim et al. |
| 2023/0299431 A1 | 9/2023 | Kim et al. |
| 2023/0304734 A1 | 9/2023 | Kim et al. |
| 2023/0307652 A1 | 9/2023 | Nishimura et al. |
| 2023/0307686 A1 | 9/2023 | Jeung et al. |
| 2023/0307689 A1 | 9/2023 | Lim et al. |
| 2023/0307739 A1 | 9/2023 | Park et al. |
| 2023/0307745 A1 | 9/2023 | Keum et al. |
| 2023/0307782 A1 | 9/2023 | Yang et al. |
| 2023/0307804 A1 | 9/2023 | Jung et al. |
| 2023/0307807 A1 | 9/2023 | Lee |
| 2023/0314516 A1 | 10/2023 | Lee et al. |
| 2023/0317320 A1 | 10/2023 | Hengstler et al. |
| 2023/0318007 A1 | 10/2023 | Lee et al. |
| 2023/0318013 A1 | 10/2023 | Han |
| 2023/0318039 A1 | 10/2023 | Lee et al. |
| 2023/0318043 A1 | 10/2023 | Lim et al. |
| 2023/0318056 A1 | 10/2023 | Jun et al. |
| 2023/0318059 A1 | 10/2023 | Han et al. |
| 2023/0318060 A1 | 10/2023 | Han et al. |
| 2023/0318078 A1 | 10/2023 | Park et al. |
| 2023/0318082 A1 | 10/2023 | Oh et al. |
| 2023/0318083 A1 | 10/2023 | Hong et al. |
| 2023/0318105 A1 | 10/2023 | Boulanger et al. |
| 2023/0318128 A1 | 10/2023 | Kim et al. |
| 2023/0327125 A1 | 10/2023 | Han et al. |
| 2023/0327220 A1 | 10/2023 | Hu et al. |
| 2023/0327294 A1 | 10/2023 | Kim et al. |
| 2023/0327303 A1 | 10/2023 | Kim et al. |
| 2023/0331091 A1 | 10/2023 | Choi et al. |
| 2023/0331583 A1 | 10/2023 | Yoo et al. |
| 2023/0333618 A1 | 10/2023 | Goyal et al. |

(56)        References Cited

U.S. PATENT DOCUMENTS

| | | |
|---|---|---|
| 2023/0335718 A1 | 10/2023 | Kim et al. |
| 2023/0335775 A1 | 10/2023 | Yang |
| 2023/0335837 A1 | 10/2023 | Chen et al. |
| 2023/0335838 A1 | 10/2023 | Lim et al. |
| 2023/0335846 A1 | 10/2023 | Jeon et al. |
| 2023/0335871 A1 | 10/2023 | Park et al. |
| 2023/0339038 A1 | 10/2023 | Son et al. |
| 2023/0341468 A1 | 10/2023 | Park et al. |
| 2023/0343918 A1 | 10/2023 | Choi et al. |
| 2023/0343988 A1 | 10/2023 | Kim et al. |
| 2023/0344034 A1 | 10/2023 | Rhim et al. |
| 2023/0344075 A1 | 10/2023 | Lee et al. |
| 2023/0344248 A1 | 10/2023 | Park |
| 2023/0347493 A1 | 11/2023 | Donapudi |
| 2023/0347755 A1 | 11/2023 | Park et al. |
| 2023/0349981 A1 | 11/2023 | Miftahullatif et al. |
| 2023/0352724 A1 | 11/2023 | Okamoto et al. |
| 2023/0352732 A1 | 11/2023 | Chae et al. |
| 2023/0352793 A1 | 11/2023 | Kim |
| 2023/0361299 A1 | 11/2023 | Aoki et al. |
| 2023/0361302 A1 | 11/2023 | Kim et al. |
| 2023/0361313 A1 | 11/2023 | Aoki et al. |
| 2023/0361344 A1 | 11/2023 | Ji et al. |
| 2023/0361397 A1 | 11/2023 | Sheng et al. |
| 2023/0361402 A1 | 11/2023 | Lee et al. |
| 2023/0361404 A1 | 11/2023 | Lee et al. |
| 2023/0361405 A1 | 11/2023 | Hong et al. |
| 2023/0361417 A1 | 11/2023 | Chun et al. |
| 2023/0361421 A1 | 11/2023 | Yuan et al. |
| 2023/0361422 A1 | 11/2023 | Hong et al. |
| 2023/0365732 A1 | 11/2023 | Chu et al. |
| 2023/0366623 A1 | 11/2023 | Koo et al. |
| 2023/0366938 A1 | 11/2023 | Lee |
| 2023/0366940 A1 | 11/2023 | Choi |
| 2023/0369557 A1 | 11/2023 | Chung et al. |
| 2023/0369558 A1 | 11/2023 | Kim et al. |
| 2023/0369563 A1 | 11/2023 | Tang et al. |
| 2023/0369599 A1 | 11/2023 | Chu et al. |
| 2023/0369601 A1 | 11/2023 | Kim et al. |
| 2023/0369657 A1 | 11/2023 | Tang et al. |
| 2023/0369675 A1 | 11/2023 | Park et al. |
| 2023/0369693 A1 | 11/2023 | Lan et al. |
| 2023/0369721 A1 | 11/2023 | Zhang et al. |
| 2023/0369877 A1 | 11/2023 | Choi |
| 2023/0378463 A1 | 11/2023 | Wang et al. |
| 2023/0378510 A1 | 11/2023 | Oh et al. |
| 2023/0378511 A1 | 11/2023 | Kim et al. |
| 2023/0378567 A1 | 11/2023 | Hong et al. |
| 2023/0378568 A1 | 11/2023 | Park et al. |
| 2023/0378597 A1 | 11/2023 | Jang et al. |
| 2023/0378599 A1 | 11/2023 | Lee et al. |
| 2023/0378601 A1 | 11/2023 | Lee et al. |
| 2023/0378605 A1 | 11/2023 | Lee et al. |
| 2023/0378621 A1 | 11/2023 | Silha et al. |
| 2023/0387405 A1 | 11/2023 | Jung et al. |
| 2023/0387520 A1 | 11/2023 | Cai et al. |
| 2023/0387530 A1 | 11/2023 | Park et al. |
| 2023/0387531 A1 | 11/2023 | Kim |
| 2023/0387538 A1 | 11/2023 | Kim et al. |
| 2023/0393214 A1 | 12/2023 | Cha et al. |
| 2023/0395905 A1 | 12/2023 | Sheng et al. |
| 2023/0395912 A1 | 12/2023 | Lim et al. |
| 2023/0395919 A1 | 12/2023 | Jeong et al. |
| 2023/0395929 A1 | 12/2023 | Shi et al. |
| 2023/0395946 A1 | 12/2023 | Jin et al. |
| 2023/0395956 A1 | 12/2023 | Jo et al. |
| 2023/0398758 A1 | 12/2023 | Lee et al. |
| 2023/0402598 A1 | 12/2023 | Jung et al. |
| 2023/0402690 A1 | 12/2023 | Jo et al. |
| 2023/0402856 A1 | 12/2023 | Kang et al. |
| 2023/0402862 A1 | 12/2023 | Lee |
| 2023/0411760 A1 | 12/2023 | Lee et al. |
| 2023/0411762 A1 | 12/2023 | Hwang |
| 2023/0411789 A1 | 12/2023 | Lee et al. |
| 2023/0411796 A1 | 12/2023 | Kim et al. |
| 2023/0411801 A1 | 12/2023 | Silha et al. |
| 2023/0411805 A1 | 12/2023 | Choi et al. |
| 2023/0420659 A1 | 12/2023 | Xu et al. |
| 2023/0420721 A1 | 12/2023 | Lee et al. |
| 2023/0420723 A1 | 12/2023 | Yan et al. |
| 2023/0420966 A1 | 12/2023 | Hu |
| 2023/0420974 A1 | 12/2023 | Choi et al. |
| 2024/0003980 A1 | 1/2024 | Lee |
| 2024/0006585 A1 | 1/2024 | Wu et al. |
| 2024/0006670 A1 | 1/2024 | Lim |
| 2024/0006693 A1 | 1/2024 | Wu et al. |
| 2024/0006700 A1 | 1/2024 | Fassbender et al. |
| 2024/0006707 A1 | 1/2024 | Han |
| 2024/0006711 A1 | 1/2024 | Yang |
| 2024/0006722 A1 | 1/2024 | Lee et al. |
| 2024/0006907 A1 | 1/2024 | Jeong et al. |
| 2024/0010877 A1 | 1/2024 | Zhang |
| 2024/0012058 A1 | 1/2024 | Lim |
| 2024/0014392 A1 | 1/2024 | An et al. |
| 2024/0014443 A1 | 1/2024 | Kim et al. |
| 2024/0014489 A1 | 1/2024 | Kim et al. |
| 2024/0014521 A1 | 1/2024 | Choi et al. |
| 2024/0014522 A1 | 1/2024 | Jo et al. |
| 2024/0014526 A1 | 1/2024 | Park et al. |
| 2024/0021782 A1 | 1/2024 | Tang et al. |
| 2024/0021892 A1 | 1/2024 | Zhang et al. |
| 2024/0021919 A1 | 1/2024 | Wang et al. |
| 2024/0021956 A1 | 1/2024 | Zhao et al. |
| 2024/0021961 A1 | 1/2024 | Guo et al. |
| 2024/0021962 A1 | 1/2024 | Kim et al. |
| 2024/0021966 A1 | 1/2024 | Yan et al. |
| 2024/0024714 A1 | 1/2024 | Lee et al. |
| 2024/0027537 A1 | 1/2024 | Lim et al. |
| 2024/0030433 A1 | 1/2024 | Wu et al. |
| 2024/0030457 A1 | 1/2024 | Hong et al. |
| 2024/0030512 A1 | 1/2024 | Jung et al. |
| 2024/0030521 A1 | 1/2024 | Dong |
| 2024/0030526 A1 | 1/2024 | Zhi |
| 2024/0030528 A1 | 1/2024 | Li |
| 2024/0030535 A1 | 1/2024 | Subramanian et al. |
| 2024/0030539 A1 | 1/2024 | Li |
| 2024/0030540 A1 | 1/2024 | Li et al. |
| 2024/0030549 A1 | 1/2024 | Kim et al. |
| 2024/0030559 A1 | 1/2024 | Shin et al. |
| 2024/0030563 A1 | 1/2024 | Zeng et al. |
| 2024/0030567 A1 | 1/2024 | Zhang et al. |
| 2024/0034632 A1 | 2/2024 | Lee et al. |
| 2024/0038983 A1 | 2/2024 | Eom et al. |
| 2024/0039027 A1 | 2/2024 | Lee et al. |
| 2024/0039056 A1 | 2/2024 | Kim |
| 2024/0039084 A1 | 2/2024 | Rhim et al. |
| 2024/0039114 A1 | 2/2024 | Kim et al. |
| 2024/0039125 A1 | 2/2024 | Ryu |
| 2024/0042557 A1 | 2/2024 | Lim et al. |
| 2024/0047667 A1 | 2/2024 | Eom et al. |
| 2024/0047694 A1 | 2/2024 | Horikawa et al. |
| 2024/0047695 A1 | 2/2024 | Horikawa et al. |
| 2024/0047696 A1 | 2/2024 | Endo et al. |
| 2024/0047789 A1 | 2/2024 | Yan et al. |
| 2024/0055645 A1 | 2/2024 | Park et al. |
| 2024/0055661 A1 | 2/2024 | Lee et al. |
| 2024/0055672 A1 | 2/2024 | Kim et al. |
| 2024/0063423 A1 | 2/2024 | Choi et al. |
| 2024/0063474 A1 | 2/2024 | Hong et al. |
| 2024/0063512 A1 | 2/2024 | Kim et al. |
| 2024/0063517 A1 | 2/2024 | Hwangbo et al. |
| 2024/0072244 A1 | 2/2024 | Lee et al. |
| 2024/0072370 A1 | 2/2024 | Jo et al. |
| 2024/0072374 A1 | 2/2024 | Kim et al. |
| 2024/0072387 A1 | 2/2024 | Park et al. |
| 2024/0072401 A1 | 2/2024 | Jo et al. |
| 2024/0079584 A1 | 3/2024 | Heo et al. |
| 2024/0079633 A1 | 3/2024 | Lee et al. |
| 2024/0079634 A1 | 3/2024 | Gong |
| 2024/0079704 A1 | 3/2024 | Lee et al. |
| 2024/0079751 A1 | 3/2024 | Park et al. |
| 2024/0088347 A1 | 3/2024 | Choi et al. |
| 2024/0088366 A1 | 3/2024 | Kim et al. |
| 2024/0088373 A1 | 3/2024 | Jun et al. |

(56)     References Cited

U.S. PATENT DOCUMENTS

| 2024/0088379 A1 | 3/2024 | Jung et al. |
| 2024/0088506 A1 | 3/2024 | Luo et al. |
| 2024/0088520 A1 | 3/2024 | Kwon et al. |
| 2024/0097112 A1 | 3/2024 | Lee et al. |
| 2024/0105961 A1 | 3/2024 | Yun et al. |
| 2024/0106035 A1 | 3/2024 | Zhang et al. |
| 2024/0106079 A1 | 3/2024 | An |
| 2024/0109789 A1 | 4/2024 | Jung et al. |
| 2024/0109858 A1 | 4/2024 | Kim et al. |
| 2024/0113351 A1 | 4/2024 | Torsteni et al. |
| 2024/0120468 A1 | 4/2024 | Kim et al. |
| 2024/0120495 A1 | 4/2024 | Yun et al. |
| 2024/0120520 A1 | 4/2024 | Sasago et al. |
| 2024/0120524 A1 | 4/2024 | Ueno et al. |
| 2024/0120546 A1 | 4/2024 | Lee |
| 2024/0120547 A1 | 4/2024 | Yun et al. |
| 2024/0120555 A1 | 4/2024 | Kim et al. |
| 2024/0120576 A1 | 4/2024 | Yu et al. |
| 2024/0123481 A1 | 4/2024 | Lim et al. |
| 2024/0125860 A1 | 4/2024 | Miftahullatif et al. |
| 2024/0128463 A1 | 4/2024 | Endo et al. |
| 2024/0128464 A1 | 4/2024 | Zhang et al. |
| 2024/0128496 A1 | 4/2024 | Takeuchi et al. |
| 2024/0128516 A1 | 4/2024 | Takeuchi et al. |
| 2024/0128570 A1 | 4/2024 | Jang et al. |
| 2024/0128576 A1 | 4/2024 | Jakob |
| 2024/0128590 A1 | 4/2024 | Min et al. |
| 2024/0128605 A1 | 4/2024 | Kim et al. |
| 2024/0128608 A1 | 4/2024 | Kang et al. |
| 2024/0128619 A1 | 4/2024 | Watanabe et al. |
| 2024/0132375 A1 | 4/2024 | Lho et al. |
| 2024/0136630 A1 | 4/2024 | Chi et al. |
| 2024/0136649 A1 | 4/2024 | Kim et al. |
| 2024/0136650 A1 | 4/2024 | Jo et al. |
| 2024/0136664 A1 | 4/2024 | Jo et al. |
| 2024/0137017 A1 | 4/2024 | Chae et al. |
| 2024/0139850 A1 | 5/2024 | Park et al. |
| 2024/0145672 A1 | 5/2024 | Jung et al. |
| 2024/0145674 A1 | 5/2024 | Jung et al. |
| 2024/0154090 A1 | 5/2024 | Lee et al. |
| 2024/0158260 A1 | 5/2024 | Nakabayashi et al. |
| 2024/0162480 A1 | 5/2024 | Kato et al. |
| 2024/0162572 A1 | 5/2024 | Jung et al. |
| 2024/0162575 A1 | 5/2024 | Elfering et al. |
| 2024/0162723 A1 | 5/2024 | Zipf et al. |
| 2024/0170819 A1 | 5/2024 | Shin |
| 2024/0175832 A1 | 5/2024 | Cho et al. |
| 2024/0178434 A1 | 5/2024 | Dong et al. |
| 2024/0182325 A1 | 6/2024 | Mok et al. |
| 2024/0186601 A1 | 6/2024 | Meyer et al. |
| 2024/0186631 A1 | 6/2024 | Zidel et al. |
| 2024/0186637 A1 | 6/2024 | Silha et al. |
| 2024/0186638 A1 | 6/2024 | Castaños et al. |
| 2024/0186640 A1 | 6/2024 | Meyer et al. |
| 2024/0186665 A1 | 6/2024 | Zidel et al. |
| 2024/0194927 A1 | 6/2024 | Kim et al. |
| 2024/0204629 A1 | 6/2024 | Xu et al. |
| 2024/0210485 A1 | 6/2024 | Kouno et al. |
| 2024/0222730 A1 | 7/2024 | Kuhlmann |
| 2024/0222746 A1 | 7/2024 | Li et al. |
| 2024/0243412 A1 | 7/2024 | Chen et al. |
| 2024/0243427 A1 | 7/2024 | Ryu et al. |
| 2024/0250321 A1 | 7/2024 | Mitsuyama et al. |
| 2024/0250363 A1 | 7/2024 | Wang et al. |
| 2024/0258606 A1 | 8/2024 | Yoshida et al. |
| 2024/0258631 A1 | 8/2024 | Chen et al. |
| 2024/0258665 A1 | 8/2024 | Wang et al. |
| 2024/0266619 A1 | 8/2024 | Yamaguchi et al. |
| 2024/0266699 A1 | 8/2024 | Li et al. |
| 2024/0274952 A1 | 8/2024 | Guo et al. |
| 2024/0279884 A1 | 8/2024 | Ivanov et al. |
| 2024/0282949 A1 | 8/2024 | Zhou |
| 2024/0283118 A1 | 8/2024 | Shang et al. |
| 2024/0291584 A1 | 8/2024 | Noguchi et al. |
| 2024/0297349 A1 | 9/2024 | Lee et al. |
| 2024/0297377 A1 | 9/2024 | Seol et al. |
| 2024/0297387 A1 | 9/2024 | Yue et al. |
| 2024/0299961 A1 | 9/2024 | Okamoto et al. |
| 2024/0300825 A1 | 9/2024 | Takano et al. |
| 2024/0304809 A1 | 9/2024 | Zhu et al. |
| 2024/0304916 A1 | 9/2024 | Tanaka et al. |
| 2024/0304940 A1 | 9/2024 | Li et al. |
| 2024/0305117 A1 | 9/2024 | Matsuzaki et al. |
| 2024/0313215 A1 | 9/2024 | Zhou |
| 2024/0313252 A1 | 9/2024 | Park et al. |
| 2024/0313259 A1 | 9/2024 | Masuko et al. |
| 2024/0313345 A1 | 9/2024 | Tange |
| 2024/0313371 A1 | 9/2024 | Jung et al. |
| 2024/0318441 A1 | 9/2024 | Janecke et al. |
| 2024/0322167 A1 | 9/2024 | Kim et al. |
| 2024/0322290 A1 | 9/2024 | Xi |
| 2024/0322356 A1 | 9/2024 | Park et al. |
| 2024/0322587 A1 | 9/2024 | Gigot et al. |
| 2024/0326222 A1 | 10/2024 | Takehisa et al. |
| 2024/0332710 A1 | 10/2024 | Janecke |
| 2024/0333015 A1 | 10/2024 | Segret et al. |
| 2024/0337702 A1 | 10/2024 | Braun et al. |
| 2024/0339668 A1 | 10/2024 | Zhang et al. |
| 2024/0339680 A1 | 10/2024 | Mayer et al. |
| 2024/0339855 A1 | 10/2024 | Landesfeind et al. |
| 2024/0342710 A1 | 10/2024 | Knies et al. |
| 2024/0343162 A1 | 10/2024 | Hoegele et al. |
| 2024/0347768 A1 | 10/2024 | Kang et al. |
| 2024/0347831 A1 | 10/2024 | He et al. |
| 2024/0348076 A1 | 10/2024 | Stanger |
| 2024/0363980 A1 | 10/2024 | Xu et al. |
| 2024/0363985 A1 | 10/2024 | Shang et al. |
| 2024/0367428 A1 | 11/2024 | Lee et al. |
| 2024/0372090 A1 | 11/2024 | Zeng et al. |
| 2024/0372233 A1 | 11/2024 | Liu |
| 2024/0379935 A1 | 11/2024 | Kim et al. |
| 2024/0380228 A1 | 11/2024 | Engelfried et al. |
| 2024/0387804 A1 | 11/2024 | Liu et al. |
| 2024/0387888 A1 | 11/2024 | Matsuoka et al. |
| 2024/0396070 A1 | 11/2024 | Sugiyo |
| 2024/0402867 A1 | 12/2024 | Su et al. |
| 2024/0413385 A1 | 12/2024 | Ueno et al. |
| 2024/0413473 A1 | 12/2024 | Qian et al. |
| 2025/0004061 A1 | 1/2025 | Zhou et al. |
| 2025/0015623 A1 | 1/2025 | Osswald et al. |
| 2025/0020727 A1 | 1/2025 | Chen et al. |
| 2025/0102596 A1 | 3/2025 | Goltz et al. |
| 2025/0226462 A1 | 7/2025 | Gavrilov et al. |

FOREIGN PATENT DOCUMENTS

| CN | 101907497 B | 11/2013 |
| CN | 203339778 U | 12/2013 |
| CN | 103738615 A | 4/2014 |
| CN | 203982224 U | 12/2014 |
| CN | 204068383 U | 12/2014 |
| CN | 104659828 A | 5/2015 |
| CN | 104659841 A | 5/2015 |
| CN | 104734234 A | 6/2015 |
| CN | 104734238 A | 6/2015 |
| CN | 104734240 A | 6/2015 |
| CN | 105226300 A | 1/2016 |
| CN | 103579538 B | 4/2016 |
| CN | 105553000 A | 5/2016 |
| CN | 105634053 A | 6/2016 |
| CN | 105762314 A | 7/2016 |
| CN | 105789356 A | 7/2016 |
| CN | 106058083 A | 10/2016 |
| CN | 106450098 A | 2/2017 |
| CN | 206076300 U | 4/2017 |
| CN | 106654097 A | 5/2017 |
| CN | 106684991 A | 5/2017 |
| CN | 107104486 A | 8/2017 |
| CN | 206452130 U | 8/2017 |
| CN | 206452151 U | 8/2017 |
| CN | 206490122 U | 9/2017 |
| CN | 107293652 A | 10/2017 |
| CN | 206663859 U | 11/2017 |
| CN | 107437833 A | 12/2017 |

(56) References Cited

FOREIGN PATENT DOCUMENTS

| | | | |
|---|---|---|---|
| CN | 206820508 U | 12/2017 |
| CN | 107565635 A | 1/2018 |
| CN | 107593085 A | 1/2018 |
| CN | 107612094 A | 1/2018 |
| CN | 206834248 U | 1/2018 |
| CN | 107711043 A | 2/2018 |
| CN | 107733019 A | 2/2018 |
| CN | 107787665 A | 3/2018 |
| CN | 107834646 A | 3/2018 |
| CN | 107910485 A | 4/2018 |
| CN | 207304110 U | 5/2018 |
| CN | 110915015 B | 6/2018 |
| CN | 207442495 U | 6/2018 |
| CN | 207542858 U | 6/2018 |
| CN | 108365797 A | 8/2018 |
| CN | 108428809 A | 8/2018 |
| CN | 108428811 A | 8/2018 |
| CN | 108428813 A | 8/2018 |
| CN | 108933464 A | 12/2018 |
| CN | 208298917 U | 12/2018 |
| CN | 109196752 A | 1/2019 |
| CN | 208369285 U | 1/2019 |
| CN | 208480301 U | 2/2019 |
| CN | 109428107 A | 3/2019 |
| CN | 208819942 U | 5/2019 |
| CN | 109904896 A | 6/2019 |
| CN | 109950965 A | 6/2019 |
| CN | 110086048 A | 8/2019 |
| CN | 110190319 A | 8/2019 |
| CN | 110265738 A | 9/2019 |
| CN | 110474023 A | 11/2019 |
| CN | 110492033 A | 11/2019 |
| CN | 110660935 B | 1/2020 |
| CN | 110676403 A | 1/2020 |
| CN | 110783501 B | 2/2020 |
| CN | 111162327 A | 5/2020 |
| CN | 111192929 A | 5/2020 |
| CN | 111211256 A | 5/2020 |
| CN | 111211257 A | 5/2020 |
| CN | 210489660 U | 5/2020 |
| CN | 111244527 A | 6/2020 |
| CN | 111584926 A | 8/2020 |
| CN | 111854991 A | 10/2020 |
| CN | 111919378 A | 11/2020 |
| CN | 112117480 A | 12/2020 |
| CN | 212137340 U | 12/2020 |
| CN | 108428812 B | 2/2021 |
| CN | 212486875 U | 2/2021 |
| CN | 212515710 U | 2/2021 |
| CN | 212603866 U | 2/2021 |
| CN | 212625867 U | 2/2021 |
| CN | 108428810 B | 3/2021 |
| CN | 112542639 A | 3/2021 |
| CN | 112542645 A | 3/2021 |
| CN | 112542663 A | 3/2021 |
| CN | 112599894 A | 4/2021 |
| CN | 112599895 A | 4/2021 |
| CN | 112687993 A | 4/2021 |
| CN | 213043020 U | 4/2021 |
| CN | 213212234 U | 5/2021 |
| CN | 108574058 B | 6/2021 |
| CN | 112886105 A | 6/2021 |
| CN | 113054293 A | 6/2021 |
| CN | 213459857 U | 6/2021 |
| CN | 113067060 A | 7/2021 |
| CN | 113067069 A | 7/2021 |
| CN | 113078391 A | 7/2021 |
| CN | 113078392 A | 7/2021 |
| CN | 113097609 A | 7/2021 |
| CN | 113097610 A | 7/2021 |
| CN | 113131055 A | 7/2021 |
| CN | 213635886 U | 7/2021 |
| CN | 213920044 U | 8/2021 |
| CN | 213989034 U | 8/2021 |
| CN | 108428814 B | 9/2021 |
| CN | 113354921 A | 9/2021 |
| CN | 113363555 A | 9/2021 |
| CN | 113363637 A | 9/2021 |
| CN | 113363641 A | 9/2021 |
| CN | 214254669 U | 9/2021 |
| CN | 113488735 A | 10/2021 |
| CN | 214411330 U | 10/2021 |
| CN | 214428699 U | 10/2021 |
| CN | 214542315 U | 10/2021 |
| CN | 109986850 B | 11/2021 |
| CN | 113725478 A | 11/2021 |
| CN | 214797549 U | 11/2021 |
| CN | 214957079 U | 11/2021 |
| CN | 215070051 U | 12/2021 |
| CN | 113991234 A | 1/2022 |
| CN | 215418325 U | 1/2022 |
| CN | 215418413 U | 1/2022 |
| CN | 109428024 B | 2/2022 |
| CN | 110323366 B | 2/2022 |
| CN | 215869528 U | 2/2022 |
| CN | 215869700 U | 2/2022 |
| CN | 215989140 U | 3/2022 |
| CN | 216085079 U | 3/2022 |
| CN | 216085096 U | 3/2022 |
| CN | 216085229 U | 3/2022 |
| CN | 216123004 U | 3/2022 |
| CN | 216133922 U | 3/2022 |
| CN | 216250878 U | 4/2022 |
| CN | 216488382 U | 5/2022 |
| CN | 109923710 B | 7/2022 |
| CN | 111638460 B | 7/2022 |
| CN | 111788157 B | 7/2022 |
| CN | 111969214 B | 7/2022 |
| CN | 112582716 B | 7/2022 |
| CN | 112687994 B | 7/2022 |
| CN | 113013390 B | 7/2022 |
| CN | 113299918 B | 7/2022 |
| CN | 113300048 B | 7/2022 |
| CN | 113383457 B | 7/2022 |
| CN | 114221422 B | 7/2022 |
| CN | 114361458 B | 7/2022 |
| CN | 114759641 A | 7/2022 |
| CN | 114784228 A | 7/2022 |
| CN | 114784364 A | 7/2022 |
| CN | 114784420 A | 7/2022 |
| CN | 114788079 A | 7/2022 |
| CN | 114789028 A | 7/2022 |
| CN | 114792836 A | 7/2022 |
| CN | 114792849 A | 7/2022 |
| CN | 216980650 U | 7/2022 |
| CN | 216980720 U | 7/2022 |
| CN | 217035747 U | 7/2022 |
| CN | 217035892 U | 7/2022 |
| CN | 217036776 U | 7/2022 |
| CN | 217062165 U | 7/2022 |
| CN | 217062166 U | 7/2022 |
| CN | 217062167 U | 7/2022 |
| CN | 217062176 U | 7/2022 |
| CN | 217062203 U | 7/2022 |
| CN | 217062221 U | 7/2022 |
| CN | 217062229 U | 7/2022 |
| CN | 217062238 U | 7/2022 |
| CN | 217062239 U | 7/2022 |
| CN | 217062256 U | 7/2022 |
| CN | 217062297 U | 7/2022 |
| CN | 217062315 U | 7/2022 |
| CN | 217062328 U | 7/2022 |
| CN | 217062356 U | 7/2022 |
| CN | 217062410 U | 7/2022 |
| CN | 217062426 U | 7/2022 |
| CN | 217062435 U | 7/2022 |
| CN | 217062447 U | 7/2022 |
| CN | 107415721 B | 8/2022 |
| CN | 107963040 B | 8/2022 |
| CN | 110062981 B | 8/2022 |
| CN | 110785870 B | 8/2022 |
| CN | 110997750 B | 8/2022 |
| CN | 111900468 B | 8/2022 |
| CN | 112151866 B | 8/2022 |

(56) References Cited

FOREIGN PATENT DOCUMENTS

| | | | |
|---|---|---|---|
| CN | 112271769 | B | 8/2022 |
| CN | 112467210 | B | 8/2022 |
| CN | 112635717 | B | 8/2022 |
| CN | 112750976 | B | 8/2022 |
| CN | 112763545 | B | 8/2022 |
| CN | 113097439 | B | 8/2022 |
| CN | 113437452 | B | 8/2022 |
| CN | 113451583 | B | 8/2022 |
| CN | 113540703 | B | 8/2022 |
| CN | 113611841 | B | 8/2022 |
| CN | 113937250 | B | 8/2022 |
| CN | 114024021 | B | 8/2022 |
| CN | 114024034 | B | 8/2022 |
| CN | 114497826 | B | 8/2022 |
| CN | 114614069 | B | 8/2022 |
| CN | 114744149 | B | 8/2022 |
| CN | 114843624 | A | 8/2022 |
| CN | 114927640 | A | 8/2022 |
| CN | 114937843 | A | 8/2022 |
| CN | 114944467 | A | 8/2022 |
| CN | 114944511 | A | 8/2022 |
| CN | 114944684 | A | 8/2022 |
| CN | 114946069 | A | 8/2022 |
| CN | 114946076 | A | 8/2022 |
| CN | 114964502 | A | 8/2022 |
| CN | 114964643 | A | 8/2022 |
| CN | 114975854 | A | 8/2022 |
| CN | 114975855 | A | 8/2022 |
| CN | 114975856 | A | 8/2022 |
| CN | 114975857 | A | 8/2022 |
| CN | 114975860 | A | 8/2022 |
| CN | 114975862 | A | 8/2022 |
| CN | 114975955 | A | 8/2022 |
| CN | 114976029 | A | 8/2022 |
| CN | 114976247 | A | 8/2022 |
| CN | 114976248 | A | 8/2022 |
| CN | 114976327 | A | 8/2022 |
| CN | 114976328 | A | 8/2022 |
| CN | 114976426 | A | 8/2022 |
| CN | 114976489 | A | 8/2022 |
| CN | 114976507 | A | 8/2022 |
| CN | 114977369 | A | 8/2022 |
| CN | 114982033 | A | 8/2022 |
| CN | 217239521 | U | 8/2022 |
| CN | 217239607 | U | 8/2022 |
| CN | 217280916 | U | 8/2022 |
| CN | 217281090 | U | 8/2022 |
| CN | 217281132 | U | 8/2022 |
| CN | 217306587 | U | 8/2022 |
| CN | 217306714 | U | 8/2022 |
| CN | 217306721 | U | 8/2022 |
| CN | 217306722 | U | 8/2022 |
| CN | 217306782 | U | 8/2022 |
| CN | 217314660 | U | 8/2022 |
| CN | 217330617 | U | 8/2022 |
| CN | 217334142 | U | 8/2022 |
| CN | 217334179 | U | 8/2022 |
| CN | 217334200 | U | 8/2022 |
| CN | 217334228 | U | 8/2022 |
| CN | 217334238 | U | 8/2022 |
| CN | 217334242 | U | 8/2022 |
| CN | 217334244 | U | 8/2022 |
| CN | 217334245 | U | 8/2022 |
| CN | 217334279 | U | 8/2022 |
| CN | 217334313 | U | 8/2022 |
| CN | 217334325 | U | 8/2022 |
| CN | 217334332 | U | 8/2022 |
| CN | 217334339 | U | 8/2022 |
| CN | 217334352 | U | 8/2022 |
| CN | 217334356 | U | 8/2022 |
| CN | 217334361 | U | 8/2022 |
| CN | 111630690 | B | 9/2022 |
| CN | 112332038 | B | 9/2022 |
| CN | 112500810 | B | 9/2022 |
| CN | 112625062 | B | 9/2022 |
| CN | 112820856 | B | 9/2022 |
| CN | 113140704 | B | 9/2022 |
| CN | 113193166 | B | 9/2022 |
| CN | 114024030 | B | 9/2022 |
| CN | 114094186 | B | 9/2022 |
| CN | 114665194 | B | 9/2022 |
| CN | 114988134 | A | 9/2022 |
| CN | 115000346 | A | 9/2022 |
| CN | 115000401 | A | 9/2022 |
| CN | 115000517 | A | 9/2022 |
| CN | 115000629 | A | 9/2022 |
| CN | 115000640 | A | 9/2022 |
| CN | 115000641 | A | 9/2022 |
| CN | 115020632 | A | 9/2022 |
| CN | 115020638 | A | 9/2022 |
| CN | 115020639 | A | 9/2022 |
| CN | 115020832 | A | 9/2022 |
| CN | 115020836 | A | 9/2022 |
| CN | 115020850 | A | 9/2022 |
| CN | 115020872 | A | 9/2022 |
| CN | 115020936 | A | 9/2022 |
| CN | 115021375 | A | 9/2022 |
| CN | 115032539 | A | 9/2022 |
| CN | 115036451 | A | 9/2022 |
| CN | 115036452 | A | 9/2022 |
| CN | 115036458 | A | 9/2022 |
| CN | 115036459 | A | 9/2022 |
| CN | 115036460 | A | 9/2022 |
| CN | 115036570 | A | 9/2022 |
| CN | 115036643 | A | 9/2022 |
| CN | 115036648 | A | 9/2022 |
| CN | 115039268 | A | 9/2022 |
| CN | 115051045 | A | 9/2022 |
| CN | 115051079 | A | 9/2022 |
| CN | 115051085 | A | 9/2022 |
| CN | 115051097 | A | 9/2022 |
| CN | 115051190 | A | 9/2022 |
| CN | 115055867 | A | 9/2022 |
| CN | 115064658 | A | 9/2022 |
| CN | 115064754 | A | 9/2022 |
| CN | 115064757 | A | 9/2022 |
| CN | 115064812 | A | 9/2022 |
| CN | 115064823 | A | 9/2022 |
| CN | 115064847 | A | 9/2022 |
| CN | 115084422 | A | 9/2022 |
| CN | 115084429 | A | 9/2022 |
| CN | 115084434 | A | 9/2022 |
| CN | 115084437 | A | 9/2022 |
| CN | 115084526 | A | 9/2022 |
| CN | 115084654 | A | 9/2022 |
| CN | 115084733 | A | 9/2022 |
| CN | 115084740 | A | 9/2022 |
| CN | 115084782 | A | 9/2022 |
| CN | 115107574 | A | 9/2022 |
| CN | 115117352 | A | 9/2022 |
| CN | 115117356 | A | 9/2022 |
| CN | 115117357 | A | 9/2022 |
| CN | 115117358 | A | 9/2022 |
| CN | 115117359 | A | 9/2022 |
| CN | 115117416 | A | 9/2022 |
| CN | 115117458 | A | 9/2022 |
| CN | 115117462 | A | 9/2022 |
| CN | 115117483 | A | 9/2022 |
| CN | 115118789 | A | 9/2022 |
| CN | 115124638 | A | 9/2022 |
| CN | 115132963 | A | 9/2022 |
| CN | 115133033 | A | 9/2022 |
| CN | 115133034 | A | 9/2022 |
| CN | 115133035 | A | 9/2022 |
| CN | 115133036 | A | 9/2022 |
| CN | 115133142 | A | 9/2022 |
| CN | 115136402 | A | 9/2022 |
| CN | 217361642 | U | 9/2022 |
| CN | 217361643 | U | 9/2022 |
| CN | 217361715 | U | 9/2022 |
| CN | 217361738 | U | 9/2022 |
| CN | 217361771 | U | 9/2022 |
| CN | 217361781 | U | 9/2022 |
| CN | 217361797 | U | 9/2022 |

(56) References Cited

FOREIGN PATENT DOCUMENTS

| | | | |
|---|---|---|---|
| CN | 217361830 U | 9/2022 |
| CN | 217361831 U | 9/2022 |
| CN | 217361837 U | 9/2022 |
| CN | 217361841 U | 9/2022 |
| CN | 217361845 U | 9/2022 |
| CN | 217361846 U | 9/2022 |
| CN | 217361856 U | 9/2022 |
| CN | 217374126 U | 9/2022 |
| CN | 217387303 U | 9/2022 |
| CN | 217387337 U | 9/2022 |
| CN | 217387346 U | 9/2022 |
| CN | 217387351 U | 9/2022 |
| CN | 217387352 U | 9/2022 |
| CN | 217387393 U | 9/2022 |
| CN | 217387444 U | 9/2022 |
| CN | 217387467 U | 9/2022 |
| CN | 217387476 U | 9/2022 |
| CN | 217387684 U | 9/2022 |
| CN | 217387699 U | 9/2022 |
| CN | 217426788 U | 9/2022 |
| CN | 217426902 U | 9/2022 |
| CN | 217444520 U | 9/2022 |
| CN | 217444527 U | 9/2022 |
| CN | 217451483 U | 9/2022 |
| CN | 217468540 U | 9/2022 |
| CN | 217468591 U | 9/2022 |
| CN | 217468606 U | 9/2022 |
| CN | 217468608 U | 9/2022 |
| CN | 217468685 U | 9/2022 |
| CN | 217468689 U | 9/2022 |
| CN | 217468711 U | 9/2022 |
| CN | 217468718 U | 9/2022 |
| CN | 217468733 U | 9/2022 |
| CN | 217499128 U | 9/2022 |
| CN | 217504721 U | 9/2022 |
| CN | 217505684 U | 9/2022 |
| CN | 217507387 U | 9/2022 |
| CN | 217507394 U | 9/2022 |
| CN | 217507452 U | 9/2022 |
| CN | 217507481 U | 9/2022 |
| CN | 217507493 U | 9/2022 |
| CN | 217507506 U | 9/2022 |
| CN | 217507510 U | 9/2022 |
| CN | 217507531 U | 9/2022 |
| CN | 217507549 U | 9/2022 |
| CN | 217507557 U | 9/2022 |
| CN | 217507559 U | 9/2022 |
| CN | 217507571 U | 9/2022 |
| CN | 217507573 U | 9/2022 |
| CN | 217507575 U | 9/2022 |
| CN | 217507578 U | 9/2022 |
| CN | 217507591 U | 9/2022 |
| CN | 217507594 U | 9/2022 |
| CN | 217507609 U | 9/2022 |
| CN | 217507612 U | 9/2022 |
| CN | 217507616 U | 9/2022 |
| CN | 217507819 U | 9/2022 |
| CN | 217522193 U | 9/2022 |
| CN | 107681168 B | 10/2022 |
| CN | 109411657 B | 10/2022 |
| CN | 110291657 B | 10/2022 |
| CN | 111755671 B | 10/2022 |
| CN | 112542644 B | 10/2022 |
| CN | 113013489 B | 10/2022 |
| CN | 113130870 B | 10/2022 |
| CN | 113410517 B | 10/2022 |
| CN | 113422105 B | 10/2022 |
| CN | 114744147 B | 10/2022 |
| CN | 115144765 A | 10/2022 |
| CN | 115148950 A | 10/2022 |
| CN | 115149080 A | 10/2022 |
| CN | 115149103 A | 10/2022 |
| CN | 115149127 A | 10/2022 |
| CN | 115149141 A | 10/2022 |
| CN | 115149159 A | 10/2022 |
| CN | 115149595 A | 10/2022 |
| CN | 115152082 A | 10/2022 |
| CN | 115156727 A | 10/2022 |
| CN | 115172656 A | 10/2022 |
| CN | 115172665 A | 10/2022 |
| CN | 115172859 A | 10/2022 |
| CN | 115172863 A | 10/2022 |
| CN | 115172949 A | 10/2022 |
| CN | 115172979 A | 10/2022 |
| CN | 115172990 A | 10/2022 |
| CN | 115173006 A | 10/2022 |
| CN | 115173507 A | 10/2022 |
| CN | 115176376 A | 10/2022 |
| CN | 115184805 A | 10/2022 |
| CN | 115184807 A | 10/2022 |
| CN | 115184808 A | 10/2022 |
| CN | 115184824 A | 10/2022 |
| CN | 115188963 A | 10/2022 |
| CN | 115189024 A | 10/2022 |
| CN | 115189025 A | 10/2022 |
| CN | 217528877 U | 10/2022 |
| CN | 217544655 U | 10/2022 |
| CN | 217544689 U | 10/2022 |
| CN | 217544884 U | 10/2022 |
| CN | 217562707 U | 10/2022 |
| CN | 217562708 U | 10/2022 |
| CN | 217562735 U | 10/2022 |
| CN | 217562747 U | 10/2022 |
| CN | 217562753 U | 10/2022 |
| CN | 217562770 U | 10/2022 |
| CN | 217562780 U | 10/2022 |
| CN | 217562783 U | 10/2022 |
| CN | 217562787 U | 10/2022 |
| CN | 217571202 U | 10/2022 |
| CN | 217588981 U | 10/2022 |
| CN | 217588987 U | 10/2022 |
| CN | 217589047 U | 10/2022 |
| CN | 217589141 U | 10/2022 |
| CN | 217589145 U | 10/2022 |
| CN | 217589163 U | 10/2022 |
| CN | 217589184 U | 10/2022 |
| CN | 217589192 U | 10/2022 |
| CN | 217589215 U | 10/2022 |
| CN | 217589219 U | 10/2022 |
| CN | 217589237 U | 10/2022 |
| CN | 217589262 U | 10/2022 |
| CN | 217589304 U | 10/2022 |
| CN | 217589312 U | 10/2022 |
| CN | 217589348 U | 10/2022 |
| CN | 107819167 B | 11/2022 |
| CN | 107978783 B | 11/2022 |
| CN | 108092104 B | 11/2022 |
| CN | 111601974 B | 11/2022 |
| CN | 115295965 A | 11/2022 |
| CN | 115298923 A | 11/2022 |
| CN | 115347313 A | 11/2022 |
| CN | 115347314 A | 11/2022 |
| CN | 115347436 A | 11/2022 |
| CN | 115349211 A | 11/2022 |
| CN | 115411800 A | 11/2022 |
| CN | 109962483 B | 12/2022 |
| CN | 110506357 B | 12/2022 |
| CN | 115441039 A | 12/2022 |
| CN | 115441114 A | 12/2022 |
| CN | 115461907 A | 12/2022 |
| CN | 115468340 A | 12/2022 |
| CN | 115483076 A | 12/2022 |
| CN | 217950665 U | 12/2022 |
| CN | 113415699 B | 1/2023 |
| CN | 115579262 A | 1/2023 |
| CN | 115589668 A | 1/2023 |
| CN | 115602980 A | 1/2023 |
| CN | 115603391 A | 1/2023 |
| CN | 115614685 A | 1/2023 |
| CN | 115621585 A | 1/2023 |
| CN | 218274737 U | 1/2023 |
| CN | 218274933 U | 1/2023 |
| CN | 109411669 B | 2/2023 |
| CN | 109643804 B | 2/2023 |

(56) References Cited

FOREIGN PATENT DOCUMENTS

| | | | |
|---|---|---|---|
| CN | 110870114 B | 2/2023 |
| CN | 110997684 B | 2/2023 |
| CN | 115703376 A | 2/2023 |
| CN | 115708249 A | 2/2023 |
| CN | 112272887 B | 3/2023 |
| CN | 112335101 B | 3/2023 |
| CN | 115732848 A | 3/2023 |
| CN | 115732862 A | 3/2023 |
| CN | 218632217 U | 3/2023 |
| CN | 218632228 U | 3/2023 |
| CN | 218648051 U | 3/2023 |
| CN | 218648062 U | 3/2023 |
| CN | 218648099 U | 3/2023 |
| CN | 107887530 B | 4/2023 |
| CN | 107978761 B | 4/2023 |
| CN | 109075346 B | 4/2023 |
| CN | 109638217 B | 4/2023 |
| CN | 110544758 B | 4/2023 |
| CN | 110544759 B | 4/2023 |
| CN | 218827629 U | 4/2023 |
| CN | 218887303 U | 4/2023 |
| CN | 218897095 U | 4/2023 |
| CN | 218939917 U | 4/2023 |
| CN | 110416646 B | 5/2023 |
| CN | 116047300 A | 5/2023 |
| CN | 116054293 A | 5/2023 |
| CN | 116097497 A | 5/2023 |
| CN | 116111262 A | 5/2023 |
| CN | 308988661 S | 12/2024 |
| CN | 308988662 S | 12/2024 |
| CN | 309274597 S | 5/2025 |
| DE | 102007022584 A1 | 11/2008 |
| DE | 102009035465 A1 | 2/2011 |
| DE | 102009035482 A1 | 2/2011 |
| DE | 102009058561 A1 | 6/2011 |
| DE | 102010046992 A1 | 9/2011 |
| DE | 102010050997 A1 | 5/2012 |
| DE | 102012201602 A1 | 8/2013 |
| DE | 102012223566 A1 | 6/2014 |
| DE | 102013018475 A1 | 5/2015 |
| DE | 102014110053 A1 | 5/2015 |
| DE | 102015204048 A1 | 9/2016 |
| DE | 102015208821 A1 | 11/2016 |
| DE | 102015225565 A1 | 6/2017 |
| DE | 102017123858 A1 | 4/2018 |
| DE | 202018103463 U1 | 7/2018 |
| DE | 102017201692 A1 | 8/2018 |
| DE | 102017123274 A1 | 4/2019 |
| DE | 102017217503 A1 | 4/2019 |
| DE | 102017219025 A1 | 4/2019 |
| DE | 102017219028 A1 | 4/2019 |
| DE | 102019212678 A1 | 2/2021 |
| DE | 102019125381 A1 | 3/2021 |
| DE | 102020125266 A1 | 4/2021 |
| DE | 102020207020 A1 | 12/2021 |
| DE | 102012213053 B4 | 8/2022 |
| DE | 102021000452 A1 | 8/2022 |
| DE | 102022201385 A1 | 10/2022 |
| DE | 102011081710 B4 | 11/2022 |
| DE | 102012207769 B4 | 11/2022 |
| DE | 102011084745 B4 | 12/2022 |
| DE | 102012221778 B4 | 12/2022 |
| DE | 102013200720 B4 | 1/2023 |
| DE | 102021120232 B3 | 1/2023 |
| DE | 102021206795 A1 | 1/2023 |
| DE | 102021206798 A1 | 1/2023 |
| DE | 102021206804 A1 | 1/2023 |
| DE | 102021206810 A1 | 1/2023 |
| DE | 102021206815 A1 | 1/2023 |
| DE | 102021206821 A1 | 1/2023 |
| DE | 102021206822 A1 | 1/2023 |
| DE | 102021206831 A1 | 1/2023 |
| DE | 102021208881 A1 | 2/2023 |
| DE | 102021209072 A1 | 2/2023 |
| DE | 102012210600 B4 | 3/2023 |
| DE | 102014220947 B4 | 4/2023 |
| DE | 102021211418 A1 | 4/2023 |
| DE | 102012221685 B4 | 5/2023 |
| DE | 102021212235 A1 | 5/2023 |
| DE | 102021212386 A1 | 5/2023 |
| EA | 201991272 A1 | 5/2020 |
| EP | 0225789 A1 | 6/1987 |
| EP | 0390557 A2 | 10/1990 |
| EP | 1039563 A1 | 9/2000 |
| EP | 1883143 A1 | 1/2008 |
| EP | 2339683 A2 | 6/2011 |
| EP | 2849260 A1 | 3/2015 |
| EP | 3125332 A1 | 2/2017 |
| EP | 3321039 A1 | 5/2018 |
| EP | 3340363 A1 | 6/2018 |
| EP | 3340364 A1 | 6/2018 |
| EP | 3367458 A1 | 8/2018 |
| EP | 3392924 A1 | 10/2018 |
| EP | 3460866 A1 | 3/2019 |
| EP | 3525279 A1 | 8/2019 |
| EP | 3623268 A1 | 3/2020 |
| EP | 3648230 A1 | 5/2020 |
| EP | 3711903 A1 | 9/2020 |
| EP | 3722139 A1 | 10/2020 |
| EP | 3730958 A1 | 10/2020 |
| EP | 3795837 A1 | 3/2021 |
| EP | 3879616 A1 | 9/2021 |
| EP | 3910710 A1 | 11/2021 |
| EP | 3916884 A1 | 12/2021 |
| EP | 3934017 A1 | 1/2022 |
| EP | 3955409 A1 | 2/2022 |
| EP | 3971472 A1 | 3/2022 |
| EP | 4024570 A2 | 7/2022 |
| EP | 4037071 A1 | 8/2022 |
| EP | 4037138 A1 | 8/2022 |
| EP | 4040580 A1 | 8/2022 |
| EP | 4044316 A1 | 8/2022 |
| EP | 4057430 A1 | 9/2022 |
| EP | 4064401 A2 | 9/2022 |
| EP | 4064402 A2 | 9/2022 |
| EP | 4068487 A1 | 10/2022 |
| EP | 4071041 A1 | 10/2022 |
| EP | 4071909 A1 | 10/2022 |
| EP | 4084177 A1 | 11/2022 |
| EP | 4086999 A1 | 11/2022 |
| EP | 4092801 A1 | 11/2022 |
| EP | 4092807 A1 | 11/2022 |
| EP | 4113725 A1 | 1/2023 |
| EP | 4137345 A1 | 2/2023 |
| EP | 4151510 A1 | 3/2023 |
| EP | 4160854 A1 | 4/2023 |
| GB | 6335440 | 1/2024 |
| HK | 30019295 A | 10/2020 |
| JP | H05266928 A | 10/1993 |
| JP | H09153352 A | 6/1997 |
| JP | H1154109 A | 2/1999 |
| JP | H1167281 A | 3/1999 |
| JP | H11111262 A | 4/1999 |
| JP | H11215716 A | 8/1999 |
| JP | 2000277153 A | 10/2000 |
| JP | 2001048238 A | 2/2001 |
| JP | 2001167752 A | 6/2001 |
| JP | 2002025535 A | 1/2002 |
| JP | 2002025633 A | 1/2002 |
| JP | 2002304974 A | 10/2002 |
| JP | 2005093144 A | 4/2005 |
| JP | 2006147531 A | 6/2006 |
| JP | 2006196397 A | 7/2006 |
| JP | 2006244755 A | 9/2006 |
| JP | 2006269345 A | 10/2006 |
| JP | 2008235155 A | 10/2008 |
| JP | 2008270121 A | 11/2008 |
| JP | 2009099527 A | 5/2009 |
| JP | 2011023180 A | 2/2011 |
| JP | 2011061969 A | 3/2011 |
| JP | 2012051450 A | 3/2012 |
| JP | 2012076571 A | 4/2012 |
| JP | 2012079521 A | 4/2012 |
| JP | 2012084297 A | 4/2012 |

(56) References Cited

FOREIGN PATENT DOCUMENTS

| | | |
|---|---|---|
| JP | 2013191286 A | 9/2013 |
| JP | 2013222480 A | 10/2013 |
| JP | 2015088605 A | 5/2015 |
| JP | 2015167069 A | 9/2015 |
| JP | 2016028373 A | 2/2016 |
| JP | 2016028374 A | 2/2016 |
| JP | 2016122633 A | 7/2016 |
| JP | 2016129105 A | 7/2016 |
| JP | 2017174683 A | 9/2017 |
| JP | 2018137077 A | 8/2018 |
| JP | 2018174032 A | 11/2018 |
| JP | 2019021594 A | 2/2019 |
| JP | 2019139892 A | 8/2019 |
| JP | 2019169376 A | 10/2019 |
| JP | 2019174118 A | 10/2019 |
| JP | 2019175629 A | 10/2019 |
| JP | 2019192330 A | 10/2019 |
| JP | 2020035717 A | 3/2020 |
| JP | 2020096412 A | 6/2020 |
| JP | 2020107428 A | 7/2020 |
| JP | 2020523099 A | 8/2020 |
| JP | 2021044145 A | 3/2021 |
| JP | 2022061232 A | 4/2022 |
| JP | 2022106553 A | 7/2022 |
| JP | 2022109390 A | 7/2022 |
| JP | 2022110609 A | 7/2022 |
| JP | 2022110744 A | 7/2022 |
| JP | 2022122849 A | 8/2022 |
| JP | 2022127244 A | 8/2022 |
| JP | 2022127473 A | 8/2022 |
| JP | 2022127873 A | 9/2022 |
| JP | 2022127879 A | 9/2022 |
| JP | 2022153500 A | 10/2022 |
| JP | 2023112541 A | 8/2023 |
| JP | D1788754 | 1/2025 |
| KR | 20080010156 A | 1/2008 |
| KR | 20100016719 A | 2/2010 |
| KR | 100964216 B1 | 6/2010 |
| KR | 20120100712 A | 9/2012 |
| KR | 20120136753 A | 12/2012 |
| KR | 20130037863 A | 4/2013 |
| KR | 20150062777 A | 6/2015 |
| KR | 20150099883 A | 9/2015 |
| KR | 20160015751 A | 2/2016 |
| KR | 20160031441 A | 3/2016 |
| KR | 20160032843 A | 3/2016 |
| KR | 20160046597 A | 4/2016 |
| KR | 20160060526 A | 5/2016 |
| KR | 20160076209 A | 6/2016 |
| KR | 20170027074 A | 3/2017 |
| KR | 20180068379 A | 6/2018 |
| KR | 3009949060001 | 2/2019 |
| KR | 20190044872 A | 5/2019 |
| KR | 102021072 B1 | 11/2019 |
| TW | D197451 | 11/2019 |
| WO | WO9708762 A1 | 3/1997 |
| WO | WO2006008812 A1 | 1/2006 |
| WO | WO2007149102 A1 | 12/2007 |
| WO | WO2009000588 A1 | 12/2008 |
| WO | WO2009129874 A1 | 10/2009 |
| WO | WO2010031856 A2 | 3/2010 |
| WO | WO2010126050 A1 | 11/2010 |
| WO | WO2011023688 A2 | 3/2011 |
| WO | WO2011027328 A2 | 3/2011 |
| WO | WO2011073426 A1 | 6/2011 |
| WO | WO2012025710 A2 | 3/2012 |
| WO | WO2012062574 A1 | 5/2012 |
| WO | WO2013014878 A1 | 1/2013 |
| WO | WO2013126915 A1 | 8/2013 |
| WO | WO2013188680 A1 | 12/2013 |
| WO | WO2014014285 A1 | 1/2014 |
| WO | WO2014117453 A1 | 8/2014 |
| WO | WO2015007459 A1 | 1/2015 |
| WO | WO2015083208 A1 | 6/2015 |
| WO | WO2015167698 A2 | 11/2015 |
| WO | WO2016142145 A1 | 9/2016 |
| WO | WO2016166496 A1 | 10/2016 |
| WO | WO2017044133 A1 | 3/2017 |
| WO | WO2017162213 A1 | 9/2017 |
| WO | WO2017190564 A1 | 11/2017 |
| WO | WO2017190565 A1 | 11/2017 |
| WO | WO2018024637 A1 | 2/2018 |
| WO | WO2018049575 A1 | 3/2018 |
| WO | WO2018049576 A1 | 3/2018 |
| WO | WO2018098628 A1 | 6/2018 |
| WO | WO2018103979 A1 | 6/2018 |
| WO | WO2018114320 A1 | 6/2018 |
| WO | WO2018118800 A1 | 6/2018 |
| WO | WO2018128788 A1 | 7/2018 |
| WO | WO2018157557 A1 | 9/2018 |
| WO | WO2018198896 A1 | 11/2018 |
| WO | WO2018233902 A1 | 12/2018 |
| WO | WO2019056270 A1 | 3/2019 |
| WO | WO2019076961 A1 | 4/2019 |
| WO | WO2019081408 A1 | 5/2019 |
| WO | WO2019124187 A1 | 6/2019 |
| WO | WO2019168259 A1 | 9/2019 |
| WO | 2020003801 A1 | 1/2020 |
| WO | WO2020024913 A1 | 2/2020 |
| WO | WO2020044275 A1 | 3/2020 |
| WO | WO2020109467 A1 | 6/2020 |
| WO | WO2020126226 A1 | 6/2020 |
| WO | WO2020173593 A1 | 9/2020 |
| WO | WO2021094150 A1 | 5/2021 |
| WO | WO2021098464 A1 | 5/2021 |
| WO | WO2021104721 A1 | 6/2021 |
| WO | WO2021119911 A1 | 6/2021 |
| WO | WO2021168746 A1 | 9/2021 |
| WO | WO2021170390 A1 | 9/2021 |
| WO | WO2021179129 A1 | 9/2021 |
| WO | WO2021184319 A1 | 9/2021 |
| WO | WO2021189263 A1 | 9/2021 |
| WO | WO2021195917 A1 | 10/2021 |
| WO | WO2021196000 A1 | 10/2021 |
| WO | WO2021213969 A1 | 10/2021 |
| WO | WO2021245027 A1 | 12/2021 |
| WO | WO2021254845 A1 | 12/2021 |
| WO | WO2021254846 A1 | 12/2021 |
| WO | WO2021254847 A1 | 12/2021 |
| WO | WO2021254848 A1 | 12/2021 |
| WO | WO2021254849 A1 | 12/2021 |
| WO | WO2021259552 A1 | 12/2021 |
| WO | WO2021259640 A1 | 12/2021 |
| WO | WO2022096399 A2 | 5/2022 |
| WO | WO2022151358 A1 | 7/2022 |
| WO | WO2022154226 A1 | 7/2022 |
| WO | WO2022154296 A1 | 7/2022 |
| WO | WO2022155885 A1 | 7/2022 |
| WO | WO2022155938 A1 | 7/2022 |
| WO | WO2022155959 A1 | 7/2022 |
| WO | WO2022160099 A1 | 8/2022 |
| WO | WO2022160264 A1 | 8/2022 |
| WO | WO2022160291 A1 | 8/2022 |
| WO | WO2022160297 A1 | 8/2022 |
| WO | WO2022160996 A1 | 8/2022 |
| WO | WO2022162887 A1 | 8/2022 |
| WO | WO2022171443 A1 | 8/2022 |
| WO | WO2022171444 A1 | 8/2022 |
| WO | WO2022172633 A1 | 8/2022 |
| WO | WO2022172945 A1 | 8/2022 |
| WO | WO2022175047 A1 | 8/2022 |
| WO | WO2022175048 A1 | 8/2022 |
| WO | WO2022175059 A1 | 8/2022 |
| WO | WO2022175060 A1 | 8/2022 |
| WO | WO2022176527 A1 | 8/2022 |
| WO | WO2022178673 A1 | 9/2022 |
| WO | WO2022181680 A1 | 9/2022 |
| WO | WO2022182036 A1 | 9/2022 |
| WO | WO2022182213 A1 | 9/2022 |
| WO | WO2022183374 A1 | 9/2022 |
| WO | WO2022183874 A1 | 9/2022 |
| WO | WO2022184081 A1 | 9/2022 |
| WO | WO2022184306 A1 | 9/2022 |
| WO | WO2022186665 A1 | 9/2022 |

(56)                    References Cited

FOREIGN PATENT DOCUMENTS

| WO | WO2022188175 A1 | 9/2022 |
| WO | WO2022196114 A1 | 9/2022 |
| WO | WO2022203014 A1 | 9/2022 |
| WO | WO2022203021 A1 | 9/2022 |
| WO | WO2022204989 A1 | 10/2022 |
| WO | WO2022205184 A1 | 10/2022 |
| WO | WO2022205188 A1 | 10/2022 |
| WO | WO2022205189 A1 | 10/2022 |
| WO | WO2022205192 A1 | 10/2022 |
| WO | WO2022205787 A1 | 10/2022 |
| WO | WO2022205790 A1 | 10/2022 |
| WO | WO2022205795 A1 | 10/2022 |
| WO | WO2022205829 A1 | 10/2022 |
| WO | WO2022206384 A1 | 10/2022 |
| WO | WO2022206395 A1 | 10/2022 |
| WO | WO2022206518 A1 | 10/2022 |
| WO | WO2022206866 A1 | 10/2022 |
| WO | WO2022207169 A1 | 10/2022 |
| WO | WO2022207170 A1 | 10/2022 |
| WO | WO2022209127 A1 | 10/2022 |
| WO | WO2022209187 A1 | 10/2022 |
| WO | WO2022209188 A1 | 10/2022 |
| WO | WO2022211320 A1 | 10/2022 |
| WO | WO2022213713 A1 | 10/2022 |
| WO | WO2022230104 A1 | 11/2022 |
| WO | WO2022244561 A1 | 11/2022 |
| WO | WO2022244572 A1 | 11/2022 |
| WO | WO2022248161 A1 | 12/2022 |
| WO | WO2022254900 A1 | 12/2022 |
| WO | WO2022258623 A1 | 12/2022 |
| WO | WO2023285212 A1 | 1/2023 |
| WO | WO2023011313 A1 | 2/2023 |
| WO | WO2023020841 A1 | 2/2023 |
| WO | WO2023021771 A1 | 2/2023 |
| WO | WO2023025558 A1 | 3/2023 |
| WO | WO2023026697 A1 | 3/2023 |
| WO | WO2023032544 A1 | 3/2023 |
| WO | WO2023036689 A1 | 3/2023 |
| WO | WO2023037630 A1 | 3/2023 |
| WO | WO2023042458 A1 | 3/2023 |
| WO | WO2023046366 A1 | 3/2023 |
| WO | WO2023046724 A1 | 3/2023 |
| WO | WO2023053794 A1 | 4/2023 |
| WO | WO2023070649 A1 | 5/2023 |
| WO | WO2023072444 A1 | 5/2023 |
| WO | WO2023072471 A1 | 5/2023 |
| WO | WO2023072648 A1 | 5/2023 |

OTHER PUBLICATIONS

US 10,608,220 B2, 03/2020, Lee (withdrawn)
US 11,626,631 B2, 04/2023, Kawano et al. (withdrawn)
US 11,652,257 B2, 05/2023, Holubarsch et al. (withdrawn)
Acme Tools, "New Milwaukee M18 High-Output Battery Announcement," <https://blog.acmetools.com/milwaukee-m18-high-output-battery-announcement/> article dated May 2, 2018 (7 pages).
Anderson, "IBM Reveals "Staggering" New Battery Tech, Withholds Technical Details," <https://spectrum.ieee.org/IBM-new-seawater-battery-technology> article dated Dec. 19, 2019 (7 pages).
Anonymous, "Battery Cell Tab Bending Die and Assembly Tool," Research Disclosure, 2015, vol. 169, Abstract, 1 page.
Bosch, "GXS18V-13N24 18V CORE18V Starter Kit with (2) Core 18V 8.0 Ah Performance Batteries," <https://web.archive.org/web/20200523225424/https://www.bosch-professional.com/GB/en/procore18v/> web page visited Nov. 22, 2021 (4 pages).
Bosch, "A New Dimension of Power. The Bosch ProCORE18V battery series," <https://web.archive.org/web/20200809145430/https://www.boschtools.com/us/en/boschtools-ocs/18v-batteries-chargers-starter-kits-gxs18v-13n24-199626-p/> web page visited Nov. 22, 2021 (13 pages).
Cannarella et al., "Stress evolution and capacity fade in constrained lithium-ion pouch cells," Journal of Power Sources, 2014, vol. 245, pp. 745-751.
Chuangfeng et al., "Advanced in Control Engineering and Information Science," Procedia Engineering, 2011, vol. 15, pp. 2619-2623.
Cordoba-Arenas et al., "Aging Propagation in Advanced Battery Systems: Preliminary Results," 7th IFAC Sypmosium on Advances in Automotive Control, 2013, pp. 313-318.
Dewalt, "Dewalt Powerstack™ Battery Technology," <https://www.dewalt.com/powerstack> web page visted Feb. 5, 2025 (12 pages).
E.I. du Pont de Nemours & Co. Inc., "Flat cell battery design," Research Disclosure, 1974, vol. 127, Abstract, 2 pages.
Energy Storage R&D, "III. Advanced Battery Development, Systems Analysis, and Testing," FY 2011 Annual Progress Report, 214 pages.
Farmer, "ME4901 Course Notes—Special Topics in Energy Conversion & Storage," Mechanical & Aerospace Engineering Department. United States Naval Postgraduate School, 2011, 280 pages.
He et al., "A 3D electrochemical-thermal coupled model for electrochemical and thermal analysis of pouch-type lithium-ion batteries," International Journal of Heat and Mass Transfer, 2021, vol. 181, 12 pages.
Hendrix, "Care. Monitor. Manage. EnerDel's Holistic Approach to Lithium-Ion Energy Storage Safety," <https://www.altenergymag.com/article/2013/04/lithium-ion-energy-storage-safety/1226>article dated Apr. 15, 2013 (14 pages).
Lee et al., "Self-Assembled NiO/Ni(OH)2 Nanoflakes as Active Material for High-Power and High-Energy Hybrid Rechargeable Battery," Nano Letters, 2016, vol. 16 pp. 1794-1802.
Liang et al., "A review of rechargeable batteries for portable electronic devices," InfoMat, 2019, vol. 1, pp. 6-32.
Louli et al., "Volume, Pressure and Thickness Evolution of Li-Ion Pouch Cells with Silicon-Composite Negative Electrodes," Journal of the Electrochemical Society, 2017, vol. 164, No. 12, pp. A2689-A2696.
MG Chemicals, "Thermally Conductive Adhesives," <https://mgchemicals.com/category/adhesives/thermally-conductive-adhesives/> web page visited Feb. 5, 2025 (2 pages).
Morris, "Tool giant Stanley invests in 3D Li-ion battery venture," <https://core.ac.uk/download/pdf/36700854.pdf> article dated Jun. 6, 2016 (2 pages).
Pandur et al., "Battery Technology—Use in Forestry," Croatial Journal of Forest Engineering, 2021, vol. 42, pp. 135-148.
Pang et al., "A custom battery for operando neutron powder diffraction studies of electrode structure," Journal of Applied Crystallography, 2015, vol. 48, pp. 280-290.
Rebba et al., "Design Parameter Trade-off for Packaging of Stacked Prismatic Batteries," SAE Technical Paper, 2011, 8 pages.
Rieger et al., "Multi-Dimensional Modeling of the Influence of Cell Design on Temperature, Displacement and Stress Inhomogeneity in Large-Format Lithium-Ion Cells," Journal of the Electrochemical Society, 2016, vol. 163, No. 4, pp. A3099-3110.
Saft Specialty Battery Group, "Primary lithium battery LS 14500Ex," © 2009-2010 (16 pages).
Screwfix, "Milwaukee M18HB3 18V 3.0Ah Li-Ion RedLithium High Output Battery," <https://www.screwfix.com/p/milwaukee-m18hb3-18v-3-0ah-li-ion-redlithium-high-output-battery/205xh>web page visited Jul. 19, 2023 (1 page).
Spina, "Numerical-experimental investigation of PE/EVA foam injection molded parts", Result in Physics, 2017, vol. 7, pp. 2775-2790.
Stefan Rehnberg, "Prismatic pouch battery pack," <https://www.youtube.com/watch?v=mh9fptEnvcM> video published to YouTube on Jul. 15, 2012 (1 page).
United States Advanced Battery Consortium, "Department of Energy (DoE) Final Report Compilation for the Research and Development of High-Power and High-Energy Electrochemical Storage Devices," report dated Jun. 2014, 197 pages.
Wang et al., "Ultrafast-charging silicon-based coral-like network anodes for lithium-ion batteries with high energy and power densities," ACS Nano, 2019, vol. 13, pp. 2307-2315.
Weydanz, "Power Tools: Batteries," Elsevier B.V., 2009, pp. 46-52.

(56)                 References Cited

OTHER PUBLICATIONS

Woody, "Strategies to limit degradation and maximize Li-ion battery service lifetime—critical review and guidance for stakeholders," thesis paper submitted at the University of Michigan, Apr. 2020, 54 pages.

Zhang et al., "Investigation on a hydrogel based passive thermal management system for lithium ion batteries," Energy, 2014, vol. 68, pp. 854-861.

Design U.S. Appl. No. 29/849,333, filed Aug. 10, 2022, by Nomura et al.

Jetting_along, "Gotta clear up some myths about the FORGE battery and why I wouldn't run it in all applications," <https://www.reddit.com/r/MilwaukeeTool/comments/1bn9hot/gotta_clear_up_some_myths_about_the_forge_battery/?rdt=44027> Reddit post dated 2024 (1 page).

Milwaukee Electric Tool Corp, "M18 18V Lithium-Ion Redlithium Forge 6.0 Ah Battery Pack," <https://www.homedepot.com/p/Milwaukee-M18-18V-Lithium-Ion-REDLITHIUM-FORGE-6-0-Ah-Battery-Pack-8-Pack-48-11-1861-x8/327685024> web page visited Aug. 13, 2025 (1 page).

Milwaukee Electric Tool Corp., "M18™ Redlithium™ Forge™ XC6.0 Battery Pack," <https://www.milwaukeetool.com/products/48-11-1861> web page visited Aug. 13, 2025 (1 page).

Torque Test Channel, "TESTED: Milwaukee's Spicy New M18 Forge Batteries," <https://www.youtube.com/watch?V=wTsA_4IR1a0> YouTube video published Sep. 8, 2023 (1 page).

* cited by examiner

DEVICE INCLUDING A FUSE

RELATED APPLICATIONS

This application claims the benefit of U.S. Provisional Patent Application No. 63/367,101, filed Jun. 27, 2022, the entire content of which is hereby incorporated by reference.

SUMMARY

Conventional fuses positioned in a charge or discharge path of a device for protecting the device from high or excessive current have several drawbacks. For example, conventional fuses do not function properly over an entire range of short circuit loads. To compensate for this, expensive discharge FETs that generate a significant amount of heat are required, for example, for battery cells that do not have internal charge interrupt devices ("CIDs"). A spring fuse can alleviate these drawbacks.

Embodiments described herein provide a spring fuse in a charge or discharge current path to protect a device, such as a battery pack, a power tool, or a battery pack charger from high or excessive currents. For example, a battery pack may include a spring fuse connected in series with one or more semiconductor switching devices (e.g., FETs). A high current could cause the fuse to be opened to protect the battery pack (e.g., the battery pack's cells) from the high current.

Embodiments described herein provide a device including a spring fuse. The spring fuse includes one or more extension springs, a fixed base, a power path connection, and one or more conductors. The at least one extension spring is configured to connect the fixed base with the power path connection. The power path connection is configured to be soldered to one or more leads using a low temperature solder. Optionally, the leads are one or more fuse pads. The solder of the power path connection to the at least one or more fuse pads secures the power path connection to the one or more fuse pads. Optionally, one or more traces may be used to sense or monitor a parameter of the device.

Embodiments described herein provide a device including a conductive path for passing electric current. The device includes a terminal and a fuse connected in the conductive path and electrically connected to the terminal. The fuse includes a fixed base, a member connected to the fixed base at a first end, a power path connection connected to the member at a second end, a plurality of fuse pads, and one or more bonding joints configured to connect the power path connection to the plurality of fuse pads. The one or more bonding joints are configured to deteriorate when a temperature of the one or more bonding joints exceeds a threshold value. The power path connection is configured to move toward the fixed base when the temperature of the one or more bonding joints exceeds a threshold value.

Embodiments described herein include a fuse. The fuse includes a first printed circuit board including a first electrical via and a second electrical via and a conductor electrically connected to the first electrical via and the second electrical via. The conductor is configured to conduct an electrical current. A member is positioned between a second printed circuit board and the conductor. The conductor is bonded to the first printed circuit board by a bonding material. The bonding material is configured to deteriorate when a temperature of the first printed circuit board exceeds a threshold value. In response to the bonding material deteriorating, the member moves the conductor away from the first printed circuit board to prevent conduction of the electrical current.

Embodiments described herein include a device including a conductive path for passing electric current. The device includes a terminal and a spring fuse connected in the conductive path and electrically connected to the terminal. The spring fuse includes a fixed base, an extension spring connected to the fixed base at a first end, a power path connection connected to the extension spring at a second end, a first conductive pad positioned perpendicular to the power path connection, a second conductive pad positioned parallel to the first conductive pad, a first solder joint connected to the first conductive pad, and a second solder joint connected to the second conductive pad. The first solder joint or the second solder joint are configured to melt when a respective temperature of the first solder joint or the second solder joint exceeds a threshold value. The power path connection is configured to retract toward the fixed base when the first solder joint and the second solder joint melt.

Before any embodiments are explained in detail, it is to be understood that the embodiments are not limited in application to the details of the configurations and arrangements of components set forth in the following description or illustrated in the accompanying drawings. The embodiments are capable of being practiced or of being carried out in various ways. Also, it is to be understood that the phraseology and terminology used herein are for the purpose of description and should not be regarded as limiting. The use of "including," "comprising," or "having" and variations thereof are meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings.

Unless the context of their usage unambiguously indicates otherwise, the articles "a," "an," and "the" should not be interpreted as meaning "one" or "only one." Rather these articles should be interpreted as meaning "at least one" or "one or more." Likewise, when the terms "the" or "said" are used to refer to a noun previously introduced by the indefinite article "a" or "an," "the" and "said" mean "at least one" or "one or more" unless the usage unambiguously indicates otherwise.

In addition, it should be understood that embodiments may include hardware, software, and electronic components or modules that, for purposes of discussion, may be illustrated and described as if the majority of the components were implemented solely in hardware. However, one of ordinary skill in the art, and based on a reading of this detailed description, would recognize that, in at least one embodiment, the electronic-based aspects may be implemented in software (e.g., stored on non-transitory computer-readable medium) executable by one or more processing units, such as a microprocessor and/or application specific integrated circuits ("ASICs"). As such, it should be noted that a plurality of hardware and software based devices, as well as a plurality of different structural components, may be utilized to implement the embodiments. For example, "servers," "computing devices," "controllers," "processors," etc., described in the specification can include one or more processing units, one or more computer-readable medium modules, one or more input/output interfaces, and various connections (e.g., a system bus) connecting the components.

Relative terminology, such as, for example, "about," "approximately," "substantially," etc., used in connection with a quantity or condition would be understood by those of ordinary skill to be inclusive of the stated value and has the meaning dictated by the context (e.g., the term includes at least the degree of error associated with the measurement accuracy, tolerances [e.g., manufacturing, assembly, use, etc.] associated with the particular value, etc.). Such terminology should also be considered as disclosing the range defined by the absolute values of the two endpoints. For example, the expression "from about 2 to about 4" also discloses the range "from 2 to 4". The relative terminology may refer to plus or minus a percentage (e.g., 1%, 5%, 10%) of an indicated value.

It should be understood that although certain drawings illustrate hardware and software located within particular devices, these depictions are for illustrative purposes only. Functionality described herein as being performed by one component may be performed by multiple components in a distributed manner. Likewise, functionality performed by multiple components may be consolidated and performed by a single component. In some embodiments, the illustrated components may be combined or divided into separate software, firmware and/or hardware. For example, instead of being located within and performed by a single electronic processor, logic and processing may be distributed among multiple electronic processors. Regardless of how they are combined or divided, hardware and software components may be located on the same computing device or may be distributed among different computing devices connected by one or more networks or other suitable communication links. Similarly, a component described as performing particular functionality may also perform additional functionality not described herein. For example, a device or structure that is "configured" in a certain way is configured in at least that way but may also be configured in ways that are not explicitly listed.

Accordingly, in the claims, if an apparatus, method, or system is claimed, for example, as including a controller, control unit, electronic processor, computing device, logic element, module, memory module, communication channel or network, or other element configured in a certain manner, for example, to perform multiple functions, the claim or claim element should be interpreted as meaning one or more of such elements where any one of the one or more elements is configured as claimed, for example, to make any one or more of the recited multiple functions, such that the one or more elements, as a set, perform the multiple functions collectively.

Other aspects of the embodiments will become apparent by consideration of the detailed description and accompanying drawings.

DETAILED DESCRIPTION

Embodiments described herein relate to one or more devices (e.g., high-power devices) that include a path for passing electric current. The devices include a fuse (e.g., a spring fuse) connected in the path for selectively controlling electric current on the path. For example, the one or more devices include a battery pack, a power tool, and/or a battery pack charger. The fuse includes one or more retraction or extension devices or members (e.g., a resilient member, a spring, etc.), a fixed base, a power path connection, and one or more conductors. The one or more retraction devices are configured to connect the fixed base with the power path connection. The power path connection is configured to be bonded (e.g., soldered, heat staked, laser welded, fused, etc.) to at least one or more leads or fuse pads using a low temperature bonding material (e.g., solder, plastic, etc.). When a temperature of the bonding material of the power path connection to the one or more fuse pads increases above an established point, the bonding material deteriorates (e.g., melts). Once the bonding material deteriorates, the retraction or extension device moves toward the fixed base. When the bonding material melts and the retraction device retracts towards the fixed base, the fuse is considered tripped, or the path for passing electric current has been opened. In some embodiments, the fuse can include an extension device rather than a retraction device. The extension or retraction device can be any device capable or storing or externing a force to the power path connection to disconnect the power path connection from the one or more leads.

Figure 1:
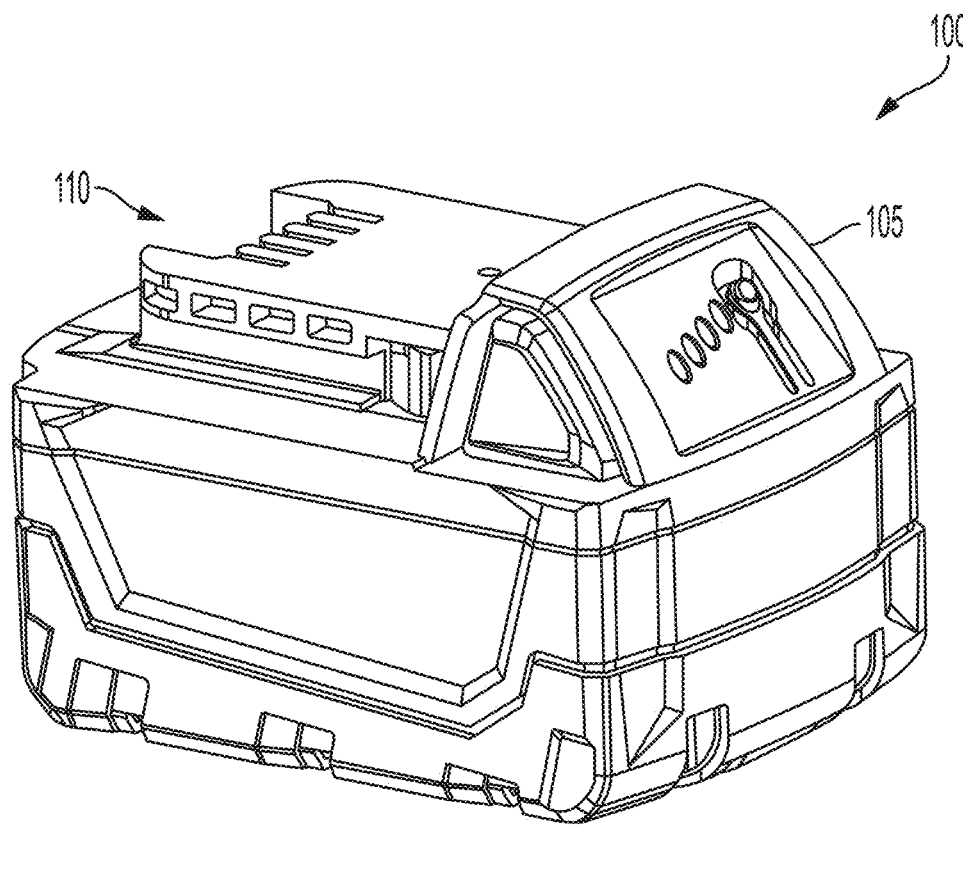
FIG. 1 illustrates a battery pack that includes a fuse, according to embodiments described herein.

Embodiments herein also relate to low temperature material bonding, specifically low temperature soldering. Traditional soldering involves using solder alloys with high melting points, for example, around 180-200 degrees Celsius. However, in some instances and as described herein, a low temperature solder may be more desirable. In some examples, a low temperature solder alloys may be used in place of a traditional solder. Low temperature solder alloys may include bismuth, indium, tin, or other elements. These low temperature solders melt around 140-160 degrees Celsius, significantly below the melting point of conventional solder. For instance, bismuth-based solders can have melting points ranging from around 138 to 160 degrees Celsius. In some embodiments, other low temperature solder alloys may be used. For example, indium-based solders have melting points in the range of 140 to 160 degrees Celsius, and tin-bismuth solders have melting points ranging from approximately 138 to 160 degrees Celsius. Some low temperature solder alloys, such as Wood's metal, have a melting point of approximately 70 degrees Celsius. FIG. 1 illustrates a battery pack 100 that includes a fuse (e.g., a spring fuse). The battery pack 100 includes a housing 105 and an interface portion 110 for connecting the battery pack 100 to a device (e.g., a power tool). The spring fuse is configured to, for example, disable current into the battery pack 100 or out of the battery pack 100 by opening a current charge/ discharge path of the battery pack 100. In some embodi- ments, the spring fuse is provided in a charge path or in a discharge path or in a path that both charges and discharges. The sizing and/or current thresholds of the spring fuse may vary depending on the particular path, such as smaller for a charge path and larger for a discharge path. In some embodi- ments, the spring fuse is a discrete component that includes one or more inputs and one or more outputs for passing current. In some embodiments, the spring fuse does not include a casing or a housing and the spring fuse's circuitry is generally exposed. In some embodiments, the spring fuse is connected to a printed circuit board ("PCB") as a singular unit. In other embodiments, a plurality of discrete compo- nents are individually connected to a PCB and connected such that the plurality of discrete components collectively form a spring fuse. In some embodiments, the battery pack 100 includes a plurality of spring fuses.

Figure 2:
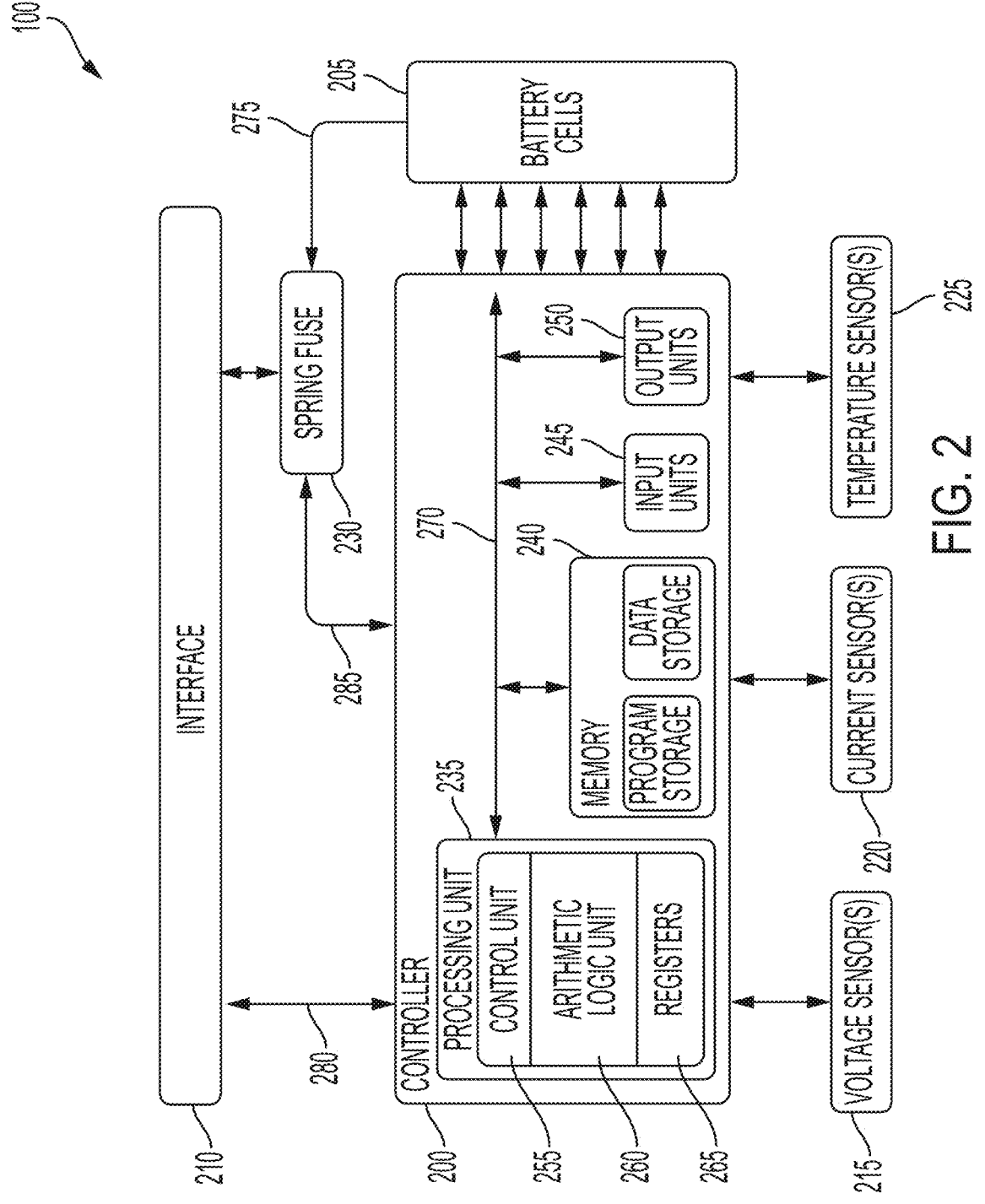
FIG. 2 illustrates a control system for the battery pack of FIG. 1, according to embodiments described herein.

FIG. 2 illustrates a control system for the battery pack 100. The control system includes a controller 200. The controller 200 is electrically and/or communicatively con- nected to a variety of modules or components of the battery pack 100. For example, the illustrated controller 200 is connected to one or more battery cells 205 and an interface 210 (e.g., the interface portion 110 of the battery pack 100 illustrated in FIG. 1). The controller 200 is also connected to one or more voltage sensors or voltage sensing circuits 215, one or more current sensors or current sensing circuits 220, and one or more temperature sensors or temperature sensing circuits 225. A spring fuse 230 is connected between the one or more battery cells 205 and the interface 210. The con- troller 200 includes combinations of hardware and software that are operable to, among other things, control the opera- tion of the battery pack 100, control the operation of the spring fuse 230, monitor a condition of the battery pack 100, enable or disable charging of the battery pack 100, enable or disable discharging of the battery pack 100, etc.

The controller 200 includes a plurality of electrical and electronic components that provide power, operational con- trol, and protection to the components and modules within the controller 200 and/or the battery pack 100. For example, the controller 200 includes, among other things, a processing unit 235 (e.g., a microprocessor, a microcontroller, or another suitable programmable device), a memory 240, input units 245, and output units 250. The processing unit 235 includes, among other things, a control unit 255, an arithmetic logic unit ("ALU") 260, and a plurality of reg- isters 265 (shown as a group of registers in FIG. 2), and is implemented using a known computer architecture (e.g., a modified Harvard architecture, a von Neumann architecture, etc.). The processing unit 235, the memory 240, the input units 245, and the output units 250, as well as the various modules or circuits connected to the controller 200 are connected by one or more control and/or data buses (e.g., common bus 270). The control and/or data buses are shown generally in FIG. 2 for illustrative purposes. The use of one or more control and/or data buses for the interconnection between and communication among the various modules, circuits, and components would be known to a person skilled in the art in view of the invention described herein.

The memory 240 is a non-transitory computer readable medium and includes, for example, a program storage area and a data storage area. The program storage area and the data storage area can include combinations of different types of memory, such as a ROM, a RAM (e.g., DRAM, SDRAM, etc.), EEPROM, flash memory, a hard disk, an SD card, or other suitable magnetic, optical, physical, or electronic memory devices. The processing unit 235 is connected to the memory 240 and executes software instructions that are capable of being stored in a RAM of the memory 240 (e.g., during execution), a ROM of the memory 240 (e.g., on a generally permanent basis), or another non-transitory com- puter readable medium such as another memory or a disc. Software included in the implementation of the battery pack 100 can be stored in the memory 240 of the controller 200. The software includes, for example, firmware, one or more applications, program data, filters, rules, one or more pro- gram modules, and other executable instructions. The con- troller 200 is configured to retrieve from the memory 240 and execute, among other things, instructions related to the control processes and methods described herein. In other constructions, the controller 200 includes additional, fewer, or different components.

The interface 210 includes a combination of mechanical components (e.g., rails, grooves, latches, etc.) and electrical components (e.g., one or more terminals) configured to and operable for interfacing (e.g., mechanically, electrically, and communicatively connecting) the battery pack 100 with another device (e.g., a power tool, a battery pack charger, etc.). For example, the interface 210 is configured to receive power through the spring fuse 230 via a power line 275 between the one or more battery cells 205 and the interface 210. The interface 210 is also configured to communica- tively connect to the controller 200 via a communications line 280. In some embodiments, the controller 200 is also electrically and/or communicatively connected to the spring fuse 230 via a signal line 285.

The controller 200 is configured to determine whether a fault condition of the battery pack 100 is present and generate one or more control signals related to the fault condition. For example, the controller 200 is configured to detect an overvoltage condition of the one or more battery cells 205, and under voltage condition of the one or more battery cells 205, an over current condition (e.g., during charging or discharging), or an over temperature condition (e.g., during charging or discharging). In some embodi- ments, the over current condition corresponds to a particular current that is sensed for a particular amount of time. In some embodiments, an over current condition is detected when a current of between approximately 30 Amperes and 60 Amperes is detected for a predetermined amount of time (e.g., between 100 nano-seconds and 50 milli-seconds, or between 100 milli-seconds and 2 seconds). The amount of time and the detected current can be varied for different applications. In some embodiments, a current of between 30 Amperes and 60 A Amperes can be detected for up to 50 milli-seconds before a fault condition occurs. In other embodiments, a current of between 30 Amperes and 60 A Amperes can be detected for between 50 milli-seconds and several minutes (e.g., between 1 minute and 20 minutes) before a fault condition occurs. In some embodiments, a current of greater than 60 Amperes can be detected for between 50 milli-seconds and several minutes (e.g., between 1 minute and 20 minutes) before a fault condition occurs. In some embodiments, a current of approximately 60 Amperes can be detected for approximately 50 milli-seconds before a fault condition occurs. In some embodiments, a current of approximately 70 Amperes can be detected for approxi- mately 100 nano-seconds before a fault condition occurs. In some embodiments, the current and trip times depend on the path in which the spring fuse is placed. For example, in a charging path, a trip current of approximately 5 Amperes to 20 Amperes can be detected for approximately 100 milliseconds up to 2 seconds before a fault occurs. In a discharging path, a trip current of approximately 20 Amperes to 150 Amperes can be detected for approximately 500 milliseconds up to 2 seconds before a fault occurs.

In some embodiments, the current threshold, the time threshold, or both the current threshold and the trip threshold are adjusted based upon which device is connected to the device with the spring fuse. For example, if the spring fuse is in a charger, the charger could have a different trip threshold depending on the charging capability of the battery pack connected to it.

If the controller 200 detects one or more fault conditions of the battery pack 100 or determines that a fault condition of the battery pack no longer exists, the controller 200 is configured to provide information and/or control signals to another component of the battery pack 100 (e.g. the interface 210, the spring fuse 230, etc.). The signals can be configured to, for example, trip or open the spring fuse 230, etc. In some embodiments, the controller 200 is configured to independently sense or monitor a parameter of the battery pack 100 and independently trip or open the spring fuse 230 based on the sensed or monitored parameter. For example, the controller 200 is configured to monitor a parameter (e.g., current, temperature, etc.) and control a heating element 750 (see FIG. 7) that independently trips the spring fuse 230.

Figure 3:
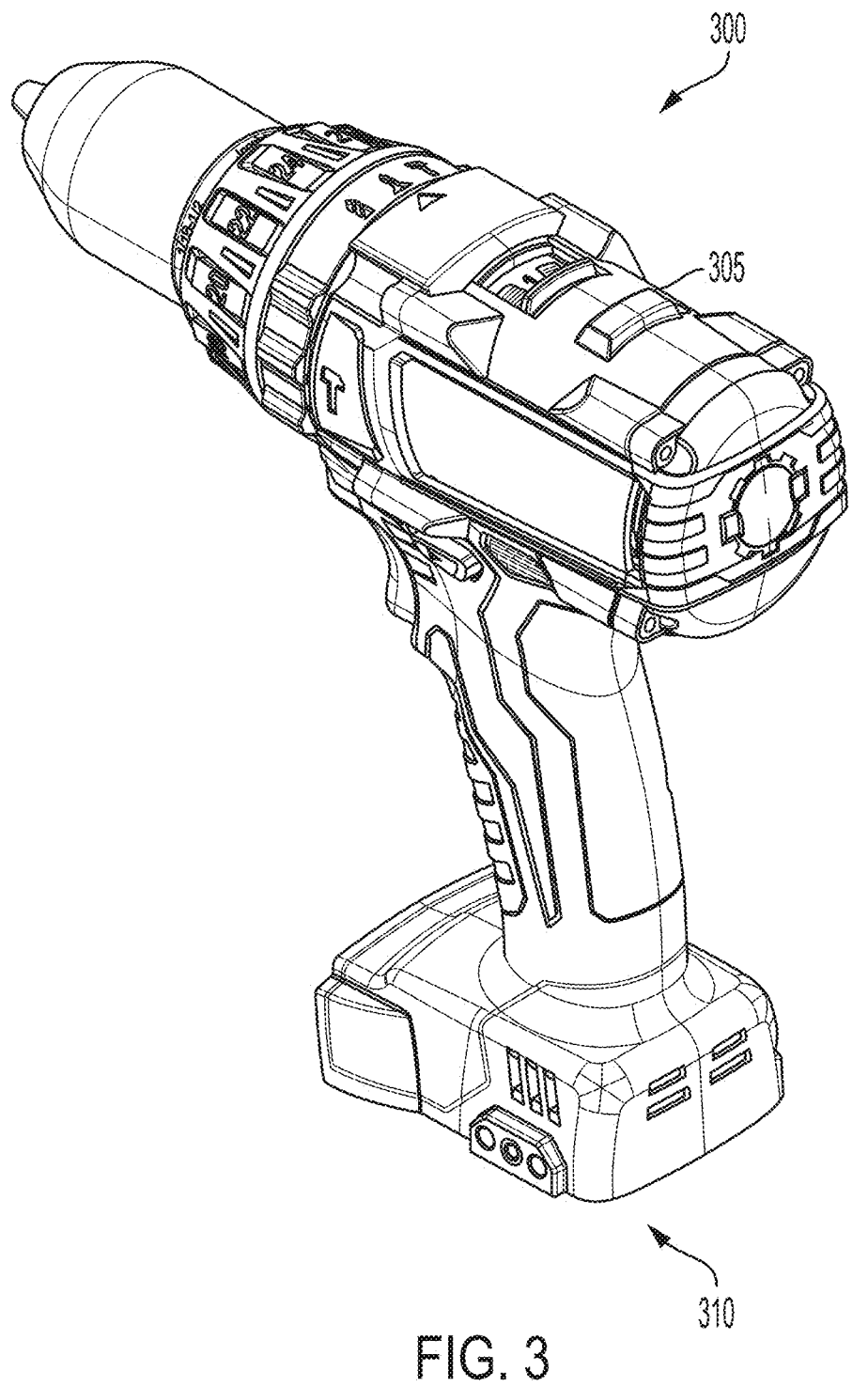
FIG. 3 illustrates a power tool device that includes a fuse, according to embodiments described herein.

FIG. 3 illustrates a device 300 that includes a fuse (e.g., a spring fuse). In the embodiment illustrated in FIG. 3, the device 300 is a power tool (e.g., a drill/driver). In other embodiments, the device 300 is a different type of power tool (e.g., an impact wrench, a ratchet, a saw, a hammer drill, an impact driver, a rotary hammer, a grinder, a blower, a trimmer, etc.) or a different type of device (e.g., a light, a non-motorized sensing tool, etc.). The device 300 includes a housing 305 and an interface portion 310 for connecting the device 300 to, for example, the battery pack 100 or another device. The spring fuse is configured to, for example, disable current into the device 300 by opening a current path of the device 300. As described above with respect to the battery pack 100, in some embodiments, the spring fuse does not include a casing or a housing and the spring fuse's circuitry is generally exposed. In some embodiments, the spring fuse is connected to a PCB as a singular unit. In other embodiments, a plurality of discrete components are individually connected to a PCB and connected such that the plurality of discrete components collectively form a spring fuse. In some embodiments, the device 300 includes a plurality of spring fuses.

Figure 4:
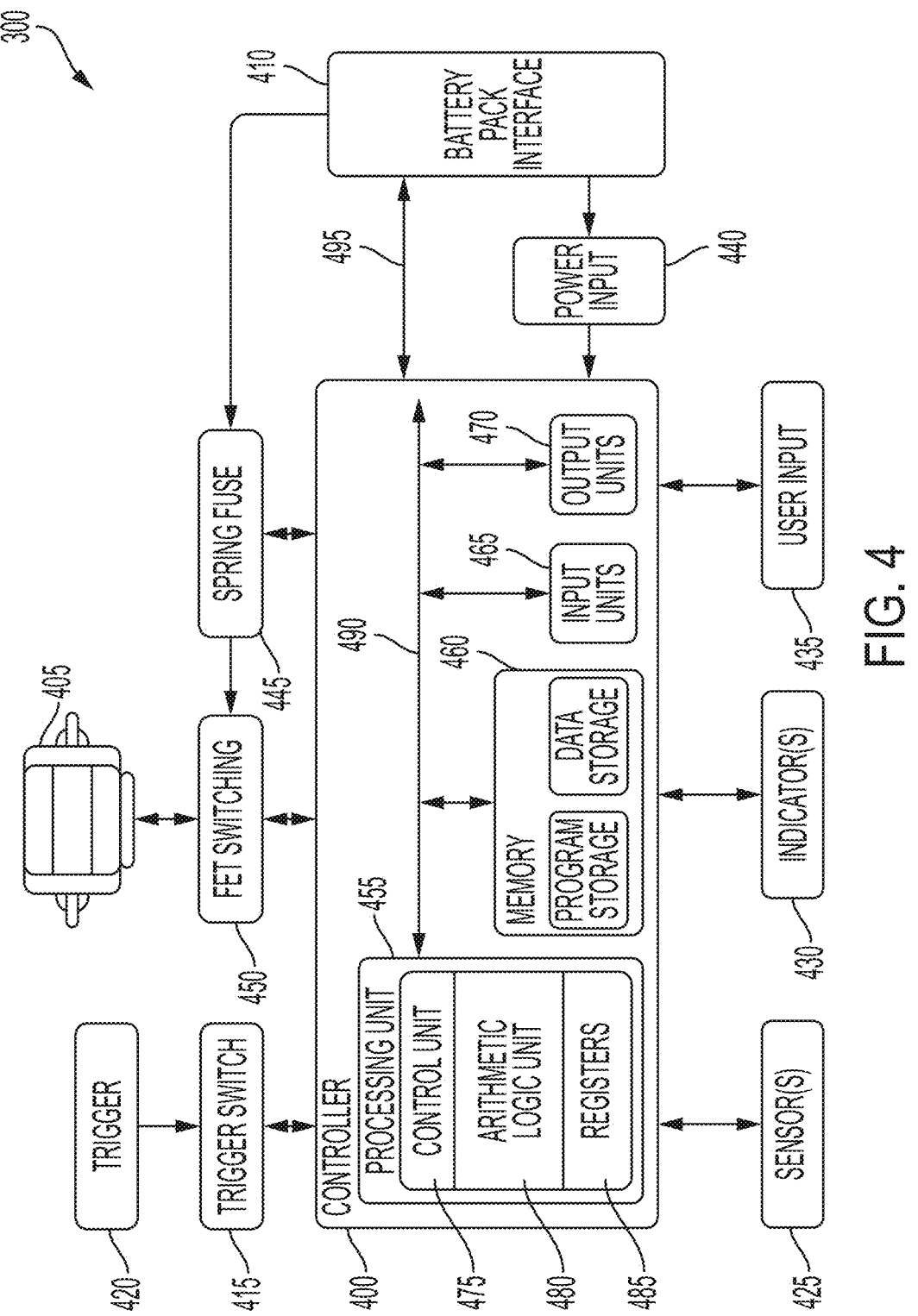
FIG. 4 illustrates a control system for the power tool device of FIG. 3, according to embodiments described herein.

FIG. 4 illustrates a control system for the device 300. The control system includes a controller 400. The controller 400 is electrically and/or communicatively connected to a variety of modules or components of the device 300. For example, the illustrated controller 400 is electrically connected to a motor 405, a battery pack interface 410, a trigger switch 415 (connected to a trigger 420), one or more sensors or sensing circuits 425, one or more indicators 430, a user input module 435, a power input module 440, a spring fuse 445, and a FET switching module 450 (e.g., including a single stitching FET for a brushed motor or a plurality of switching FETs for a brushless motor). The controller 400 includes combinations of hardware and software that are operable to, among other things, control the operation of the device 300, monitor the operation of the device 300, activate the one or more indicators 430 (e.g., an LED), etc. The spring fuse 445 is connected between the battery pack interface 410 and the FET switching module 450.

The controller 400 includes a plurality of electrical and electronic components that provide power, operational control, and protection to the components and modules within the controller 400 and/or the device 300. For example, the controller 400 includes, among other things, a processing unit 455 (e.g., a microprocessor, a microcontroller, or another suitable programmable device), a memory 460, input units 465, and output units 470. The processing unit 455 includes, among other things, a control unit 475, an ALU 480, and a plurality of registers 485 (shown as a group of registers in FIG. 4), and is implemented using a known computer architecture (e.g., a modified Harvard architecture, a von Neumann architecture, etc.). The processing unit 455, the memory 460, the input units 465, and the output units 470, as well as the various modules or circuits connected to the controller 400 are connected by one or more control and/or data buses (e.g., common bus 490). The control and/or data buses are shown generally in FIG. 4 for illustrative purposes. The use of one or more control and/or data buses for the interconnection between and communication among the various modules, circuits, and components would be known to a person skilled in the art in view of the invention described herein.

The memory 460 is a non-transitory computer readable medium and includes, for example, a program storage area and a data storage area. The program storage area and the data storage area can include combinations of different types of memory, such as a ROM, a RAM (e.g., DRAM, SDRAM, etc.), EEPROM, flash memory, a hard disk, an SD card, or other suitable magnetic, optical, physical, or electronic memory devices. The processing unit 455 is connected to the memory 460 and executes software instructions that are capable of being stored in a RAM of the memory 460 (e.g., during execution), a ROM of the memory 460 (e.g., on a generally permanent basis), or another non-transitory computer readable medium such as another memory or a disc. Software included in the implementation of the device 300 can be stored in the memory 460 of the controller 400. The software includes, for example, firmware, one or more applications, program data, filters, rules, one or more program modules, and other executable instructions. The controller 400 is configured to retrieve from the memory 460 and execute, among other things, instructions related to the control processes and methods described herein. In other constructions, the controller 400 includes additional, fewer, or different components.

The battery pack interface 410 includes a combination of mechanical components (e.g., rails, grooves, latches, etc.) and electrical components (e.g., one or more terminals) configured to and operable for interfacing (e.g., mechanically, electrically, and communicatively connecting) the device 300 with a battery pack (e.g., the battery pack 100). For example, power provided by the battery pack 100 to the device 300 is provided through the battery pack interface 410 to the power input module 440. The power input module 440 includes combinations of active and passive components to regulate or control the power received from the battery pack 100 prior to power being provided to the controller 400. The battery pack interface 410 also supplies power to the FET switching module 450 through the spring fuse 445 to be switched by the switching FETs to selectively provide power to the motor 405. The battery pack interface 410 also includes, for example, a communication line 495 for provided a communication line or link between the controller 400 and the battery pack 100. In some embodiments, the controller 400 is also electrically and/or communicatively connected to the spring fuse 445 via a signal line.

The indicators 430 include, for example, one or more light-emitting diodes ("LEDs"). The indicators 430 can be configured to display conditions of, or information associated with, the device 300. For example, the indicators 430 are configured to indicate measured electrical characteristics of the device 300, the status of the device, the status of the spring fuse 445, etc. The user input module 435 is operably coupled to the controller 400 to, for example, select a forward mode of operation or a reverse mode of operation, a torque and/or speed setting for the device 300 (e.g., using torque and/or speed switches), etc. In some embodiments, the user input module 435 includes a combination of digital and analog input or output devices required to achieve a desired level of operation for the device 300, such as one or more knobs, one or more dials, one or more switches, one or more buttons, etc.

The controller 400 is configured to determine whether a fault condition of the device 300 is present and generate one or more control signals related to the fault condition. For example, the sensing circuits 425 include one or more current sensors, one or more speed sensors, one or more Hall Effect sensors, one or more temperature sensors, etc. The controller 400 calculates or includes, within memory 460, predetermined operational threshold values and limits for operation of the device 300. For example, when a potential thermal failure (e.g., of a FET, the motor 405, etc.) is detected or predicted by the controller 400, power to the motor 405 can be limited or interrupted until the potential for thermal failure is reduced. If the controller 400 detects one or more such fault conditions of the device 300 or determines that a fault condition of the device 300 no longer exists, the controller 400 is configured to provide information and/or control signals to another component of the battery pack 100 (e.g. the battery pack interface 410, the indicators 430, the spring fuse 445, etc.). The signals can be configured to, for example, trip or open the spring fuse 445, etc. In some embodiments, the controller 400 is configured to independently sense or monitor a parameter of the device 300 and independently trip or open the spring fuse 445 based on the sensed or monitored parameter. For example, the controller 400 is configured to monitor a parameter (e.g., current, temperature, etc.) and control a heating element 750 (see FIG. 7) that independently trips the spring fuse 445.

Figure 5:
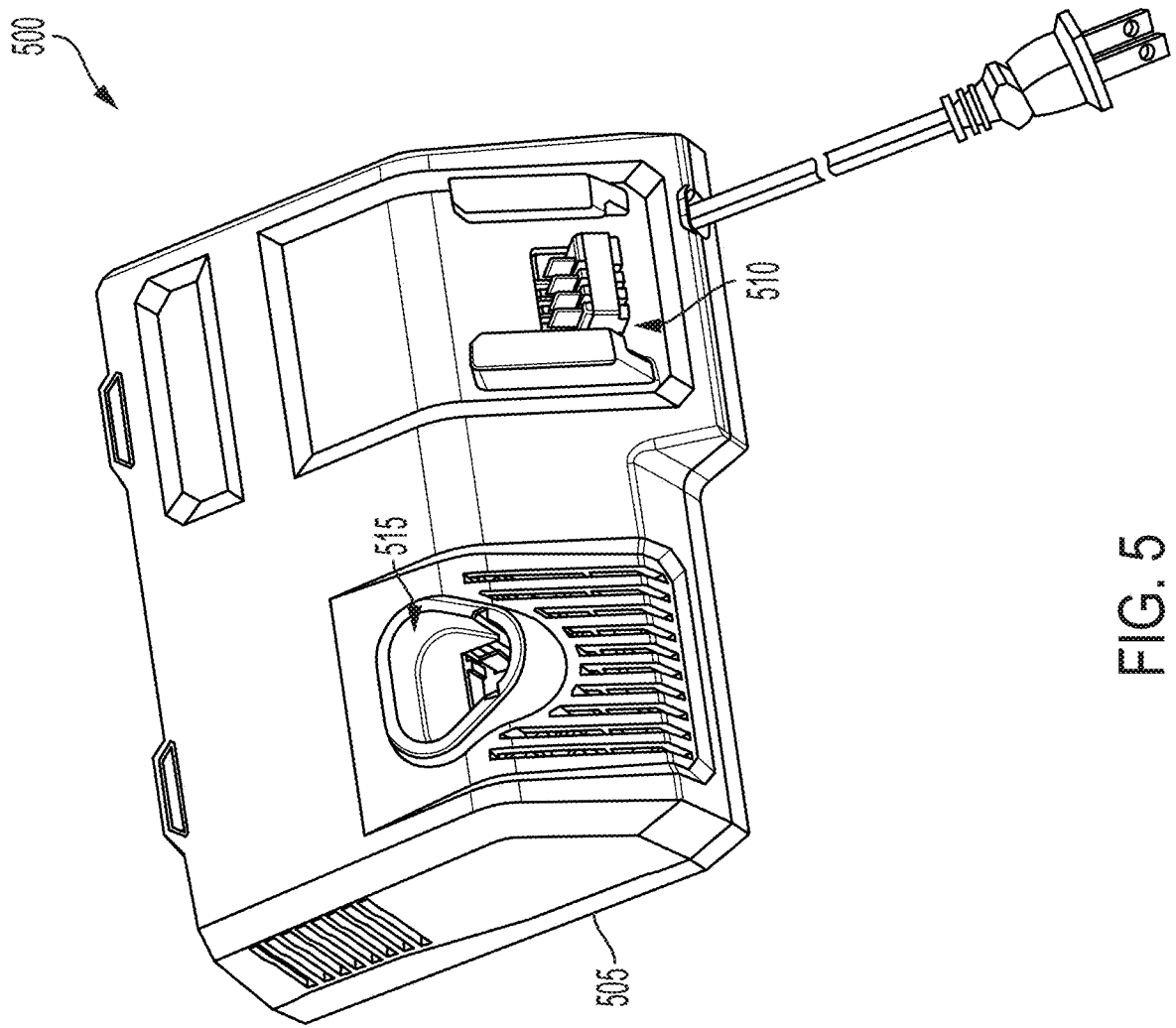
FIG. 5 illustrates a battery pack charger that includes a fuse, according to embodiments described herein.

FIG. 5 illustrates a battery pack charger 500 that includes a fuse (e.g., a spring fuse). The battery pack charger 500 includes a housing 505 and interface portions 510, 515 for connecting the battery pack charger 500 to one or more battery packs (e.g., battery pack 100). The spring fuse is configured to, for example, disable current out of the battery pack charger 500 by opening a current path of the battery pack charger 500. As described above with respect to the battery pack 100, in some embodiments, the spring fuse does not include a casing or a housing and the spring fuse's circuitry is generally exposed. In some embodiments, the spring fuse is connected to a PCB as a singular unit. In other embodiments, a plurality of discrete components are individually connected to a PCB and connected such that the plurality of discrete components collectively form a spring fuse. In some embodiments, the battery pack charger 500 includes a plurality of spring fuses.

Figure 6:
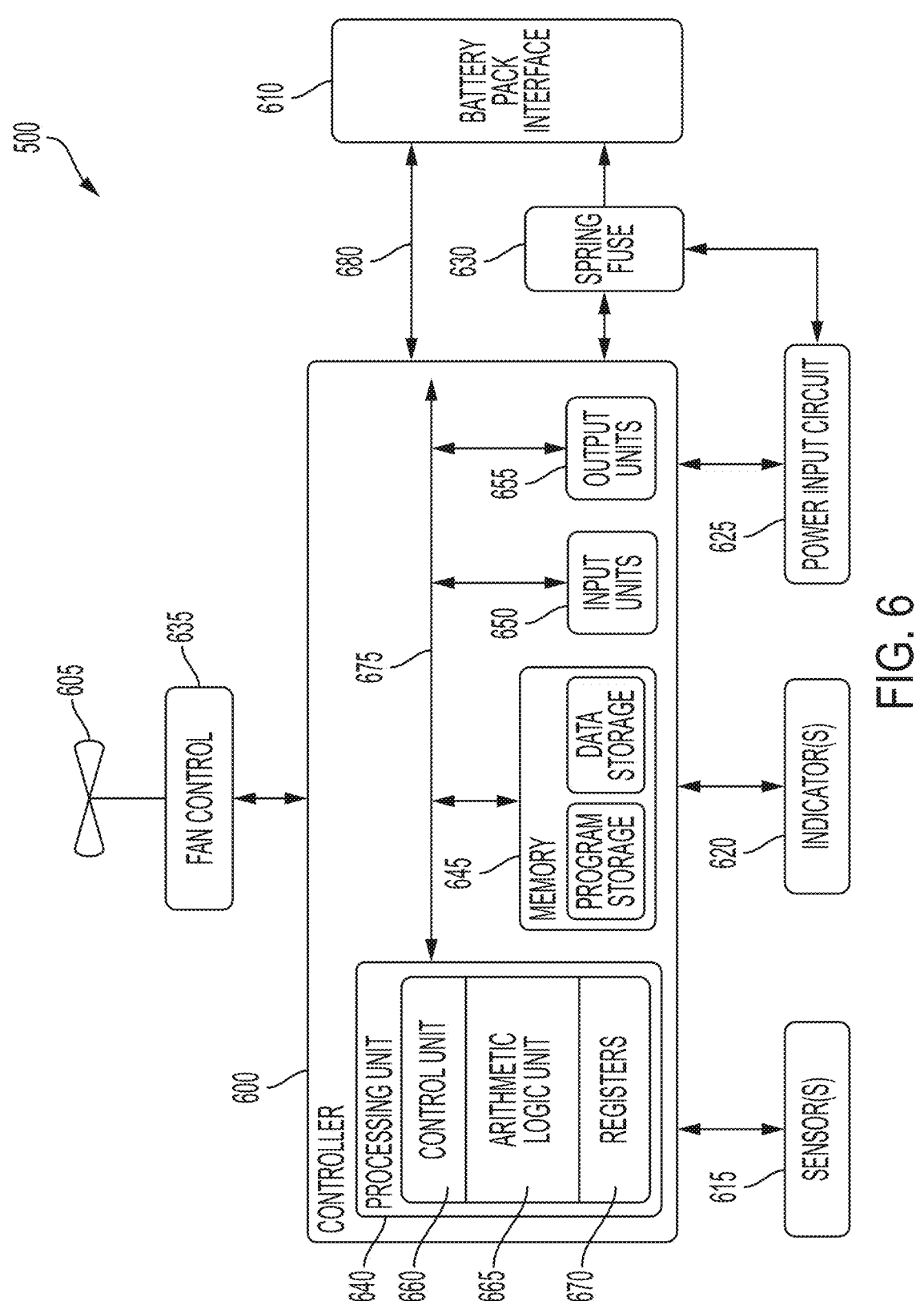
FIG. 6 illustrates a control system for the battery pack charger of FIG. 5, according to embodiments described herein.

FIG. 6 illustrates a control system for the battery pack charger 500. The control system includes a controller 600. The controller 600 is electrically and/or communicatively connected to a variety of modules or components of the battery pack charger 500. For example, the illustrated controller 600 is electrically connected to a fan 605, a battery pack interface 610 (e.g., interface portions 515, 520), one or more sensors or sensing circuits 615 (e.g., current sensors, temperature sensors, etc.), one or more indicators 620, a power input circuit 625, and a fan control module or circuit 635. The controller 600 includes combinations of hardware and software that are operable to, among other things, control the operation of the battery pack charger 500, determine a temperature of a heatsink, activate the indicators 620 (e.g., one or more LEDs), etc.

The controller 600 includes a plurality of electrical and electronic components that provide power, operational control, and protection to the components and modules within the controller 600 and/or battery pack charger 500. For example, the controller 600 includes, among other things, a processing unit 640 (e.g., a microprocessor, a microcontroller, or another suitable programmable device), a memory 645, input units 650, and output units 655. The processing unit 640 includes, among other things, a control unit 660, an ALU 665, and a plurality of registers 670 (shown as a group of registers in FIG. 6), and is implemented using a known computer architecture (e.g., a modified Harvard architecture, a von Neumann architecture, etc.). The processing unit 640, the memory 645, the input units 650, and the output units 655, as well as the various modules or circuits connected to the controller 600 are connected by one or more control and/or data buses (e.g., common bus 675). The control and/or data buses are shown generally in FIG. 6 for illustrative purposes. The use of one or more control and/or data buses for the interconnection between and communication among the various modules, circuits, and components would be known to a person skilled in the art in view of the invention described herein.

The memory 645 is a non-transitory computer readable medium and includes, for example, a program storage area and a data storage area. The program storage area and the data storage area can include combinations of different types of memory, such as a ROM, a RAM (e.g., DRAM, SDRAM, etc.), EEPROM, flash memory, a hard disk, an SD card, or other suitable magnetic, optical, physical, or electronic memory devices. The processing unit 640 is connected to the memory 645 and executes software instructions that are capable of being stored in a RAM of the memory 645 (e.g., during execution), a ROM of the memory 645 (e.g., on a generally permanent basis), or another non-transitory computer readable medium such as another memory or a disc. Software included in the implementation of the battery pack charger 500 can be stored in the memory 645 of the controller 600. The software includes, for example, firmware, one or more applications, program data, filters, rules, one or more program modules, and other executable instructions. The controller 600 is configured to retrieve from the memory 645 and execute, among other things, instructions related to the control processes and methods described herein. In other constructions, the controller 600 includes additional, fewer, or different components.

The battery pack interface 610 includes a combination of mechanical components (e.g., rails, grooves, latches, etc.) and electrical components (e.g., one or more terminals) configured to and operable for interfacing (e.g., mechanically, electrically, and communicatively connecting) the battery pack charger 500 with a battery pack (e.g., battery pack 100). For example, the battery pack interface 610 is configured to receive power through the spring fuse 630 via a power line between the power input circuit 625 and the battery pack interface 610. The battery pack interface 610 is also configured to communicatively connect to the controller 600 via a communications line 680. In some embodiments, the controller 600 is also electrically and/or communicatively connected to the spring fuse 630 via a signal line.

The controller 600 is configured to determine whether a fault condition of the battery pack charger 500 is present and generate one or more control signals related to the fault condition. For example, the sensors 615 include one or more current sensors, one or more temperature sensors, etc. The controller 600 is configured to detect an over current condition (e.g., when charging the battery pack 100), an over temperature condition, etc. If the controller 600 detects one or more fault conditions of the battery pack charger 500 or determines that a fault condition of the battery pack charger no longer exists, the controller 600 is configured to provide information and/or control signals to another component of the battery pack charger 500 (e.g. the battery pack interface 610, the spring fuse 630, etc.). The signals can be configured to, for example, trip or open the spring fuse 630, etc. In some embodiments, the controller 600 is configured to independently sense or monitor a parameter of the battery pack charger 500 and independently trip or open the spring fuse 630 based on the sensed or monitored parameter. For example, the controller 600 is configured to monitor a parameter (e.g., current, temperature, etc.) and control a heating element 750 (see FIG. 7) that independently trips the spring fuse 630.

Figure 7:
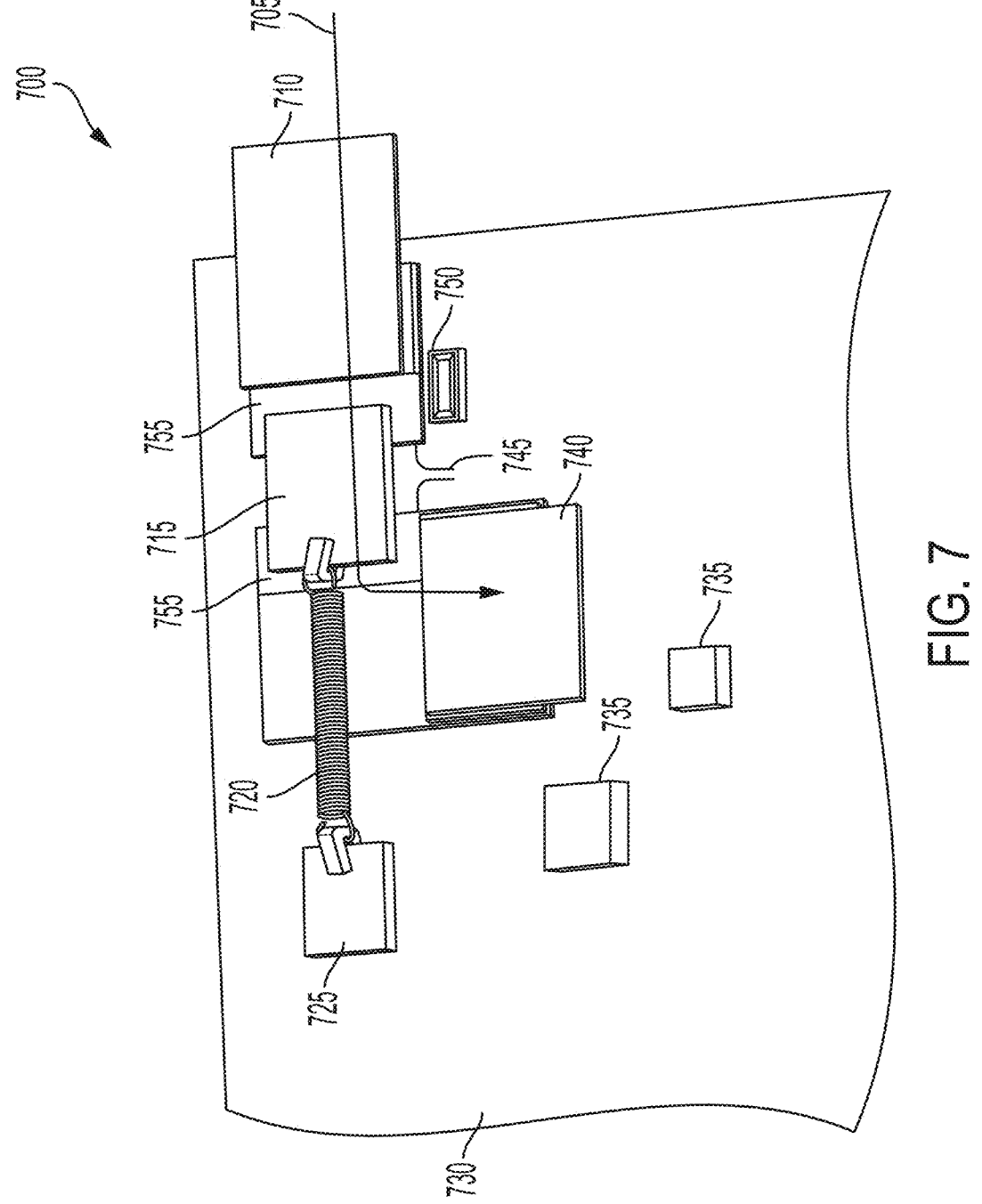
FIG. 7 illustrates an embodiment of a fuse in a closed state, according to embodiments described herein.

FIG. 7 illustrates an embodiment of a fuse 700 (e.g., a spring fuse). The spring fuse 700 includes a fixed base 725, a power path connection 715, a first conductive pad 710, a second conductive pad 740, one or more traces 745, a controlled heating element 750, and one or more other components that generate heat 735. One of the first conductive pad 710 and the second conductive pad 740 is connected to a terminal of the device including the spring fuse 700. In some embodiments, the controlled heating element 750 (e.g., a resistive heating element) is not included. The spring fuse 700 and other components are positioned on a printed circuit board ("PCB") 730. In some embodiments the PCB 730 is made of aluminum or an aluminum alloy. In other embodiments, the PCB 730 may be made of a different material. In some embodiments, the PCB 730 is a rectangular shape. In other embodiments, the PCB 730 is a different shape (e.g., circular, etc.). The fixed base 725 is connected (e.g., soldered) to the PCB 730 so as to secure the fixed base 725 to the PCB 730 and ensure that the fixed base 725 will not shift. The fixed base 725 and the power path connection 715 are connected via respective first and second ends a retraction device 720 (e.g., a resilient member, a spring, an extension spring, etc.). The retraction device or extension spring 720 is secured to the fixed base 725 and the power path connection 715, and is extended to reach from the fixed base 725 to where the power path connection 715 is bonded (e.g., soldered) to a plurality of fuse pads 755. The power path connection 715 is bonded to the plurality of fuse pads 755 with a low temperature bonding material (e.g., solder). In some embodiments, the low temperature bonding material (e.g., an Indium-based solder) includes a melting point of, for example, 118° Celsius. A power path 705 is created through the positioning of the power path connection 715. This allows the current to flow through the spring fuse 700. The first conductive pad 710 is positioned parallel to the power path connection 715, the extension spring 720, and the fixed base 725. The second conductive pad 740 is positioned adjacent and perpendicular to an extension axis of the extension spring 720. The power path 705 travels through the first conductive pad 710, through the power path connection 715, and then creates a right angle to travel though the second conductive pad 740.

In some embodiments, the one or more traces 745 are used to sense current that is traveling through power path 705 of the spring fuse 700. The one or more traces 745 include a resistance in the range of, for example, 50 uΩ to 1 mΩ for sensing the current of the power path 705. The one or more traces 745 can be made of brass, copper, nickel, etc. The length, width, and thickness of the one or more traces can also be varied to control heat generation. When current flows through the power path 705, the first conductive pad 710, the power path connection 715, and the second conductive pad 740 generate heat. In some embodiments, the one or more other components that generate heat 735 are located apart from the first conductive pad 710, the second conductive pad 740, and the power path connection 715 on the PCB 730. The one or more components that generate heat 735 contribute to the overall heating of the spring fuse 700. The Watts of heat generated is calculated through EQN. 1 below.

$$\text{Watts of Heat Generated} = \text{Current}^2 \times \text{Resistance} \qquad \text{EQN. 1}$$

Figure 8:
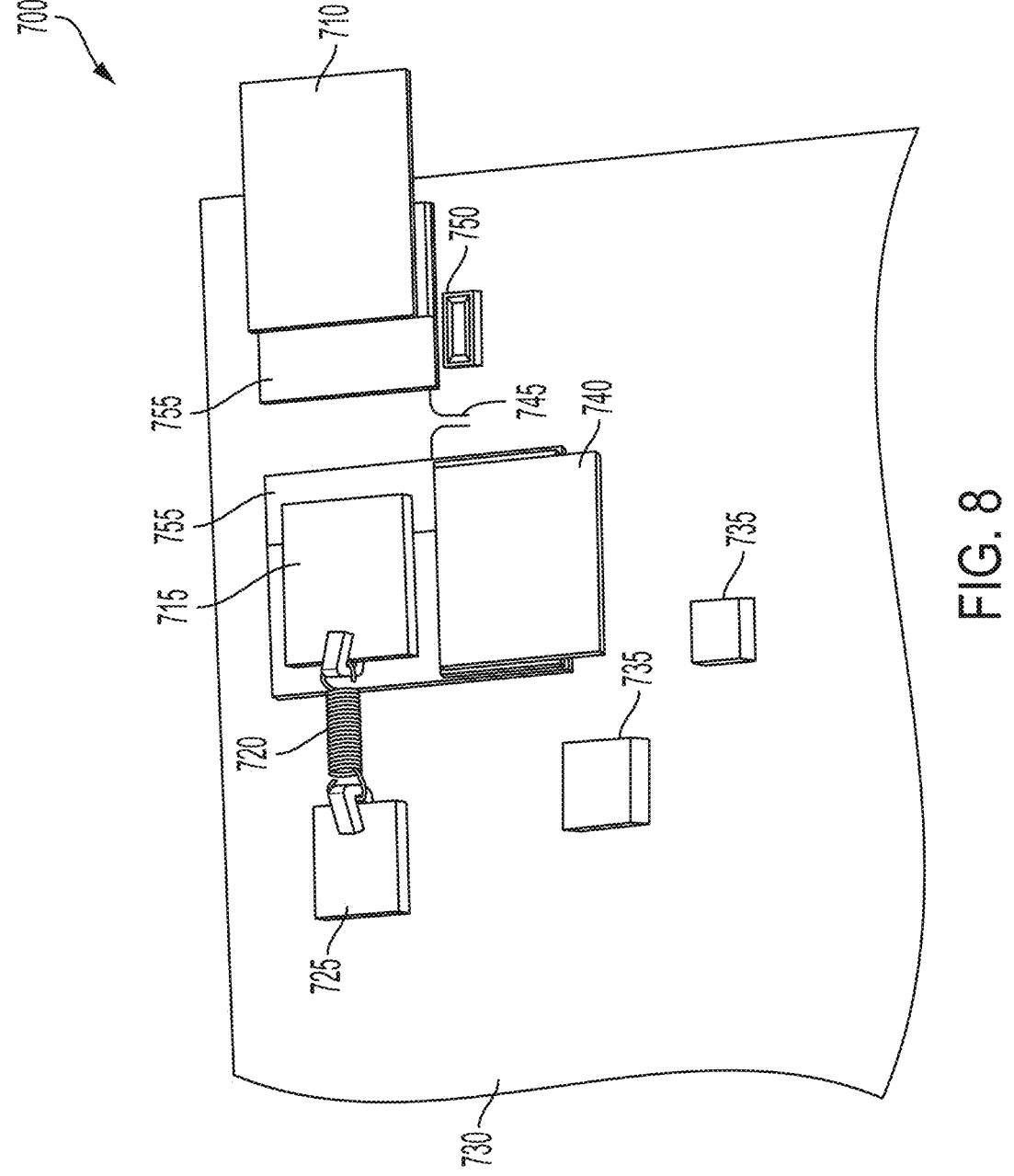
FIG. 8 illustrates an embodiment of a fuse in an opened state, according to embodiments described herein.

When the temperature from the heat of the current exceeds a predetermined melting point, the solder connecting the power path connection 715 and the fuse pads 755 consequently melts. With the loss of the solder, the extension spring 720 retracts towards the fixed base 725. FIG. 8 illustrates when spring fuse 700 is tripped (e.g., opened). When the extension spring 720 retracts to the fixed base 725, the extension spring 720 brings the power path connection 715 back towards the fixed base 725, separating the power path connection 715 from the fuse pads 755, the first conductive pad 710, and the second conductive pad 740. With the retraction of the power path connection 715, the power path 705 is disconnected, severing the current path through the spring fuse 700.

In some embodiments, the range to which the solder melts ranges from about 118° Celsius to 140° Celsius. In other embodiments, the melting point of the solder may be below 118° Celcius.

In some embodiments, a controlled heating element 750 is activated to quickly open the spring fuse 700 when a fault condition is detected. For example, if the solder connecting the power path connection 715 does not melt at the expected temperature threshold, the controlled heating element 750 will be activated to raise the temperature to trip the spring fuse 700 and sever the current flow through the power path 705. In some embodiments, the spring fuse 700 includes a cover or enclosure arranged to enclose the spring fuse 700 and prevent any circuit board coating (e.g., conformal coating, space age coating, potting material, or the like) from interfering with the mechanical movement of the extension spring 720 or the power path connection 715.

In some embodiments, heat staking or laser welding may be used in addition to, or in place of, a low temperature solder. For example, the power path connection 715 may include a thermoplastic material designed to be melted during the manufacturing process, securing the power path connection 715 in place. When the thermoplastic material heats up, such as during a thermal runaway event, the thermoplastic material melts, severing the current path through the spring fuse 700. In some examples, the power path connection 715 may be laser welded to a low melting point material, or fused with a material that has a low melting point. In other embodiments, alternative material bonding may be used. In some embodiments, the extension spring 720 may be any material or structure that includes a spring force strong enough to move (or disconnect) the power path connection 715 from the fuse pads 755, the first conductive pad 710, and the second conductive pad 740. For instance, in some embodiments, the extension spring 720 may be a rubber or elastomeric element, a shape memory alloy, a wire form, or the like.

Figure 9:
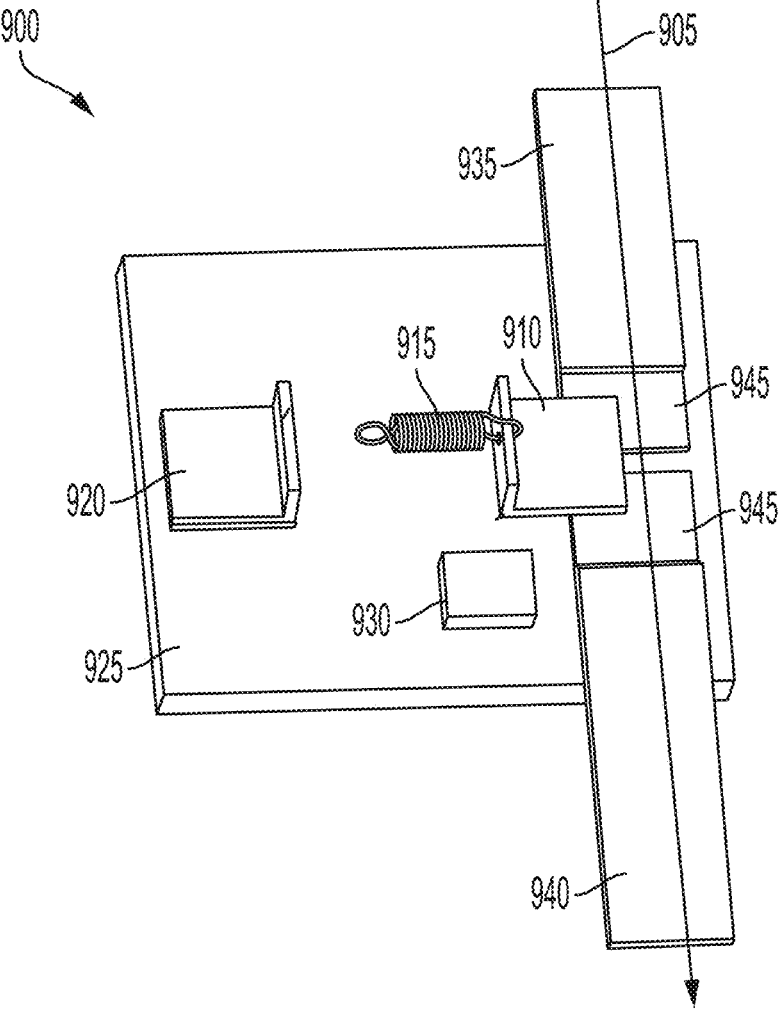
FIG. 9 illustrates an embodiment of a fuse in a closed state, according to embodiments described herein.

FIG. 9 illustrates another embodiment of a fuse 900 (e.g., a spring fuse). The spring fuse 900 includes a fixed base 920, a power path connection 910, a first conductive pad 935, a second conductive pad 940, and a controlled heating element 930. One of the first conductive pad 935 and the second conductive pad 940 is connected to a terminal of the device including the spring fuse 900. The spring fuse 900 and all the included components are positioned on a PCB 925. In some embodiments the PCB 925 is made of aluminum or an aluminum alloy. In other embodiments, the PCB 925 may be made of a different material. In some embodiments, the PCB 925 is in thermal communication with one or more battery cells. In some embodiments, the controlled heating element 930 (e.g., a resistive heating element) is not included.

The fixed base 920 is connected (e.g., soldered) to the PCB 925 so as to secure the fixed base 920 to the PCB 925 and ensure that the fixed base 920 will not shift. The fixed base 920 and the power path connection 910 are connected by respective first and second ends of an extension device 915 (e.g., a resilient member, a spring, an extension spring, etc.). The extension spring 915 is secured to the fixed base 920 and the power path connection 910 and is extended to reach from the fixed base 920 to where the power path connection 910 is soldered to a plurality of fuse pads 945. The power path connection 910 is soldered to the plurality of fuse pads with a low temperature solder. In some embodiments, the low temperature solder (e.g., an Indium-based solder) includes a melting point of, for example, 118° Celsius. A power path 905 is created through the positioning of the power path connection 910. This allows the current to flow through the spring fuse 900. The first conductive pad 935 is positioned perpendicular to the power path connection 910, the extension spring 915, and the fixed base 920. The second conductive pad 940 is positioned parallel or in line to the first conductive pad 935, and perpendicular to an extension axis of the extension spring 915. The power path 905 travels through the first conductive pad 935 then through the second conductive pad 940. This creates the straight power path 905 through the first conductive pad 935 and the second conductive pad 940.

Figure 10:
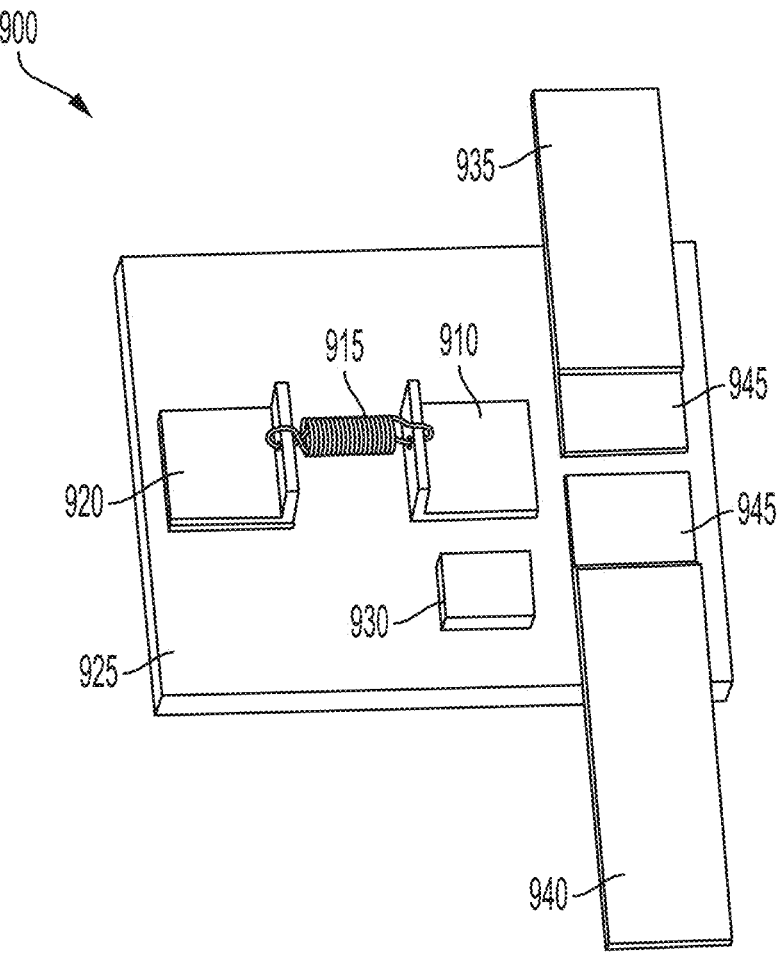
FIG. 10 illustrates an embodiment of a fuse in an opened state, according to embodiments described herein.

Similar to FIG. 7 and FIG. 8, when the temperature from the heat of the current exceeds a predetermined melting point, the solder connecting the power path connection 910 and the fuse pads 945 consequently melts. In normal operating conditions, the battery cells do not exceed 80° Celsius. In short circuit conditions, the battery cells, such as battery cells 205, reach a thermal runaway near 120° Celsius. With the loss of the solder, the extension spring 915 retracts towards the fixed base 920. FIG. 10 illustrates when spring fuse 900 is tripped. When the extension spring 915 retracts to the fixed base 920, the extension spring 915 brings the power path connection 910 back towards the fixed base 920, separating the power path connection 910 from the first conductive pad 935 and the second conductive pad 940. With the retraction of the power path connection 910, the power path 905 is disconnected, severing the straight current path through the spring fuse 900. The first conductive pad 935 and the second conductive pad 940 sit adjacent to each other, but without the power path connection 910, are not electrically connected. In some embodiments, the controlled heating element 930 is placed near the extension spring 915 to add more heat controlled by a controller. In some embodiments, the spring fuse 900 includes a cover or enclosure arranged to enclose the spring fuse 900 and prevent any circuit board coating (e.g., conformal coating, space age coating, potting material, or the like) from interfering with the mechanical movement of the extension spring 915 or the power path connection 910.

In some instances, heat staking or laser welding may be used in addition to, or in place of, a low temperature solder. For example, the power path connection 910 may include a thermoplastic material designed to be melted during the manufacturing process, securing the power path connection 910 in place. When the thermoplastic material heats up, such as during a thermal runaway near 120° Celsius, the thermoplastic material melts, severing the current path through the spring fuse 900. In some examples, the power path connection 910 may be laser welded to a low melting point material, or fused with a material that has a low melting point. In other embodiments, alternative material bonding may be used. In some embodiments, the extension spring 915 may be any material or structure that includes a spring force strong enough to move (or disconnect) the power path connection 910 from first conductive pad 935 and the second conductive pad 940. For instance, in some embodiments, the extension spring 915 may be a rubber or elastomeric element, a shape memory alloy, a wire form, or the like.

Figure 11:
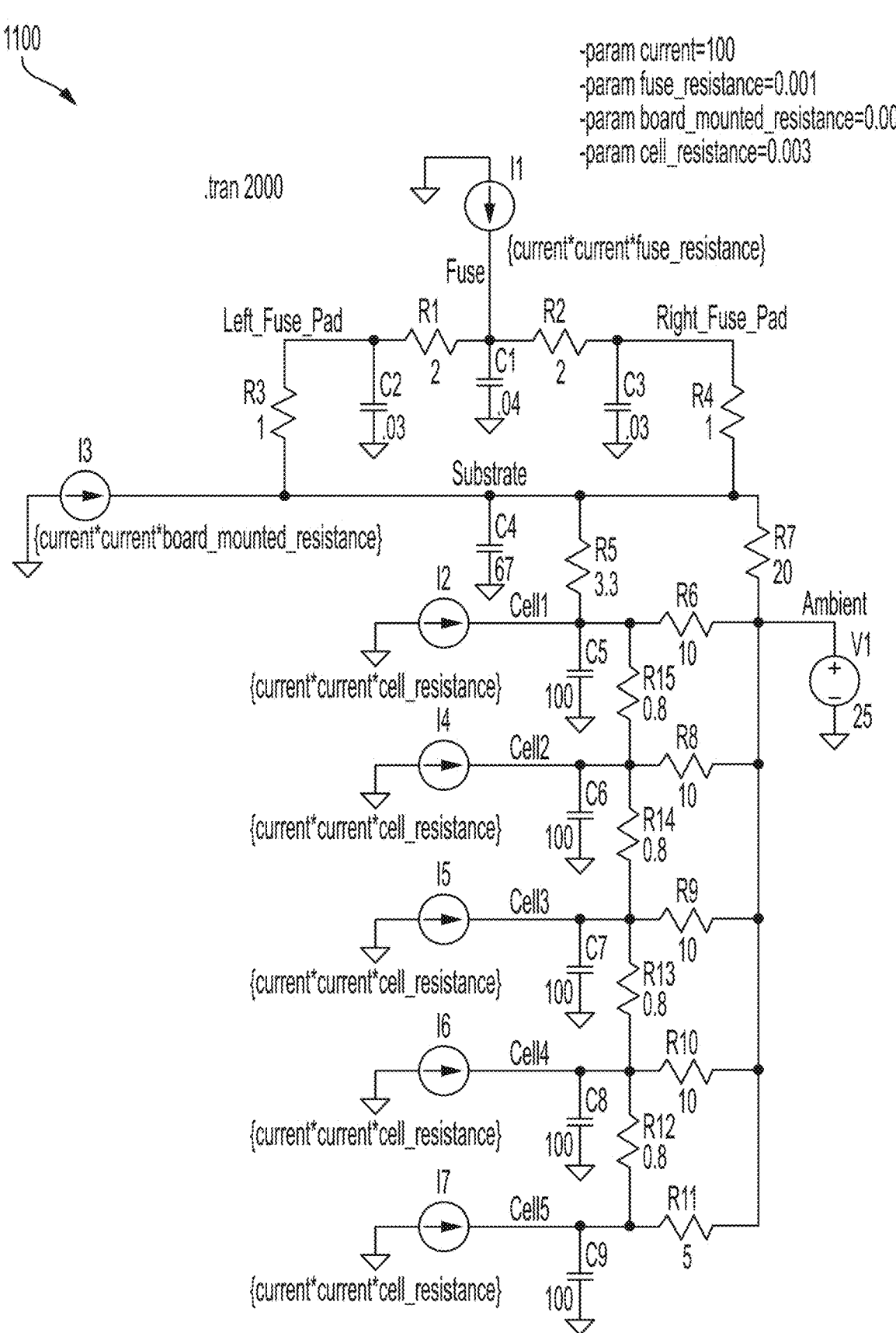
FIG. 11 illustrates a thermal model schematic, according to embodiments described herein.

FIG. 11 illustrates a thermal model schematic 1100 for a system including a spring fuse. The thermal model schematic 1100 is used to simulate a thermal system using one or more circuits. For example, current in the thermal model schematic 1100 corresponds to thermal energy (Watts), voltage corresponds to temperature, resistances correspond to thermal impedances, and capacitors correspond to thermal masses. The thermal model schematic 1100 is configured to include one or more components to monitor one or more parameters of the thermal system.

Elements in the system can be tuned to select the temperature at which the spring fuse 700, 900 is opened. For example, the thermal capacity of the PCB can be modified (e.g., substrate material, substrate thickness, substrate shape, etc.), the resistance of the power path connection can be varied, the melting point of the solder can be varied, thermal coupling of the substrate to battery cells can be modified, and the locations of heat generating elements can be adjusted. In some embodiments, a controller 200, 400, 600 is configured to monitor a parameter of the device, such as current or temperature. If the controller 200, 400, 600 detects that the parameter is equal to or greater than a threshold value, the controller 200, 400, 600 can actively control a controlled heating element 750, 930 to facilitate the opening of the spring fuse 700, 900 or prevent opening of the spring fuse 700, 900.

Figure 12:
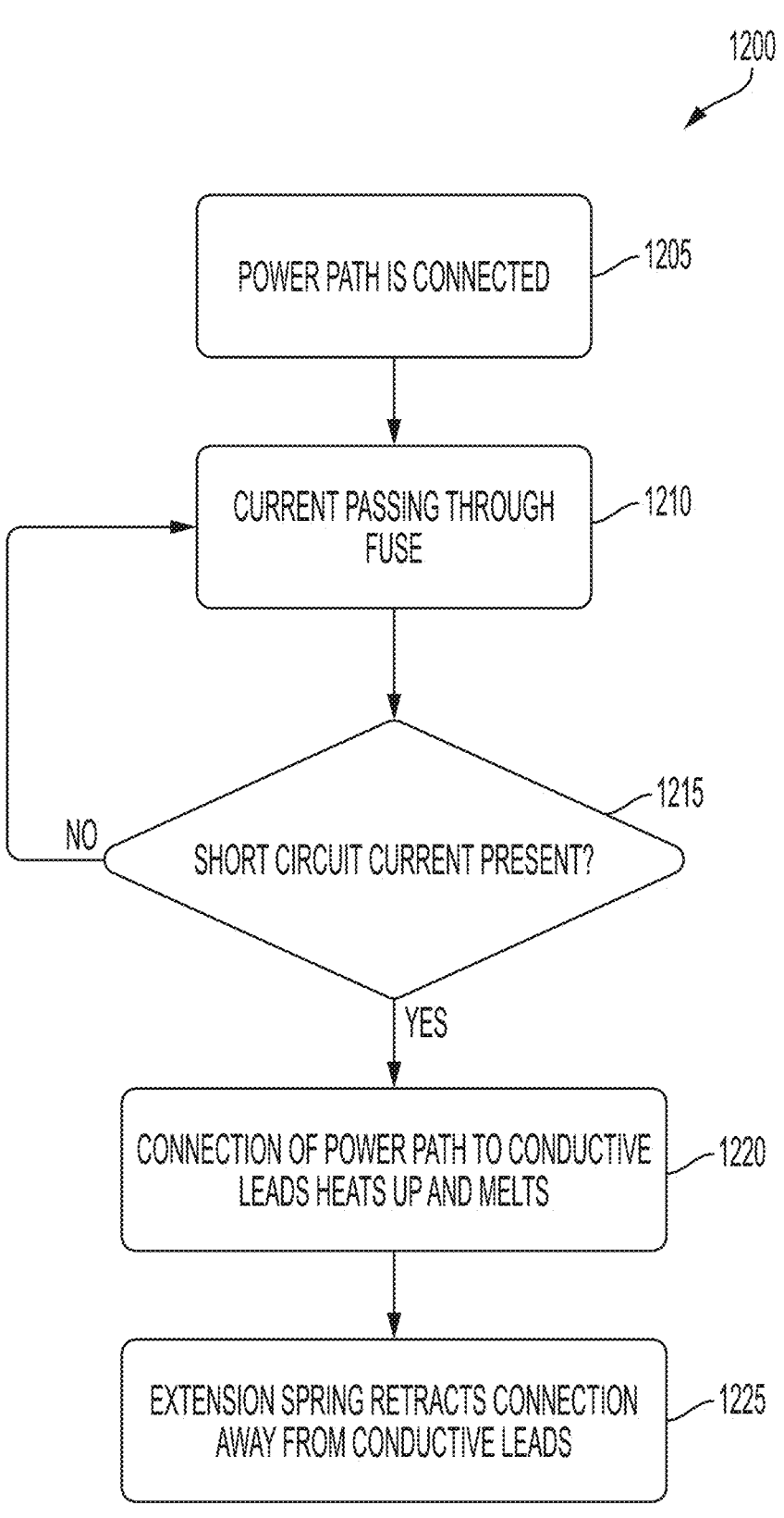
FIG. 12 illustrates a process for operating a fuse, according to embodiments described herein.

FIG. 12 is a process 1200 for operating a spring fuse, such as the spring fuse 700, 900. The process 1200 begins with connecting a power path, such as power path 705, 905. By connecting the power path, the spring fuse 700, 900 is positioned on a PCB 730, 925 so as to allow current to flow through the power path 705, 905 of the spring fuse 700, 900. In a normal operating mode, current passes through the spring fuse 700, 900 of a device. The device is, for example, the battery pack 100, the device 300, or the battery pack charger 500. If, at STEP 1215, a short circuit current is not present, the process returns to STEP 1210. If, at STEP 1215, a short circuit current is present, the process 1200 proceeds to STEP 1220 where the connection of the power path 705, 905 heats up and melts the power path's 705, 905 bonding joints (e.g., solder joints). Once the power path's soldered joints are melted, an extension spring, such as 915, 720, retracts the power path connection away from a first conductive pad and a second conductive pad (STEP 1225). Without the connection of the power path connection, current can no longer pass through the device and the normal operating condition is ceased (e.g., a fault condition is entered).

Figure 13:
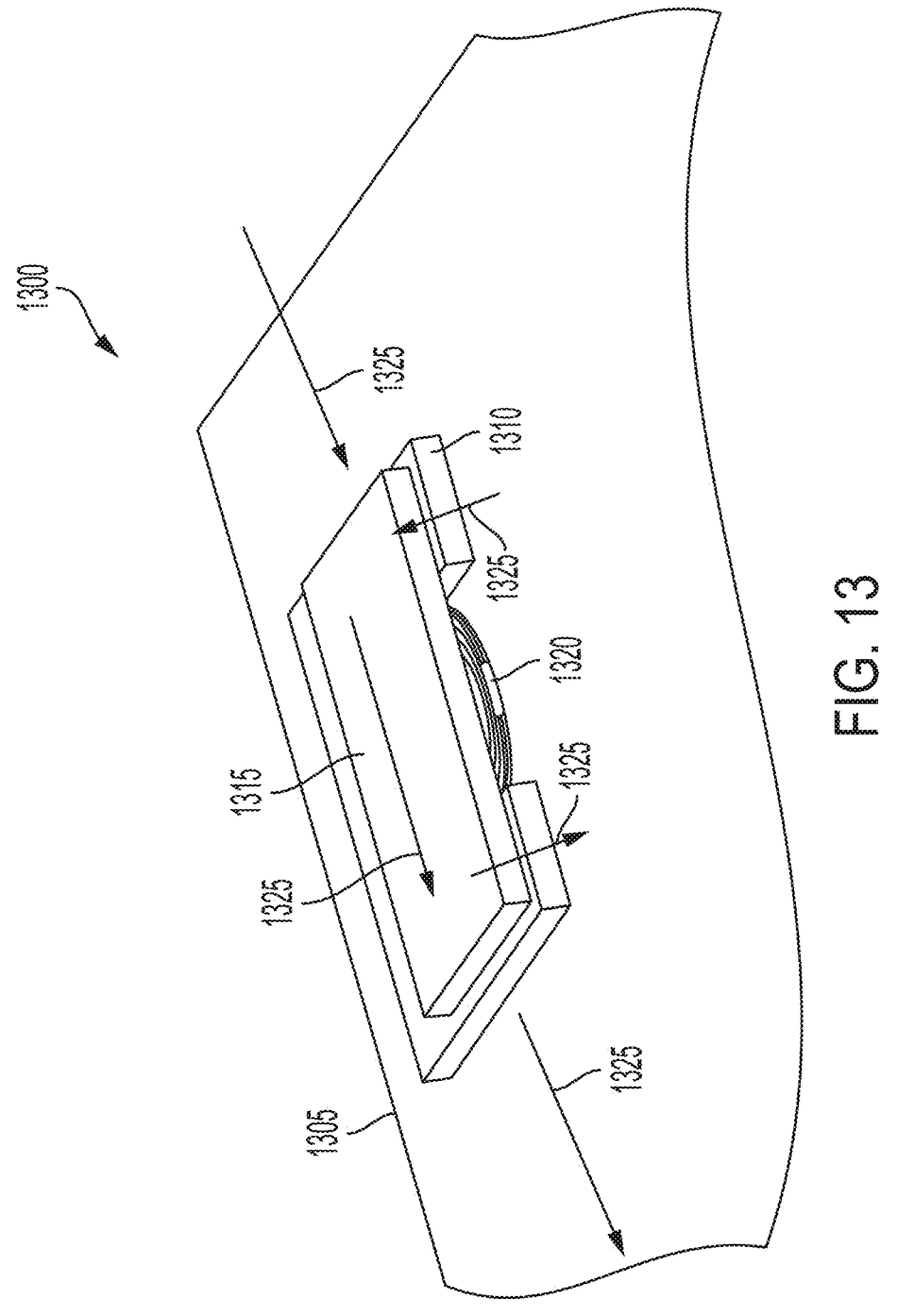
FIG. 13 illustrates an embodiment of a fuse in a closed state, according to embodiments described herein.

FIG. 13 illustrates another embodiment of a fuse 1300 (e.g., a spring fuse) in a closed state. In some embodiments, the spring fuse 1300 includes elements as previously described, such as a fixed base, a power path connection, one or more conductive pads, and a controlled heating element. In the embodiment illustrated in FIG. 13, the spring fuse 1300 includes a first printed circuit board ("PCB") 1310 in electrical communication with a second PCB 1305. The first PCB 1310 includes a plurality of electrical vias (not illustrated) configured to allow the flow of electrical current from the second PCB 1305 through the first PCB 1310 via a conductor 1315. In some embodiments, the conductor 1315 is soldered to conductive pads (not illustrated) with a low temperature solder, in a similar way as previously described with respect to spring fuse 700, 900. The conductive pads are electrically connected to a first electrical via and a second electrical via within the first PCB 1310. The first and second electrical vias are configured to provide the first PCB 1310 with an electrical connection to the second PCB 1305. In some instances, the conductor 1315 is soldered directed to the first and second electrical vias. The electrical vias may be made of brass, copper, nickel, etc. The length, width, and thickness of the electrical vias may also be varied to control heat generation.

The spring fuse 1300 includes an extension or retraction member 1320 (e.g., a resilient member, a spring, an extension spring, a retraction spring, etc.) positioned between the second PCB 1305 and the conductor 1315. In a normal condition, an electrical current 1325 passes from the second PCB 1305, through the first electrical via of the first PCB 1310, across the conductor 1315, through the second electrical via of the first PCB 1310, and returns to the second PCB 1305. The flow of electricity is illustrated as the electrical current 1325. However, when a thermal runaway occurs, such as the thermal runaway as previously described, the low temperature solder melts. When the solder melts, the member 1320 pushes the conductor 1315 away from the first PCB 1310, preventing the flow of the electrical current 1325. In some embodiments, the spring fuse 1300 includes a cover or enclosure arranged to enclose the conductor 1315 and prevent any circuit board coating (e.g., conformal coating, space age coating, potting material, or the like) from interfering with the mechanical movement of the spring 1320 or the conductor 1315.

In some instances, heat staking or laser welding may be used in addition to, or in place of, a low temperature solder. For example, the second PCB 1305 may include a thermoplastic material designed to be melted during the manufacturing process, securing the conductor 1315 in place. When the thermoplastic material heats up, such as during a thermal runaway event, the thermoplastic material melts, causing the spring fuse 1300 to enter the open state. In some examples, the spring fuse 1300 may be laser welded to a low melting point material, or fused with a material that has a low melting point. In other embodiments, alternative material bonding may be used. In some embodiments, the member may be any material or structure that includes a force strong enough to move (or disconnect) the conductor 1315 from the second PCB 1305. For instance, in some embodiments, the member 1320 may be a rubber or elastomeric element, a shape memory alloy, a wire form, or the like.

Figure 14:
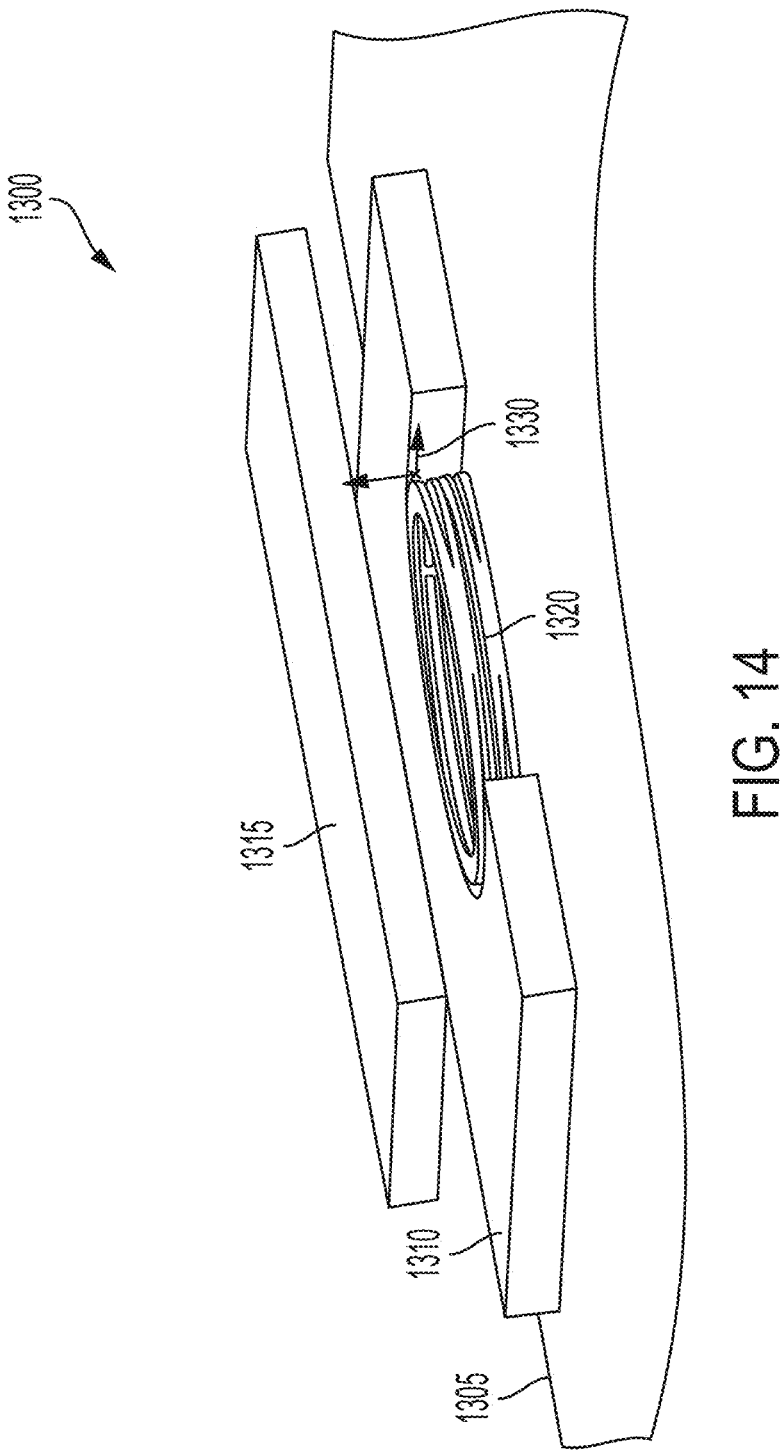
FIG. 14 illustrates an embodiment of a fuse in an opened state, according to embodiments described herein.

FIG. 14 illustrates the spring fuse 1300 in an open state, according to some embodiments. The spring fuse 1300 includes the second PCB 1305, first PCB 1310, the conductor 1315, and the spring 1320, as previously described. In the open state, the spring 1320 forces the conductor 1315 a distance 1330 away from the first PCB 1310. The distance 1330 is configured to be large enough to prevent the flow of electrical current 1325 from the first PCB 1310 to the conductor 1315. In some instances, a temperature sensor (e.g., thermistor, resistance temperature detector, thermocouple, semiconductor-based-integrated circuit sensor, or the like) is mounted to the first PCB 1310, and is configured to measure the temperature of the conductor 1315. A controller, such as controller 200, 400, or 600, may be configured to receive a temperature measurement from the temperature sensor and prevent the spring fuse 1300 from entering the opened state. For example, if the controller determines that the temperature of the conductor 1315 does not exceed a predetermined threshold, the controller may prevent the spring fuse 1300 from entering the open state. In some instances, the temperature sensor is configured to measure the temperature of other elements of the spring fuse 1300, such as the solder, the first and/or second vias, etc. In some embodiments, a heating element (e.g., a resistor, a ceramic heater, a coil, or the like) is mounted to the first PCB 1310 and is in thermal communication with the conductor 1315. The controller may be configured to provide a current to the heating element, thereby allowing the controller to increase the temperature of the conductor 1315 forcing the spring fuse 1300 into an open state.

Thus, embodiments described herein provide, among other things, a fuse for a device (e.g., a high-powered device), such as a power tool, a battery pack for the power tool, or a battery pack charger. Various features and advantages are set forth in the following claims.

What is claimed is:

1. A device including a conductive path for passing electric current, the device comprising:
   a terminal;
   a controller;
   a sensor configured to sense a temperature and communicate the sensed temperature to the controller; and
   a fuse connected in the conductive path and electrically connected to the terminal, the fuse including:
   a fixed base,
   a member connected to the fixed base at a first end,
   a power path connection connected to the member at a second end,
   a plurality of fuse pads, and
   one or more bonding joints configured to connect the power path connection to the plurality of fuse pads;
   wherein the one or more bonding joints are configured to deteriorate when a temperature of the one or more bonding joints exceeds a threshold value,
   wherein the power path connection is configured to move toward the fixed base when the temperature of the one or more bonding joints exceeds a threshold value, and
   wherein the power path connection is configured to move away from the plurality of fuse pads when the temperature of the one or more bonding joints exceeds the threshold value, such that the power path connection is spaced away from the plurality of fuse pads.

2. The device of claim 1, wherein the fuse is located within a battery pack.

3. The device of claim 1, wherein the fuse is located within a battery pack charger.

4. The device of claim 1, wherein the fuse is located within a power tool.

5. The device of claim 1, further comprising:

a heating element configured to be activated by the controller to thereby increase the temperature of the one or more bonding joints.

6. The device of claim 1, further comprising:

a cover configured to enclose the fuse and prevent a circuit board coating from interfering with retraction of the power path connection.

7. A device including a conductive path for passing electric current, the device comprising:

a terminal; and a spring fuse connected in the conductive path and electrically connected to the terminal, the spring fuse including:

a fixed base, an extension spring connected to the fixed base at a first end, a power path connection connected to the extension spring at a second end, a first conductive pad positioned perpendicular to the power path connection, a second conductive pad positioned parallel to the first conductive pad, a first solder joint connected to the first conductive pad, a second solder joint connected to the second conductive pad;

wherein the first solder joint or the second solder joint are configured to melt when a respective temperature of the first solder joint or the second solder joint exceeds a threshold value, and wherein the power path connection is configured to retract toward the fixed base and away from both the first conductive pad and the second conductive pad when the first solder joint and the second solder joint melt, such that the power path connection is spaced from both the first conductive pad and the second conductive pad.

8. The device of claim 7, wherein the device is located within a battery pack.

9. The device of claim 7, wherein the device is located within a battery pack charger.

10. The device of claim 7, wherein the device is located within a power tool.

11. The device of claim 7, further comprising:

a cover configured to enclose the spring fuse and prevent a circuit board coating from interfering with the retraction of the power path connection.

12. The device of claim 7, further comprising:

a controller; and a sensing element configured to sense a temperature of the device and communicate with the controller.

13. The device of claim 12, further comprising a heating element configured to be activated by the controller to thereby increase the temperature of one or more of the first solder joint and the second solder joint.

* * * * *